United States Patent
Lewis et al.

(10) Patent No.: US 10,916,127 B2
(45) Date of Patent: *Feb. 9, 2021

(54) INTELLIGENT TELEMATICS SYSTEM FOR DEFINING VEHICLE WAYS

(71) Applicant: Geotab Inc., Oakville (CA)

(72) Inventors: Daniel Jacob Lewis, Burlington (CA); Xiaochen Zhang, Thornhill (CA); Brenda Nguyen, Brampton (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,527

(22) Filed: Aug. 8, 2019

(65) Prior Publication Data

US 2020/0320863 A1    Oct. 8, 2020

Related U.S. Application Data

(60) Provisional application No. 62/829,539, filed on Apr. 4, 2019.

(51) Int. Cl.
| | | |
|---|---|---|
| *G08C 19/04* | (2006.01) | |
| *G08G 1/01* | (2006.01) | |
| *G06N 20/00* | (2019.01) | |
| *H04W 4/38* | (2018.01) | |
| *G07C 5/00* | (2006.01) | |
| *G07C 5/08* | (2006.01) | |

(Continued)

(52) U.S. Cl.
CPC ........... *G08G 1/0133* (2013.01); *G06N 20/00* (2019.01); *G07C 5/008* (2013.01); *G07C 5/085* (2013.01); *G08G 1/0125* (2013.01); *G08G 1/0129* (2013.01); *H04W 4/38* (2018.02); *G01S 19/13* (2013.01); *H04W 4/44* (2018.02)

(58) Field of Classification Search
CPC .. G08G 1/0129; G08G 1/0133; G08G 1/0125; H04W 4/38; H04W 4/44; G06N 20/00; G07C 5/008; G07C 5/085; G01S 19/13
USPC ...................................................... 340/870.11
See application file for complete search history.

(56) References Cited

U.S. PATENT DOCUMENTS

| | | | | |
|---|---|---|---|---|
| 5,488,559 A | * | 1/1996 | Seymour ................ | G01C 21/30 342/357.31 |
| 8,630,958 B2 | * | 1/2014 | Carlsson .............. | G06Q 10/047 705/338 |

(Continued)

FOREIGN PATENT DOCUMENTS

| | | |
|---|---|---|
| EP | 3 032 454 A1 | 6/2016 |
| EP | 2 638 711 B1 | 5/2018 |
| EP | 3 032 454 B1 | 9/2018 |

OTHER PUBLICATIONS

U.S. Appl. No. 16/444,228, filed Jun. 18, 2019, Lewis et al.

(Continued)

*Primary Examiner* — Kerri L McNally
*Assistant Examiner* — Thang D Tran
(74) *Attorney, Agent, or Firm* — Wolf, Greenfield & Sacks, P.C.

(57) ABSTRACT

Disclosed are systems and methods relating to determining geographic locations of vehicle ways which are employed by vehicles for movement and/or parking. A classifier may be defined for identifying portions of the vehicle ways via machine learning techniques and processing of historical telematic data.

54 Claims, 44 Drawing Sheets

(51) Int. Cl.
*H04W 4/44* (2018.01)
*G01S 19/13* (2010.01)

(56) References Cited

U.S. PATENT DOCUMENTS

| | | | |
|---|---|---|---|
| 9,142,127 B1 | 9/2015 | McDevitt-Pimbley et al. | |
| 9,672,667 B2* | 6/2017 | Mason | G07C 5/0816 |
| 9,759,812 B2 | 9/2017 | Nichols et al. | |
| 9,769,616 B1 | 9/2017 | Pao et al. | |
| 10,037,693 B2 | 7/2018 | Ryu et al. | |
| 10,216,189 B1* | 2/2019 | Haynes | G05D 1/0088 |
| 10,235,882 B1* | 3/2019 | Aoude | G08G 1/052 |
| 10,352,709 B1* | 7/2019 | Kalenkovich | G01C 21/32 |
| 10,475,127 B1* | 11/2019 | Potter | B60W 40/09 |
| 10,699,564 B1 | 6/2020 | Lewis et al. | |
| 2004/0249568 A1 | 12/2004 | Endo et al. | |
| 2005/0084329 A1* | 4/2005 | Myers | G06Q 99/00 404/72 |
| 2009/0299857 A1* | 12/2009 | Brubaker | G06Q 30/0247 705/14.66 |
| 2010/0033338 A1* | 2/2010 | Sverrisson | G08G 1/207 340/686.1 |
| 2010/0161217 A1 | 6/2010 | Yamamoto | |
| 2010/0299370 A1* | 11/2010 | Otto | G09B 29/10 707/803 |
| 2011/0106416 A1* | 5/2011 | Scofield | G08G 1/0104 701/119 |
| 2012/0239281 A1* | 9/2012 | Hinz | G06F 16/29 701/117 |
| 2014/0279707 A1* | 9/2014 | Joshua | G06Q 30/0283 705/400 |
| 2014/0357295 A1* | 12/2014 | Skomra | G06Q 10/0833 455/456.1 |
| 2016/0086393 A1* | 3/2016 | Collins | G07C 5/0808 701/31.5 |
| 2016/0364739 A1 | 12/2016 | Dann et al. | |
| 2016/0381325 A1* | 12/2016 | Stumphauzer, II | G01S 19/14 348/149 |
| 2017/0069144 A1* | 3/2017 | Lawrie-Fussey | G06Q 10/20 |
| 2017/0076227 A1* | 3/2017 | Elgie | H04B 1/3822 |
| 2017/0089717 A1 | 3/2017 | White et al. | |
| 2017/0154537 A1* | 6/2017 | Moravek | G08G 5/0056 |
| 2017/0163515 A1 | 6/2017 | Heliker et al. | |
| 2017/0276499 A1 | 9/2017 | Sun et al. | |
| 2017/0277717 A1 | 9/2017 | Asaad et al. | |
| 2017/0349148 A1* | 12/2017 | Bojanowski | B60S 1/0862 |
| 2018/0074502 A1 | 3/2018 | Holben | |
| 2018/0075380 A1* | 3/2018 | Perl | G06Q 50/30 |
| 2018/0095977 A1* | 4/2018 | Reddy | G06F 16/9535 |
| 2018/0137759 A1* | 5/2018 | Oh | H04W 4/44 |
| 2018/0144388 A1* | 5/2018 | Mattern | G01C 21/3679 |
| 2018/0157257 A1* | 6/2018 | Hashimoto | G05D 1/0088 |
| 2018/0182248 A1* | 6/2018 | Kanai | G08G 1/16 |
| 2018/0299893 A1* | 10/2018 | Qin | G05D 1/0246 |
| 2018/0300816 A1* | 10/2018 | Perl | B60W 40/00 |
| 2019/0024781 A1 | 1/2019 | Chrungoo et al. | |
| 2019/0049262 A1* | 2/2019 | Grimm | G07C 5/008 |
| 2019/0068671 A1* | 2/2019 | Mehta | H04L 65/601 |
| 2019/0102840 A1* | 4/2019 | Perl | B60W 40/09 |
| 2019/0143967 A1 | 5/2019 | Kutila et al. | |
| 2019/0272747 A1 | 9/2019 | Raamot | |
| 2019/0287403 A1 | 9/2019 | Aoude et al. | |
| 2019/0311617 A1 | 10/2019 | Karaoguz | |
| 2019/0318620 A1 | 10/2019 | Yang et al. | |
| 2019/0333377 A1 | 10/2019 | Malkes et al. | |
| 2020/0257317 A1* | 8/2020 | Musk | G05D 1/12 |
| 2020/0263995 A1* | 8/2020 | Gaal | G01C 21/32 |
| 2020/0290638 A1* | 9/2020 | Damnjanovic | G08G 1/0112 |

OTHER PUBLICATIONS

U.S. Appl. No. 16/448,657, filed Jun. 21, 2019, Lewis et al.
U.S. Appl. No. 16/448,694, filed Jun. 21, 2019, Lewis et al.
U.S. Appl. No. 16/870,859, filed May 8, 2020, Lewis et al.
U.S. Appl. No. 16/877,936, filed May 19, 2020, Lewis et al.
U.S. Appl. No. 16/877,963, filed May 19, 2020, Lewis et al.
U.S. Appl. No. 16/877,982, filed May 19, 2020, Lewis et al.
Prytz, Machine learning methods for vehicle predictive maintenance using off-board and on-board data. Licentiate Thesis, Halmstad University Dissertations No. 9. 2014, 96 pages.
Extended European Search Report for European Application No. 20163940.8, dated Sep. 2, 2020.
Azevedo et al., Real-time road surface mapping using stereo matching, v-disparity and machine learning. IEEE 2013 International Joint Conference on Neural Networks (IJCNN). Aug. 4, 2013:1-8.

* cited by examiner

412 ⟶
418 ⟶
406 ⟶

| Device ID | DateTime | Speed Km/h | Position LAT/LONG | Ignition State 1 = ON 0 = OFF |
|---|---|---|---|---|
| $ID_{202}$ | DT0 | s0 | LAT/LONG0 | 1 |
| $ID_{202}$ | DT1 | s1 | LAT/LONG1 | 1 |
| $ID_{202}$ | DT2 | s2 | LAT/LONG2 | 1 |
| $ID_{202}$ | DT3 | s3 | LAT/LONG3 | 1 |
| $ID_{202}$ | DT4 | s4 | LAT/LONG4 | 1 |
| $ID_{202}$ | DT5 | s5 | LAT/LONG5 | 1 |

FIG. 6Aii

FIG. 6Aiii

FIG. 6Aiv

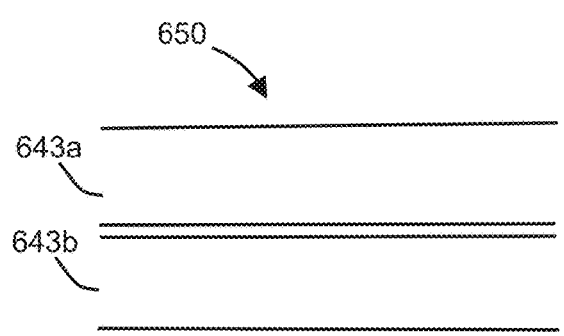
FIG. 6Av
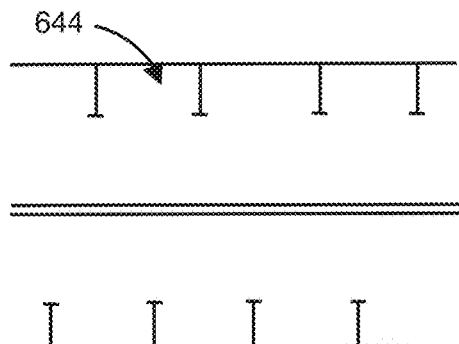
FIG. 6Avi
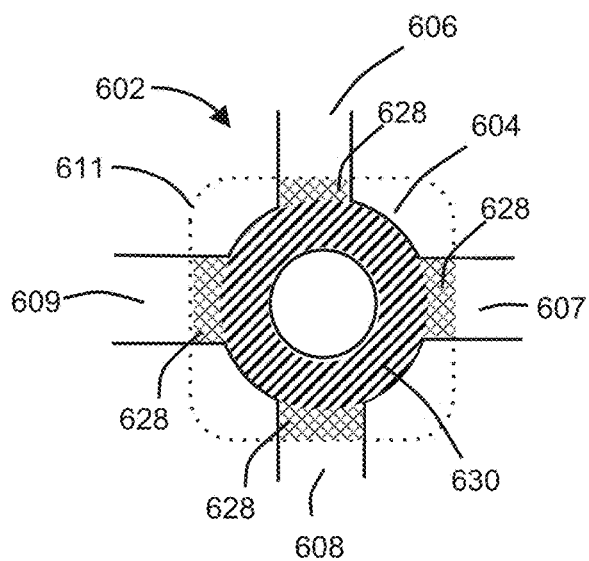
FIG. 6Bi
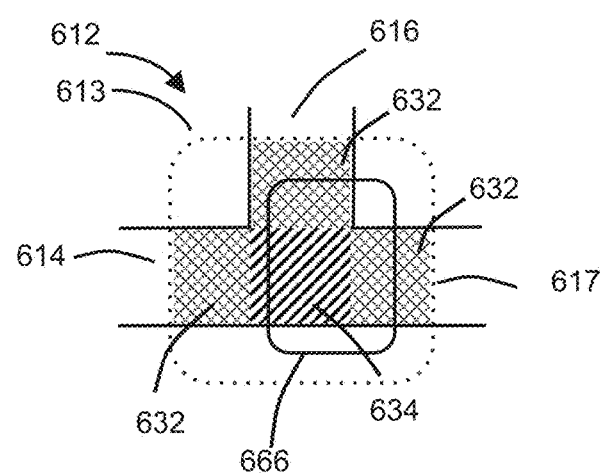
FIG. 6Bii

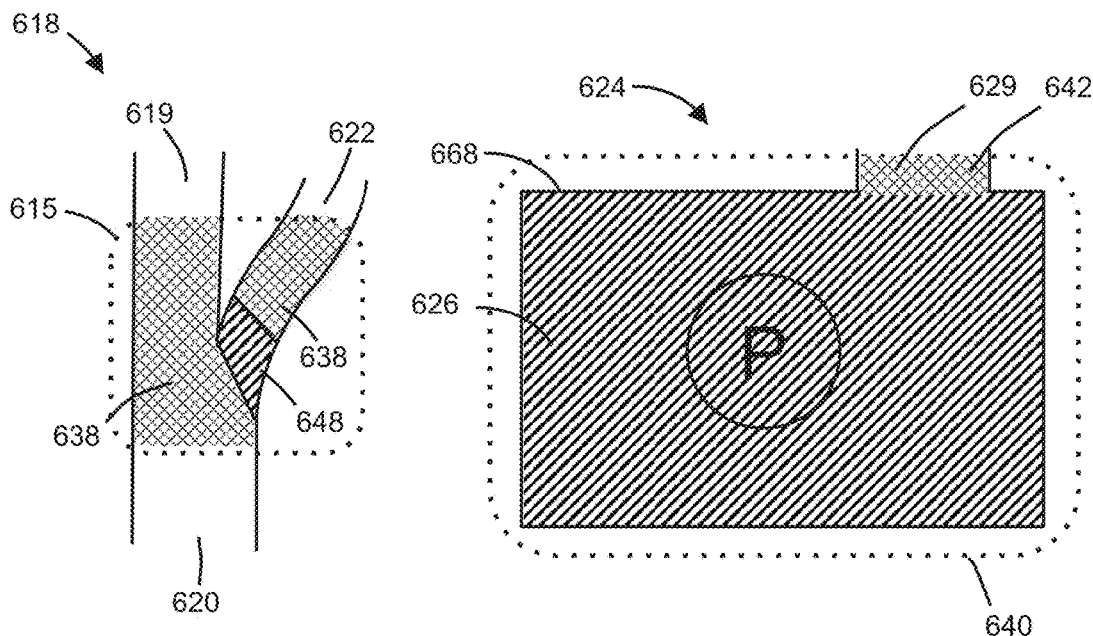
FIG. 6Biii
FIG. 6Biv
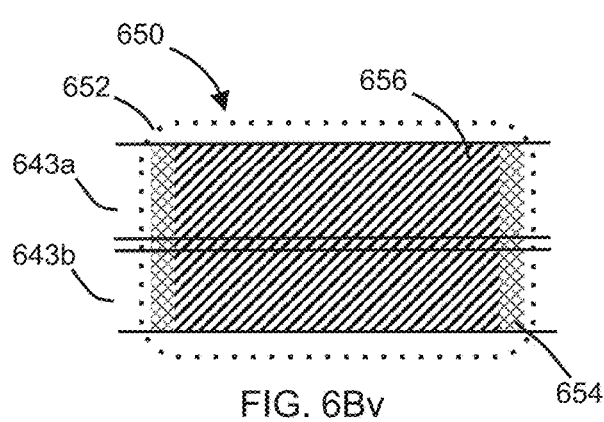
FIG. 6Bv
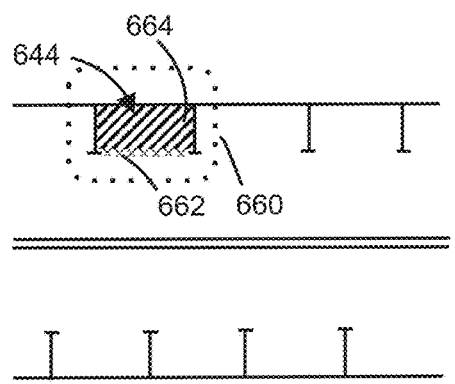
FIG. 6Bvi

1102

| Length | Cell Dimensions |
|---|---|
| 1 | ≤ 5,000km × 5,000km |
| 2 | ≤ 1,250km × 625km |
| 3 | ≤ 156km × 156km |
| 4 | ≤ 39.1km × 19.5km |
| 5 | ≤ 4.89km × 4.89km |
| 6 | ≤ 1.22km × 0.61km |
| 7 | ≤ 153m × 153m |
| 8 | ≤ 38.2m × 19.1m |
| 9 | ≤ 4.77m × 4.77m |
| 10 | ≤ 1.19m × 0.596m |
| 11 | ≤ 149mm × 149mm |
| 12 | ≤ 37.2mm × 18.6mm |

1108

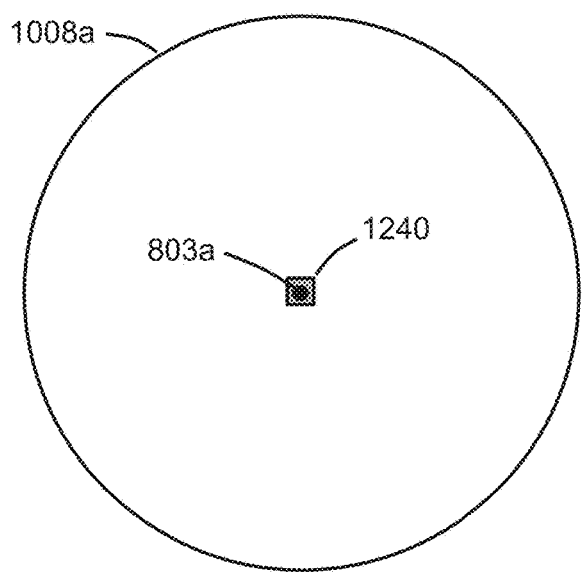
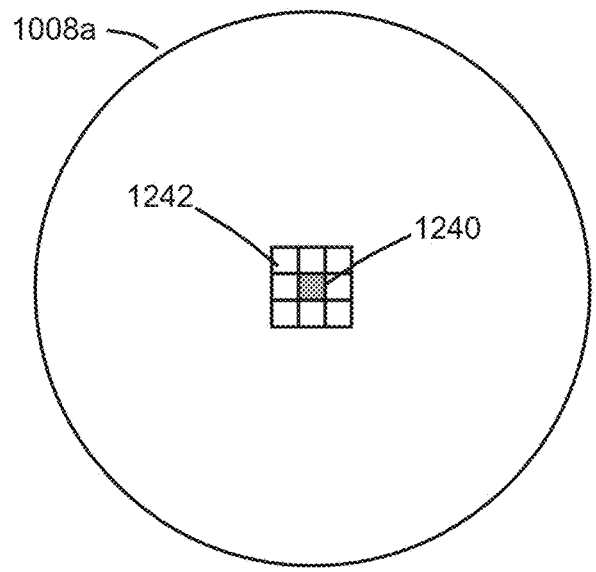
FIG. 12B     FIG. 12C
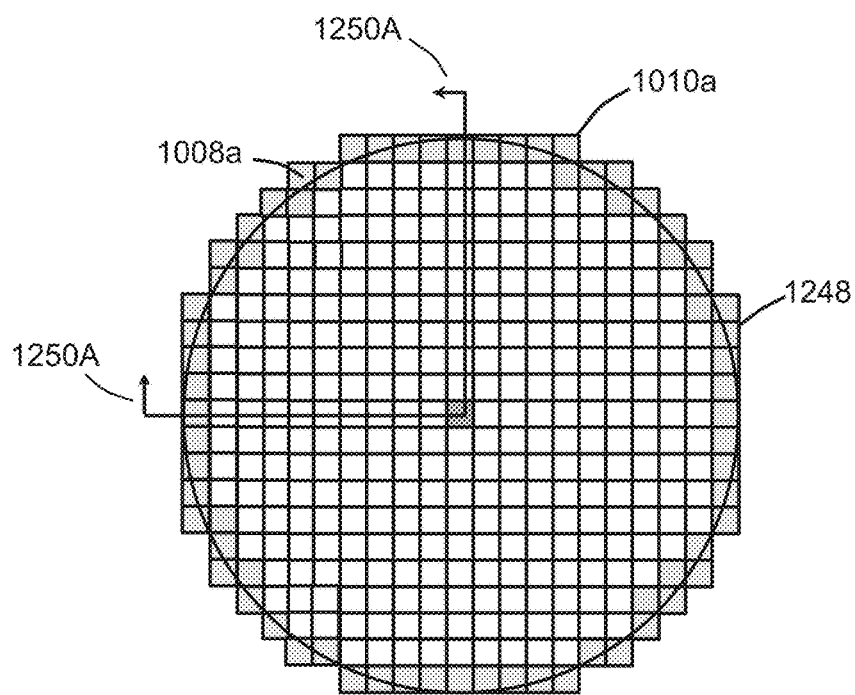
FIG. 12D

1302

| Subzone ID |
| --- |
| 'GeohashString1' |
| 'GeohashString2' |
|  |
|  |
|  |
| 'GeohashStringn' |

| Subzone ID | Boundary Coordinates |
| --- | --- |
| 'GeohashString1' | $(LAT_1, LAT_2), (LONG_1, LONG_2)\ PAIR_1$ |
| 'GeohashString2' | $(LAT_1, LAT_2), (LONG_1, LONG_2)\ PAIR_2$ |
|  |  |
|  |  |
|  |  |
| 'GeohashStringn' | $(LAT_1, LAT_2), (LONG_1, LONG_2)\ PAIR_n$ |

FIG. 13B

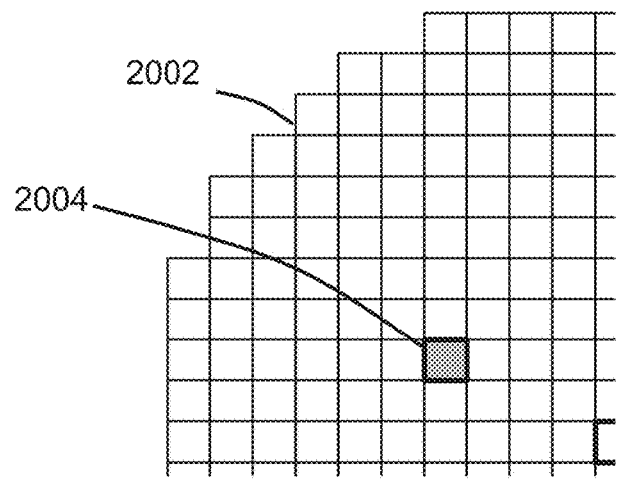
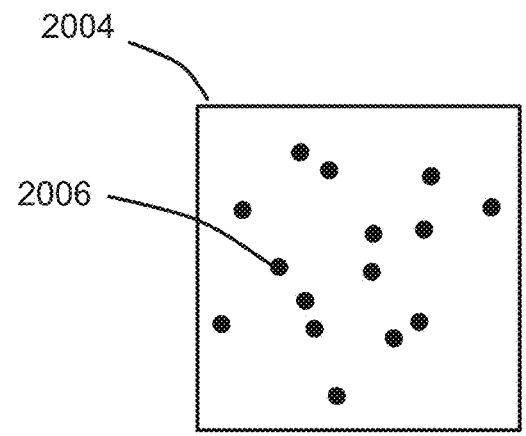
FIG. 20A
FIG. 20B
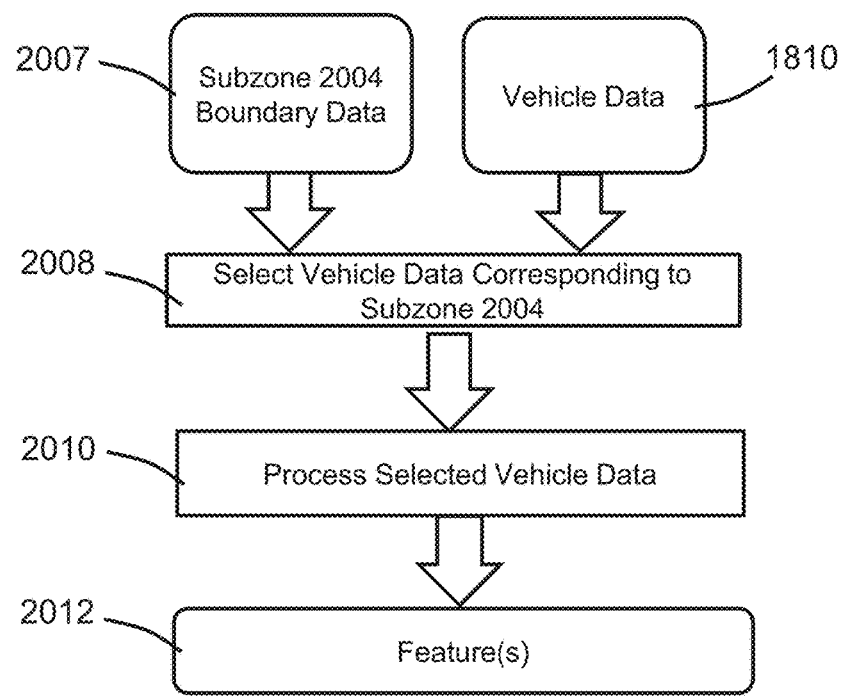
FIG. 20C

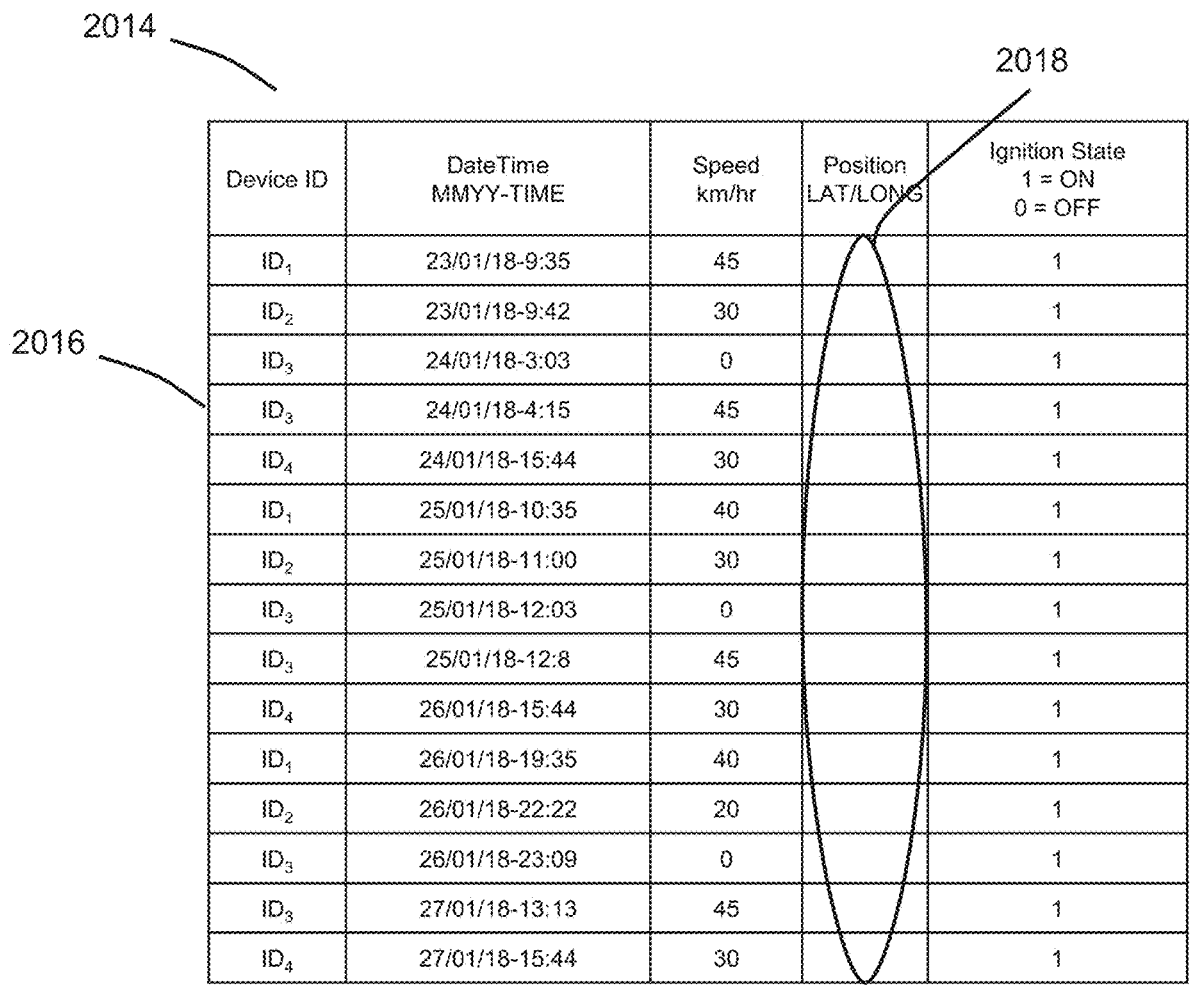

FIG. 20D

| Feature | Value | Feature | Value |
|---|---|---|---|
| Minimum Speed | 0 km/hr | Minimum visits/day | 2 |
| Maximum Speed | 45 km/hr | Maximum Visits/day | 4 |
| Average Speed | 28.7km/hr | Avg. Visits/day | 3 |
| Median Speed | 30km/hr | Median Visits/day | 4 |
| Minimum Ignition | 1 | Minimum Unique Visits/day | 2 |
| Maximum Ignition | 1 | Maximum Unique Visits/day | 4 |
| Total # of Ignitions ON | 15 | Avg. Unique Visits/day | 2.6 |
| Total # of Ignitions OFF | 0 | Median Unique Visits/day | 2 |
| Avg. # of Ignitions | 1 | Total # Vehicle Visits | 4 |
| Ignition Ratio | 0 | Total # Unique Visits | 3.75 |
|  |  | Avg. # of visits/vehicle | 12.75 |

FIG. 20E

| Device ID | DateTime | Speed km/hr | Position LAT/LONG | Ignition State ON = 1/OFF = 0 |
|---|---|---|---|---|
| $ID_2$ | T0 | 40 | LAT/LONG0 | 1 |
| $ID_2$ | T1 | 30 | LAT/LONG1 | 1 |
| $ID_2$ | T2 | 20 | LAT/LONG2 | 1 |
| $ID_2$ | T3 | 60 | LAT/LONG3 | 1 |
| $ID_2$ | T4 | 0 | LAT/LONG4 | 1 |
| $ID_2$ | T5 | 10 | LAT/LONG5 | 1 |
| $ID_2$ | T6 | 15 | LAT/LONG6 | 1 |
| $ID_2$ | T7 | 40 | LAT/LONG7 | 1 |
| $ID_2$ | T8 | 15 | LAT/LONG8 | 1 |
| $ID_2$ | T9 | 0 | LAT/LONG9 | 1 |
| $ID_2$ | T10 | 5 | LAT/LONG10 | 1 |
| $ID_2$ | T11 | 10 | LAT/LONG11 | 1 |
| $ID_2$ | T12 | 5 | LAT/LONG12 | 1 |
| $ID_2$ | T13 | 10 | LAT/LONG13 | 1 |
| $ID_2$ | T14 | 0 | LAT/LONG14 | 0 |

| Zone | Subzone | Features | | | | Class (Vehicle Way/ Not-Vehicle Way) |
|---|---|---|---|---|---|---|
| | | Subzone-related | Zone-related | Subzone-zone-related | Spatial-related | |
| | | F1 ... ... | ... ... ... | ... ... ... | ... ... Fn | |
| 1010a | S₁ | | | | | |
| | S_n | | | | | |
| 1010b | S₁ | | | | | |
| | S_n | | | | | |
| 1010c | S₁ | | | | | |
| | S_n | | | | | |
| 1010d | S₁ | | | | | |
| | S_n | | | | | |
| 1010e | S₁ | | | | | |
| | S_n | | | | | |
| 1010f | S₁ | | | | | |
| | S_n | | | | | |

INTELLIGENT TELEMATICS SYSTEM FOR DEFINING VEHICLE WAYS

RELATED APPLICATIONS

This application claims the benefit under 35 U.S.C. § 119(e) to U.S. Provisional Application Ser. No. 62/829,539, filed on Apr. 4, 2019 and titled INTELLIGENT TELEMATICS SYSTEM FOR PROVIDING TRAFFIC METRICS, which is herein incorporated by reference in its entirety.

BACKGROUND

Traffic data collection and analysis are routinely conducted by road agencies, for example, government organizations responsible for traffic management, road maintenance and/or road network planning. Road agencies may obtain measurements of traffic metrics, (e.g., traffic performance), from traffic data, to understand current traffic conditions at a roadway section of interest, such as a portion of a road or a traffic junction—a location where multiple roads intersect, allowing traffic to change from one road to another (e.g., intersection, roundabout, interchange). Traffic metrics are generally used to ascertain an existing, or to predict a future, need of changes to roadway infrastructure and/or traffic control equipment. Examples of traffic metrics include traffic volume, average vehicle speed, vehicle delay, among others.

Modifications to a roadway network may result from traffic metrics related to traffic flow, driving behaviour, or another traffic/driver information. For example, to increase traffic flow at a heavily congested roadway section an additional lane(s) may be added, to reduce wait times at an intersection control signal timing may be modified, and to deter speeding on a portion of road a traffic calming device, (e.g., a speed bump), may be installed.

Various data collection techniques are employed for collecting traffic data. A first technique includes employment of manual counters positioned near a roadway section of interest, (i.e., people observing traffic, then measuring and manually recording vehicle movement.) For instance, to collect traffic data related to interruption of traffic flow at an intersection, a person/people may time the duration each vehicle is stopped prior to entering the intersection. Such a method is manually intensive and prone to human error.

Another technique for collecting traffic data includes use of sensing equipment. For example, movement sensors, (e.g., pneumatic tubes, video cameras), are temporarily and/or permanently installed near a roadway section of interest to sense vehicle movement and collect traffic data. This technique requires the purchase or rental, installation, and potentially maintenance, of sensing equipment. Extracting traffic data from video footage necessitates image processing which is usually complex and resource intensive.

Yet another technique for collecting traffic data includes use of a GPS tracker device installed onboard a vehicle. Traffic data collected via this technique is limited to the data collected by the particular devices, thus multiple passes through a roadway section of interest are needed to gather a sufficient amount of data for the data to be meaningful. Once collected, data from the devices must be uploaded for analysis/processing.

SUMMARY

According to an embodiment there is provided an intelligent telematics system comprising a plurality of monitoring devices, a first datastore, a processing resource and a network interface for communicatively coupling the plurality of monitoring devices to the first datastore, the intelligent telematics system configured for: transmitting raw vehicle data indicative of vehicle operating conditions from the plurality of monitoring devices to the first datastore, over a period time, receiving the raw vehicle data by the first datastore forming historical vehicle data stored thereby, defining a plurality of zones corresponding to a plurality of sample vehicle ways, each of the plurality of zones comprising a plurality of first contiguous subzones, the plurality of first contiguous subzones for each of the plurality of zones forming a plurality of second contiguous subzones, generating a plurality of features for each of the plurality of second contiguous subzones based on a subset of raw vehicle data selected from the historical vehicle data, generating training data for each of the plurality of second contiguous subzones comprising the plurality of features, and defining a classifier using at least one machine learning technique with the training data, the classifier for classifying a subzone as one of a portion of a vehicle way and other than a portion of a vehicle way.

In an embodiment the raw vehicle data comprises date and time data indicative of a date and time vehicle operating conditions is logged. In an embodiment the subset of raw vehicle data comprises raw vehicle data corresponding to a location within the plurality of zones. In an embodiment the subset of raw vehicle data comprises raw vehicle data corresponding to a position within at least one traffic zone encompassing at least a zone of the plurality of zones. In another embodiment the at least one traffic zone encompasses the plurality of zones.

In an embodiment the intelligent telematics system comprises a first data management system including the first data store and is configured for transmitting, over a period of time, the raw vehicle data from the plurality of monitoring devices to the first data management system forming the historical vehicle data.

In an embodiment the intelligent telematics system comprises at least one monitoring device of the plurality of monitoring devices having at least a sensing module configured for one of sensing or measuring a physical property of an operating condition of a vehicle. In another embodiment the at least a sensing module is configured for one of sensing or measuring one of the following physical properties of an operating condition of a vehicle: position, speed, direction, rates of acceleration or deceleration, ignition state, external ambient temperature, transmission and engine performance. In another embodiment the at least one monitoring device comprises a global navigation satellite system technology for determining the geographic position of a vehicle. In another embodiment the global navigation satellite system technology includes Global Positioning System technology.

In an embodiment the at least a monitoring device of the plurality of monitoring devices communicates with a vehicle communication port. In another embodiment the vehicle communication port includes an OBDII port. In yet another embodiment the at least a monitoring device of the plurality of monitoring devices comprises a wireless communication interface for communicating with a wireless vehicle communication port. In yet another embodiment the at least a monitoring device of the plurality of monitoring devices communicates with one of an external device or system that detects operating conditions of a vehicle. In an embodiment vehicle operating conditions comprises at least one of position, speed, and ignition state of a vehicle, the ignition state indicating a state of one of ON or OFF. In an embodiment each training data comprises an indication the second contiguous subzone as one of a vehicle way class or a not-vehicle way class.

In an embodiment the intelligent telematics system is configured for defining a plurality of zones corresponding to a plurality of sample vehicle ways, for at least a zone, comprises: obtaining geographic coordinate data indicating a location of a reference point proximate the sample vehicle way, defining a reference area relative to the location of the reference point for encompassing the sample vehicle way, and partitioning the reference area into the plurality of first contiguous subzones. In an embodiment partitioning the reference area comprises partitioning all portions of the reference area into the plurality of first contiguous subzones. In another embodiment the reference area is defined at a same relative location to the reference point proximate the sample vehicle way. In yet another embodiment wherein the reference area is defined at a distance substantially 25 m radially from the reference point. In an embodiment each second contiguous subzone of the plurality of second contiguous subzones is defined by latitude and longitude pairs. In an embodiment partitioning the reference area into the plurality of first contiguous subzones comprises subdividing the reference area into a grid of latitude and longitude lines. In another embodiment partitioning the reference area into the plurality of first contiguous subzones comprises subdividing the reference area into the plurality of first contiguous subzones according to a hierarchical geospatial indexing system. In an embodiment the hierarchical geospatial indexing system is Geohash. In embodiment the Geohash precision is substantially 9. In another embodiment the hierarchical geospatial indexing system is H3. In an embodiment partitioning the reference area into the plurality of first contiguous subzones comprises defining a first contiguous subzone encompassing the reference point and building a grid of first contiguous subzones therefrom until all portions of the reference area are partitioned by the grid of first contiguous subzones.

In an embodiment the vehicle data includes the subset of raw vehicle data or the subset of raw vehicle data and data interpolated therefrom. In another embodiment the data interpolated from the subset of raw vehicle data is dependent on the dimensions of each of the plurality of second contiguous subzones. In an embodiment the intelligent telematics system is configured for filtering data from the vehicle data indicative at least one of an outlier or duplicate value.

In an embodiment the intelligent telematics system is configured for generating a plurality of features for each of the plurality of second contiguous subzones based on a subset of raw vehicle data, for at least a second contiguous subzone, which further includes generating subzone-related features from a first subset of vehicle data corresponding to a location within the second contiguous subzone.

In an embodiment the subzone-related features are selected from the group of: minimum vehicle speed, maximum vehicle speed, average vehicle speed, median vehicle speed, standard deviation of vehicle speed, minimum ignition, maximum ignition, total number of ignitions on, total number of ignitions off, average number of ignitions, ignition ratio, minimum number of vehicle visits/day, maximum number of vehicle visits/day, average number of vehicle visits/day, median number of vehicle visits/day, standard deviation of number of vehicle visits/day, minimum unique number of vehicle visits/day, maximum unique number of vehicle visits/day, median unique number of vehicle visits/day, standard deviation of unique number of vehicle visits/day, average unique number of vehicle visits/day, total number of vehicle visits, total number of unique vehicle visits, and average number of visits/vehicle.

In an embodiment the intelligent telematics system is configured for generating the plurality of features including generating subzone-related features from the first subset of vehicle data and a second subset of vehicle data including vehicle data for a same vehicle temporally subsequent thereto. In another embodiment the subzone-related features are selected from the group of: average time to park, minimum time to park, maximum time to park, median time to park, and standard deviation of time to park.

In an embodiment the intelligent telematics system is configured for generating the plurality of features which includes generating subzone-related features from the first subset of vehicle data and a third subset of vehicle data including vehicle data for a same vehicle temporally preceding and subsequent thereto. In an embodiment the subzone-related features are selected from the group of: average dwell time, minimum dwell time, maximum dwell time, median dwell time, and standard deviation of dwell time.

In an embodiment the intelligent telematics system is configured for generating a plurality of features for each of the plurality of second contiguous subzones based on a subset of raw vehicle data comprising generating zone-related features from a fourth subset of vehicle data corresponding to a position within a corresponding zone or from a portion of corresponding subzone-related features. In an embodiment the zone-related features are selected from the group of: zone minimum ignition off, zone maximum ignition off, zone average vehicle speed, zone maximum vehicle speed, zone minimum vehicle speed, zone average number of unique visits/day, zone minimum number of unique visits/day, zone maximum number of unique visits/day, zone average median number of unique visits/day, and zone total average number of unique visits/day.

In an embodiment the zone-related features are generated from the portion of corresponding subzone-related features and are selected from the group of: zone average time to park, zone maximum time to park, zone minimum time to park, zone maximum dwell time, zone minimum dwell time, zone median dwell time, zone average dwell time, zone minimum number of unique visits, zone average number of unique visits, zone maximum number of unique visits, zone average total number of visits, zone maximum total number of visits, and zone minimum total number of visits.

In an embodiment the zone-related features are generated from the fourth subset of vehicle data instances corresponding to a position within a corresponding zone and are selected from the group of: zone total number of visits and zone total number of unique visits.

In an embodiment the intelligent telematics system is configured for generating a plurality of features for each of the plurality of second contiguous subzones based on a subset of raw vehicle data which comprises generating subzone-zone-related features from a relationship of a portion of the plurality of corresponding subzone-related features to a portion of the corresponding zone-related features.

In an embodiment the subzone-zone-related features are selected from the group of: minimum vehicle speed ratio, average vehicle speed ratio, maximum vehicle speed ratio, minimum ignition off ratio, maximum ignition off ratio, maximum dwell time ratio, minimum dwell time ratio, average median dwell time ratio, average dwell time ratio, minimum time to park ratio, average time to park ratio, maximum time to park ratio, minimum number of unique vehicle visits ratio, maximum number of unique vehicle visits ratio, average number of unique vehicle visits ratio, total number of vehicle unique visits ratio, minimum unique number of vehicle visits/day ratio, maximum unique number of vehicle visits/day ratio, average unique number of vehicle visits/day ratio, total unique number of vehicle visits/day ratio, average median unique number of vehicle visits/day ratio, minimum total number of vehicle visits ratio, maximum total number of vehicle visits ratio, average total number of vehicle visits ratio, and total number of vehicle visits ratio.

In an embodiment the intelligent telematics system is configured for, for each second contiguous subzone of the plurality of second contiguous subzones, obtaining spatial relationship data for each thereof to a corresponding zone and generating at least one feature from the spatial relationship data. In an embodiment the spatial relationship data is indicative of the distance between the second contiguous subzone and a centre point of the corresponding zone. In an embodiment the spatial relationship data is indicative of the distance between a centre point of the second contiguous subzone and a centre point of the corresponding zone. In another embodiment the spatial relationship data is indicative of the number of adjacent second contiguous subzones to the second contiguous subzone. In an embodiment the number of adjacent second contiguous subzones to the second contiguous subzone is the number of neighbours of a Geohash.

In an embodiment the intelligent telematics system is configured for, for two or more zones of the plurality of zones having one or more common second contiguous subzones, associating the one or more common second contiguous subzones with a unique zone of the two or more zones. In an embodiment associating each of the one or more common second contiguous subzones with a unique zone comprises calculating a distance between each second contiguous subzone of the one or more common second contiguous subzones and a location of a centre point of the two or more zones and assigning the one or more common second contiguous subzones to the zone of which the distance is shortest. In an embodiment the same relative location to the reference point is defined by classifier data associated with the classifier.

In an embodiment the first contiguous subzone dimensions are defined by the classifier data. In an embodiment the Geohash precision is defined by the classifier data. In another embodiment the spatial relationship data is indicative of the number of adjacent second contiguous subzones to a second contiguous subzone having vehicle data corresponding to a location therein. In an embodiment the spatial relationship data is indicative of the number of neighbours of a Geohash having vehicle data corresponding to a location therein.

BRIEF DESCRIPTION OF DRAWINGS

Embodiments of the invention are now described by way of non-limiting example and are illustrated in the following figures in which like reference numbers indicate like features, and wherein:

FIG. 6Aii is a simplified diagram of an exemplary type of vehicle way.

FIG. 6Aiii is a simplified diagram of an exemplary type of vehicle way.

FIG. 6Aiv is a simplified diagram of an exemplary type of vehicle way.

FIG. 6Av is a simplified diagram of an exemplary type of vehicle way.

FIG. 6Avi is a simplified diagram of an exemplary type of vehicle way.

FIG. 6Bi is a conceptual diagram of a specific and non-limiting example of a zone encompassing the vehicle way of FIG. 6Ai.

FIG. 6Bii is a conceptual diagram of a specific and non-limiting example of a zone encompassing the vehicle way of FIG. 6Aii.

FIG. 6Biii is a conceptual diagram of a specific and non-limiting example of a zone encompassing the vehicle way of FIG. 6Aiii.

FIG. 6Biv is a conceptual diagram of a specific and non-limiting example of a zone encompassing the vehicle way of FIG. 6Aiv.

FIG. 6Bv is a conceptual diagram of a specific and non-limiting example of a zone encompassing the vehicle way of FIG. 6Av.

FIG. 6Bvi is a conceptual diagram of a specific and non-limiting example of a zone encompassing the vehicle way of FIG. 6Avi.

FIG. 12B is a simplified diagram of a reference area, a reference point and a Geohash cell to which the reference point was mapped.

FIG. 12C is a simplified conceptual diagram of a centre cell and its 8 closest neighbouring cells.

FIG. 12D is a simplified conceptual diagram of a reference area completely subdivided into a grid of contiguous Geohash cells.

FIG. 13A is a simplified conceptual diagram of exemplary subzone data.

FIG. 13B is a simplified conceptual diagram of other exemplary subzone data.

FIG. 20A is a conceptual diagram of a portion of a zone.

FIG. 20B enlarged view of a subzone.

FIG. 20C is a simplified functional block diagram of a function that may be implemented for generating at least one feature.

FIG. 20D is a table representing an example subset of vehicle data instances corresponding to a position within a subzone.

FIG. 20E is a table of exemplary features and feature values based on the subset of vehicle data instances of FIG. 20D.

FIG. 25B is a table representing training data including subzone ID, a plurality of features for each associated subzone, and a class label.

DESCRIPTION

Figure 1A:
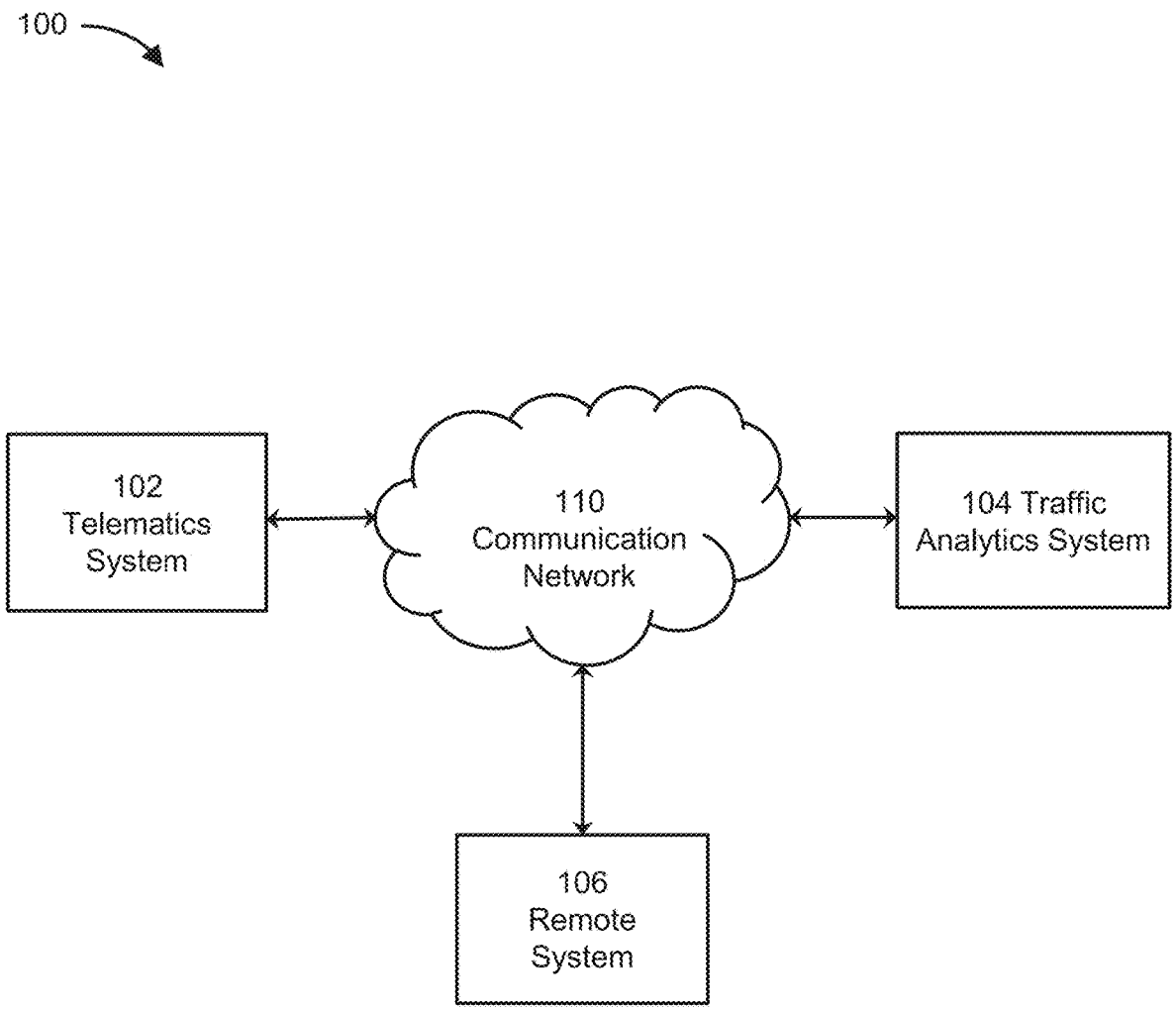
FIG. 1A is a simplified diagram of an exemplary network configuration with which some embodiments may operate.

Telematics is a method of monitoring a vehicle using an onboard monitoring device for gathering and transmitting vehicle operation information. For instance, fleet managers employ telematics to have remote access to real time operation information of each vehicle in a fleet. A vehicle may include a car, truck, recreational vehicle, heavy equipment, tractor, snowmobile or other transportation asset. A monitoring device may detect environmental operating conditions associated with a vehicle, for example, outside temperature, attachment status of an attached trailer, and temperature inside an attached refrigeration trailer. A monitoring device may also detect operating conditions of an associated vehicle, such as position, (e.g., geographic coordinates), speed, and acceleration, among others.

In an exemplary telematics system, raw vehicle data, including vehicle operation information indicative of a vehicle's operating conditions, is transmitted from an onboard monitoring device to a remote subsystem, (e.g., server). Raw vehicle data may include information indicating the identity of the onboard monitoring device (e.g., device identifier, device ID) and/or the identity of the associated vehicle the onboard monitoring device is aboard. Specific and non-limiting examples of raw vehicle data includes device ID data, position data, speed data, ignition state data, (e.g. indicates whether vehicle ignition is ON or OFF), and date and time data indicative of a date and time vehicle operating conditions were logged by the monitoring device. Raw vehicle data transmitted and collected over a period of time forms historical vehicle data which may be stored by the remote subsystem for future analysis of a single vehicle or fleet performance. In practise, a single fleet may comprise many vehicles, and thus large volumes of raw vehicle data (e.g., terabytes, petabytes, exabytes . . . ) may be transmitted to, and stored by, a remote subsystem. Telematics systems are discussed in further detail below with reference to FIGS. 1A, 1B, 1C and FIG. 2.

Processing historical vehicle data corresponding to positions within a roadway section of interest may provide an alternative technique for obtaining traffic data and/or traffic metrics that avoid some of the drawbacks of existing techniques described in the foregoing. For example, a method for obtaining traffic data and/or traffic metrics from historical vehicle data may include obtaining a location (e.g., boundary coordinates) of a roadway section of interest. For instance, a road agency may store geographic data describing a roadway system comprising the roadway section of interest on a publicly accessible server, such as a server accessible via the Internet. The geographic data may be in the form of a geospatial file (e.g., shape file (.shp), GeoJSON (.geojson)), or other file format, from which geographical coordinates of boundaries delineating roads forming the roadway system may be extracted. In this example, a geospatial file including boundary coordinates of the roadway section of interest is accessed, and latitude, longitude (Lat/Long) coordinates of a plurality of points defining the boundaries thereof are extracted from the geospatial file. Next, a plurality of raw vehicle data instances corresponding to a position within boundaries of the roadway section of interest are selected from the historical vehicle data and processed for providing traffic data and/or traffic metrics relating to the roadway section of interest.

In an exemplary implementation, obtaining traffic data and/or traffic metrics for a roadway section of interest from historical vehicle data includes obtaining and processing vehicle speed data for determining an average speed of vehicles traversing a roadway section of interest. In this example, the roadway section of interest is in the form of a portion of a road (i.e., a road portion.) Firstly, the location of the road portion is determined. For instance, geographical coordinates of boundaries of the road portion are extracted, for example, from a shape file (.shp) or a GeoJSON file (.geojson).

As described in the foregoing, historical vehicle data comprises raw vehicle data instances corresponding to a plurality of vehicles which may be indicative of device ID, vehicle position, speed, and date & time the vehicle position and speed were logged. A subset of raw vehicle data instances corresponding to a location within the boundaries of the road portion are selected from historical vehicle data and a cumulative speed of all vehicles that have traversed the road portion are divided by the number thereof to provide an average speed traffic metric. This is only one method of obtaining traffic data and/or traffic metrics from historical vehicle data and is not intended to limit embodiments to this example.

In practise, locations and/or boundaries of roadway sections of interest are not readily available. For instance, some geographic information systems (GISs), (e.g., geographical information systems available from ESRI® of Redlands, Calif., USA), and web mapping services (e.g., Google Maps, developed by Google® of Mountain View, Calif., USA), among others, have compiled geospatial information describing locations, (e.g., boundary information) of roadway systems. However, such systems and services have invested significant resources to do so. For instance, high volumes of different data types are collected via a variety of data collection techniques. This data is then processed to provide geospatial information. Some exemplary data collection techniques include aerial and satellite image capture, video recording, Light Detection and Ranging (LiDAR), road surveying, and crowdsourcing.

In general, implementing similar techniques for obtaining roadway section locations would be time consuming, complex, computationally intensive, and costly. Some web mapping services, (e.g., Google Maps) may provide geospatial roadway-related information, such as Lat/Long coordinates of road boundaries, via interactive maps. However, such functionality is not designed to enable easy extraction of boundary information in large quantities and/or in a suitable machine-readable data format. Alternatively, roadway boundary information may be available in a suitable machine-readable data format a GIS, for example, however, at a cost.

Described herein are alternative techniques for defining locations of roadway sections that may avoid some issues of known techniques described in the foregoing. Upon definition of a location of a roadway section of interest, related traffic data and/or traffic metrics related thereto may be determined by processing raw vehicle data instances corresponding to positions within a roadway section of interest, as described above.

In general, techniques described herein may be used to determine a location of any area frequently used by vehicles. Such areas are discussed in further detail below in reference to FIGS. 6Ai-6Avi and FIGS. 6Bi-6Bvi.

Described herein are various embodiments of systems and methods for defining an area frequently used by vehicles, (i.e., an area on the Earth's surface repeatedly employed by vehicles), hereinafter referred to as a 'vehicle way'. A vehicle way may include an area used by vehicles for movement and/or parking. Specific and non-limiting examples of vehicle ways include traffic-designated areas, such as by road agencies, for channeling traffic flow (e.g., roads, traffic junctions), and for parking (e.g., street parking spaces, commercial parking lots). Vehicle ways may also include areas that are not traffic-designated areas. For instance, areas that have not been created and/or maintained by a road agency or commercial entity for vehicle use, nonetheless are repeatedly used thereby. For example, a vehicle way includes an ad hoc vehicle way. An example of an ad hoc vehicle way includes a beaten path created by frequent flow of vehicles for accessing a natural attraction, such as a lake, river, or forested area, for which no access road was available. Another example of an ad hoc vehicle way includes a portion of a field frequently used to accommodate overflow vehicles of a nearby parking lot.

Figure 6A:
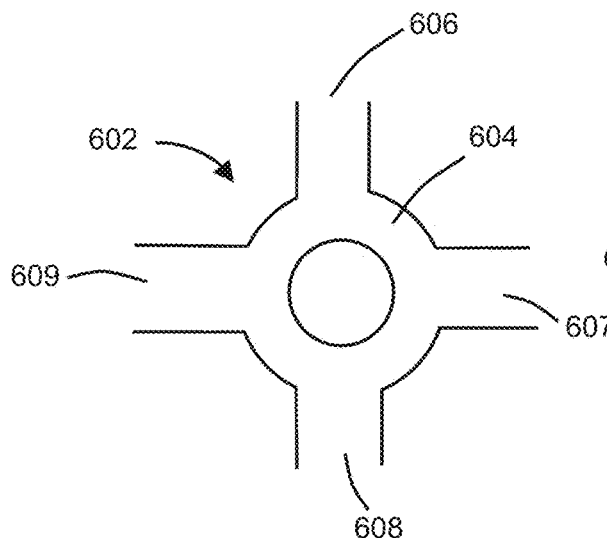
FIG. 6Ai is a simplified diagram of an exemplary type of vehicle way.
Figure 6A:
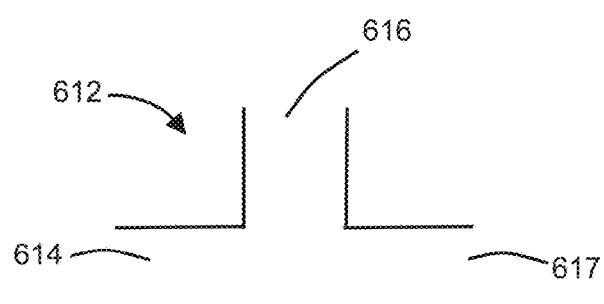
Figure 6A:
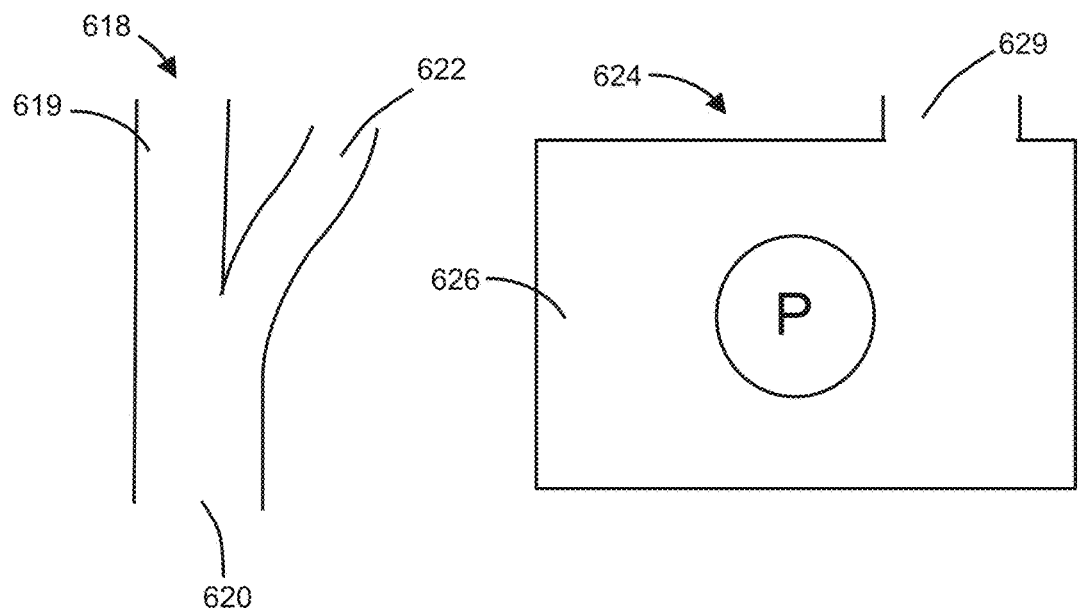
Figure 6A:
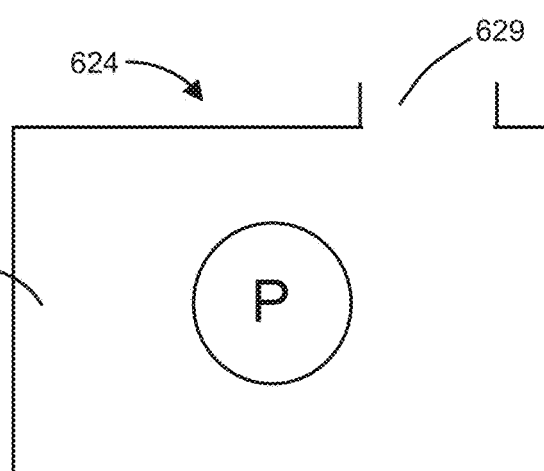

Illustrated in FIGS. 6Ai-6Avi are simplified diagrams of various exemplary types of vehicle ways, including: circular traffic junction 602, (i.e., roundabout) having circular road segment 604 and road segments 606, 607, 608 and 609 for channeling vehicles therethrough; three way traffic junction 612 (i.e., intersection) having road segments 614, 616, and 617 for channeling vehicles therethrough; traffic junction 618 (i.e., highway off-ramp) having road segments 619, 620, and 622 for channeling vehicles therethrough; parking lot 624, having parking area 626 and entry/exit 629 for channelling vehicles in and out thereof; road portion 650 having opposing lanes 643a and 643b; and on-street parking space 644. The exemplary vehicle ways of FIGS. 6Ai-6Avi are provided for example purposes only and embodiments are not intended to be limited to the examples described herein.

A defined vehicle way may be described by any data format provided the data indicates the location (e.g., the unique location of the vehicle way on the Earth's surface) occupied thereby. For example, a vehicle way may be defined by a plurality of points defining the boundaries of the vehicle way. The geographic coordinates of the plurality of points may be, for example, stored in a text file, such as a comma-separated values (.csv) file. In another example, boundaries may be described in a geospatial file, for instance a shape file (.shp) or a GeoJSON file (.geojson), from which geographic coordinates of vehicle way boundaries may be obtained. In yet another example, the location occupied by a vehicle way may be described in accordance with a geospatial indexing system, such as Geohash. Geohash is a known public domain hierarchical geospatial indexing system which uses a Z-order curve to hierarchically subdivide the latitude/longitude grid into progressively smaller cells of grid shape. For instance, a Geohash string indicates a unique geographical area (e.g., cell). A vehicle way may be described by data indicative of a plurality of Geohash strings indicating the Geohash cells occupied by the vehicle way. A vehicle way may be described in numerous data formats and embodiments are not intended to be limited to examples described herein.

Some embodiments described herein relate to techniques for defining a vehicle way comprising processing data indicative of vehicle operation conditions of a plurality of vehicles that have travelled within a known area, that is, an area of which the location thereof is defined. Processing such data may provide an indication as to whether the known area is a portion of the vehicle way. In other words, processing such data may provide an indication as to whether the vehicle way occupies the known area.

Processing data may also include processing other data indicative of vehicle operation conditions of another plurality of vehicles that have travelled within other known areas proximate the known area. Furthermore, processing data may also include processing spatial relationship data of the known area to other known areas proximate thereto.

Some embodiments described herein relate to defining a vehicle way by defining a relationship between vehicle operating conditions of vehicles that have operated proximate known areas and the likelihood the known areas are portions of a vehicle way.

Some embodiments described herein relate to techniques for defining a vehicle way using machine learning techniques using historical vehicle data, (e.g., raw vehicle data), and/or data derived therefrom to define the location of the vehicle way.

In example implementations, a traffic analytics system may be configured to access historical vehicle data associated with known areas and define one or more classification models that are related to operating conditions of corresponding vehicles, and then operate in accordance with the one or more models. In general, each such classification model may receive as input, data (i.e., features), derived from historical vehicle data related to vehicles that have operated within a known area, within a plurality of known areas, and a spatial relationship of the known area to the other known areas, and output an indication the known area is a portion of a vehicle way.

As described in the foregoing, a vehicle way includes areas frequently used and/or employed by vehicles. The phrases 'frequently used' and 'repeatedly employed' are relative to the time period of logging of the historical vehicle data. For example, data (i.e., features), derived from historical vehicle data related to vehicles that have travelled within a known area are input to a classification model for use thereof. However, if there is little raw vehicle data corresponding to a vehicle way of interest within the historical vehicle data, the output of the classifier may not provide meaningful data when applied for defining the vehicle way of interest.

Illustrated in FIG. 1A is a simplified diagram of an exemplary network configuration 100 with which some embodiments may operate. Network configuration 100 includes telematics system 102, traffic analytics system 104, remote system 106, and communication network 110. Communication network 110 may be communicatively coupled to telematics system 102, traffic analytics system 104, and remote system 106, enabling communication therebetween.

Figure 1B:
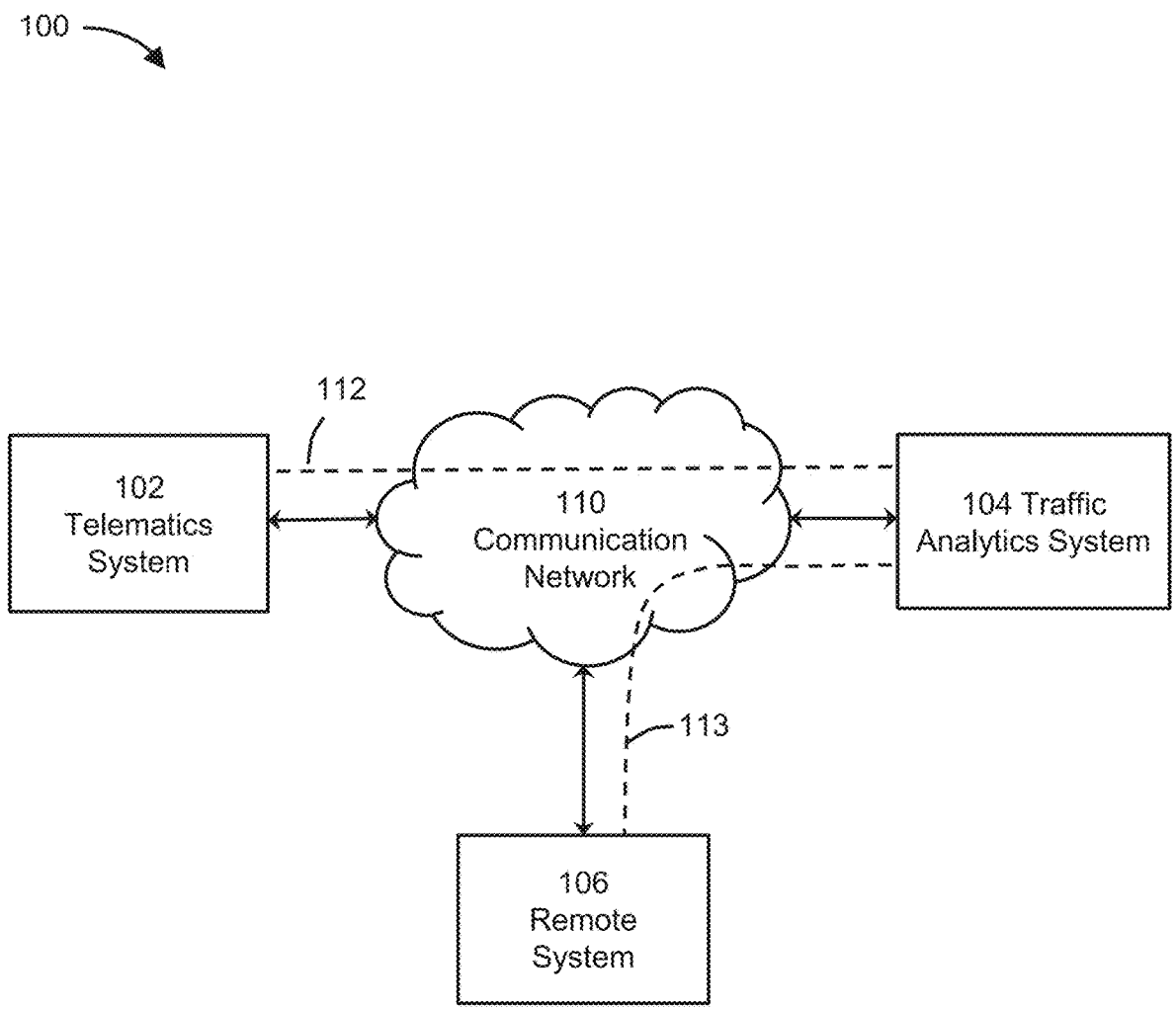
FIG. 1B is a simplified diagram of the exemplary network configuration of FIG. 1A illustrating communication paths.

For example, traffic analytics system 104 may communicate with telematics system 102, and remote system 106 for receiving historical vehicle data or a portion thereof via communication network 110. FIG. 1B is a simplified diagram of network configuration 100 illustrating communication path 112 between traffic analytics system 104 and telematics system 102 and communication path 113 between traffic analytics system 104 and remote system 106.

Figure 1C:
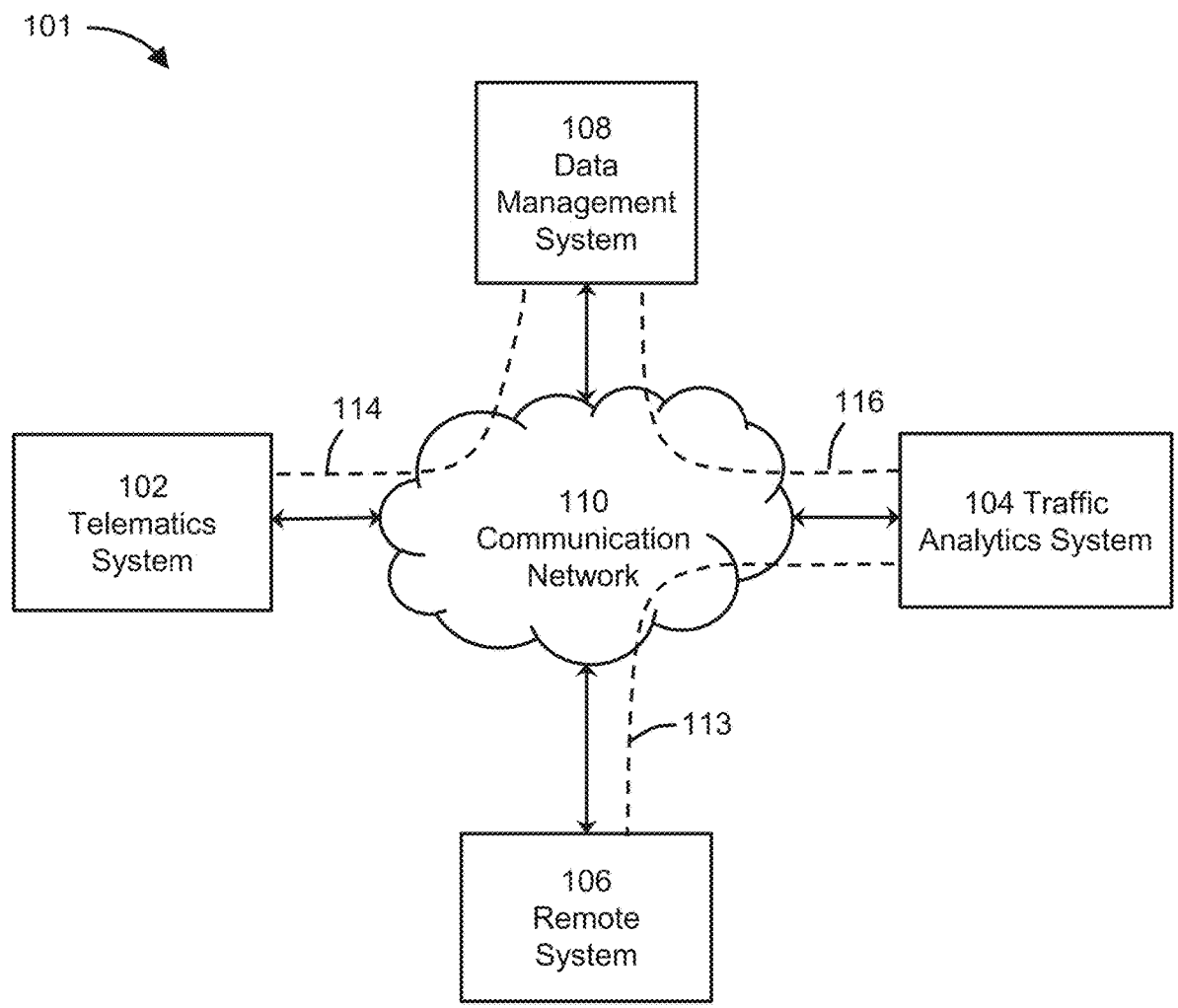
FIG. 1C is a simplified diagram of another exemplary network configuration with which some embodiments may operate illustrating communication paths.

FIG. 1C is a simplified diagram of another exemplary network configuration 101 with which some embodiments may operate. Network configuration 101 includes telematics system 102, traffic analytics system 104, remote system 106, data management system 108 and communication network 110. Communication network 110 may be communicatively coupled to telematics system 102, traffic analytics system 104, remote system 106, and data management system 108, enabling communication therebetween.

For example, telematics system 102 may transmit raw vehicle data and/or historical vehicle data to data management system 108 for the storage thereof, as illustrated by communication path 114. Traffic analytics system 104 may be configured for communicating with data management system 108, for receiving historical vehicle data or a portion thereof via communication network 110, as illustrated by communication path 116. Traffic analytics system 104 may also be configured for communicating with remote system 106.

Remote system 106 may be another telematics system from which traffic analytics system 104 receives historical vehicle data. Alternatively, remote system 106 may store historical vehicle data collected by one or more telematics systems and/or similar vehicle monitoring systems.

Alternatively, remote system 106 may provide external data to traffic analytics system 104. For example, remote system 106 is a map service provider that provides geospatial information regarding roadway systems, traffic control equipment, and/or jurisdictional boundary information, among other geospatial information to traffic analytics system 104.

In yet another example, remote system 106 may be a customer system to which traffic analytics system 104 transmits output data in the form of raw data, a web page, or in another data format.

Communication network 110 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 110 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 110 may take other forms as well.

Figure 2:
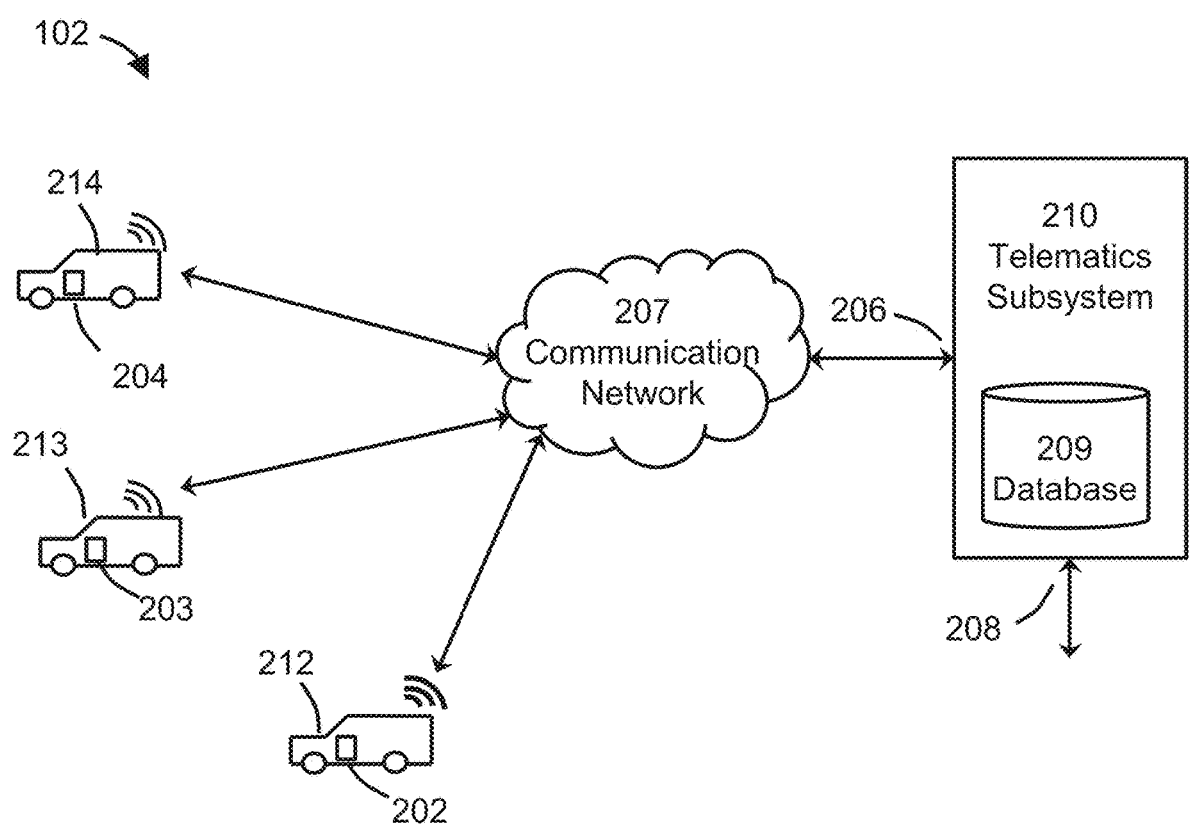
FIG. 2 is a simplified block diagram of an exemplary telematics system.

Illustrated in FIG. 2 is a simplified block diagram of an exemplary telematics system for gathering and storing vehicle operation information. Telematics system 102 comprises telematics subsystem 210 (e.g., server) having a first network interface 206 and onboard monitoring devices 202, 203, and 204 communicatively coupled therewith via communication network 207.

Communication network 207 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 207 may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 207 may take other forms as well.

Telematics system 102 may comprise another network interface 208 for communicatively coupling to another communication network, such as communication network 110. Telematics subsystem 210 may comprise a plurality of servers, datastores, and other devices, configured in a centralized, distributed or other arrangement.

Also shown in FIG. 2 are vehicles 212, 213 and 214, each thereof having aboard the onboard monitoring devices 202, 203, and 204, respectively. A vehicle may include a car, truck, recreational vehicle, heavy equipment, tractor, snowmobile, or other transportation asset. Onboard monitoring devices 202-204 may transmit raw vehicle data associated with vehicles 212-214. Raw vehicle data transmitted and collected over a period of time forms historical vehicle data which may be stored by remote subsystem 210.

In practise, a monitoring device is associated with a particular vehicle. For example, during configuration of monitoring devices 202-204, each thereof may be assigned a unique device ID that is uniquely associated with a vehicle information number (VIN) of vehicles 212-214, respectively. This enables an instance of received raw vehicle data to be associated with a particular vehicle. As such, vehicle-specific raw vehicle data may be discernable among other raw vehicle data in the historical vehicle data.

Three monitoring devices are described in this example for explanation purposes only and embodiments are not intended to be limited to the examples described herein. In practise, a telematics system may comprise many vehicles, such as hundreds, thousands and tens of thousands or more. Thus, huge volumes of raw vehicle data may be received and stored by remote telematics subsystem 210.

In general, monitoring devices comprise sensing modules configured for sensing and/or measuring a physical property that may indicate an operating condition of a vehicle. For example, sensing modules may sense and/or measure a vehicle's position, (e.g., GPS coordinates), speed, direction, rates of acceleration or deceleration, for instance, along the x-axis, y-axis, and/or z-axis, altitude, orientation, movement in the x, y, and/or z direction, ignition state, transmission and engine performance, among others. One of ordinary skill in the art will appreciate that these are but a few types of vehicle operating conditions that may be detected.

Monitoring device 202 may comprise a sensing module for determining vehicle position. For instance, the sensing module may utilize Global Positioning System (GPS) technology (e.g., GPS receiver) for determining the geographic position (Lat/Long coordinates) of vehicle 212. Alternatively, the sensing module utilizes another a global navigation satellite system (GNSS) technology, such as, GLONASS or BeiDou. Alternatively, the sensing module may further utilize another kind of technology for determining geographic position. In addition, sensing module may provide other vehicle operating information, such as speed.

Alternatively, vehicle position information may be provided according to another geographic coordinate system, such as, Universal Transverse Mercator, Military Grid Reference System, or United States National Grid.

In general, a vehicle may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

Monitoring device 202 may comprise a monitoring module operable to communicate with a data/communication bus of vehicle 212. Monitoring module may communicate via a direct connection, such as, electrically coupling, with a data/communication bus of vehicle 212 via a vehicle communication port, (e.g., diagnostic port/communication bus, OBDII port). Alternatively, monitoring module may comprise a wireless communication interface for communicating with a wireless interface of the data/communication bus of vehicle 212. Optionally, a monitoring module may communicate with other external devices/systems that detect operating conditions of the vehicle.

Monitoring device 202 may be configured to wirelessly communicate with telematics subsystem 210 via a wireless communication module. In some embodiments, monitoring device 202 may directly communicate with one or more networks outside vehicle 212 to transmit data to telematics subsystem 210. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to telematics subsystem 210. The raw vehicle data may be transmitted at predetermined time intervals, (e.g. heartbeat), intermittently, and/or according to other predefined conditions. Raw vehicle data transmitted from monitoring devices 202-204 may include information indicative of device ID, position, speed, ignition state, and date and time operating conditions are logged, for instance, in an onboard datastore. One of ordinary skill in the art will appreciate that raw vehicle data may comprise data indicative of numerous other vehicle operating conditions. Raw vehicle data may be transmitted from a monitoring device when a vehicle is moving, stationary, and during both ON and OFF ignition states.

In an exemplary implementation, raw vehicle data received and stored by a subsystem over a period of time forms historical vehicle data. In an exemplary implementation, historical vehicle data may be stored by telematics subsystem 210 in a database, such as database 209, as shown. A period of time may include, for example, 3 months, 6 months, 12 months, or another duration of time.

Traffic Analytics System

Figure 3A:
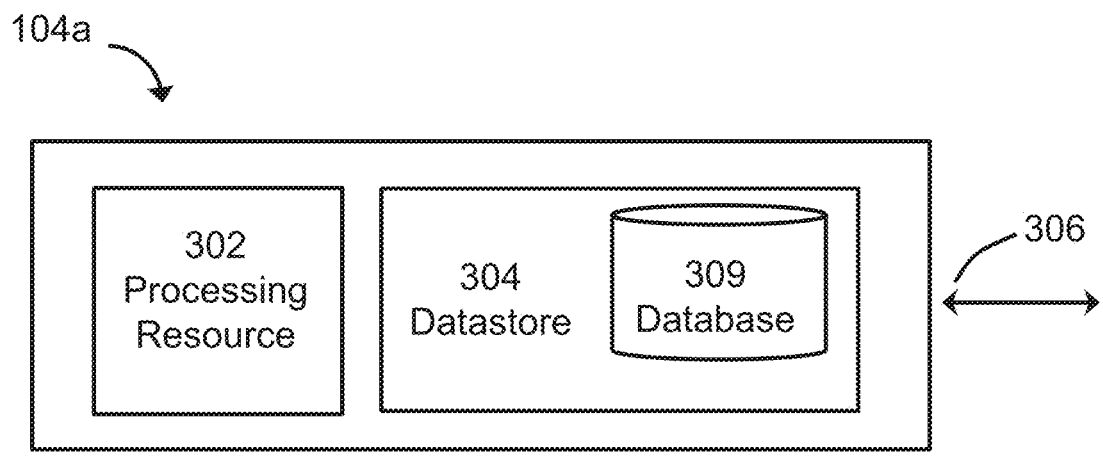
FIG. 3A is a simplified block diagram of an exemplary traffic analytics system according to an embodiment.
Figure 3B:
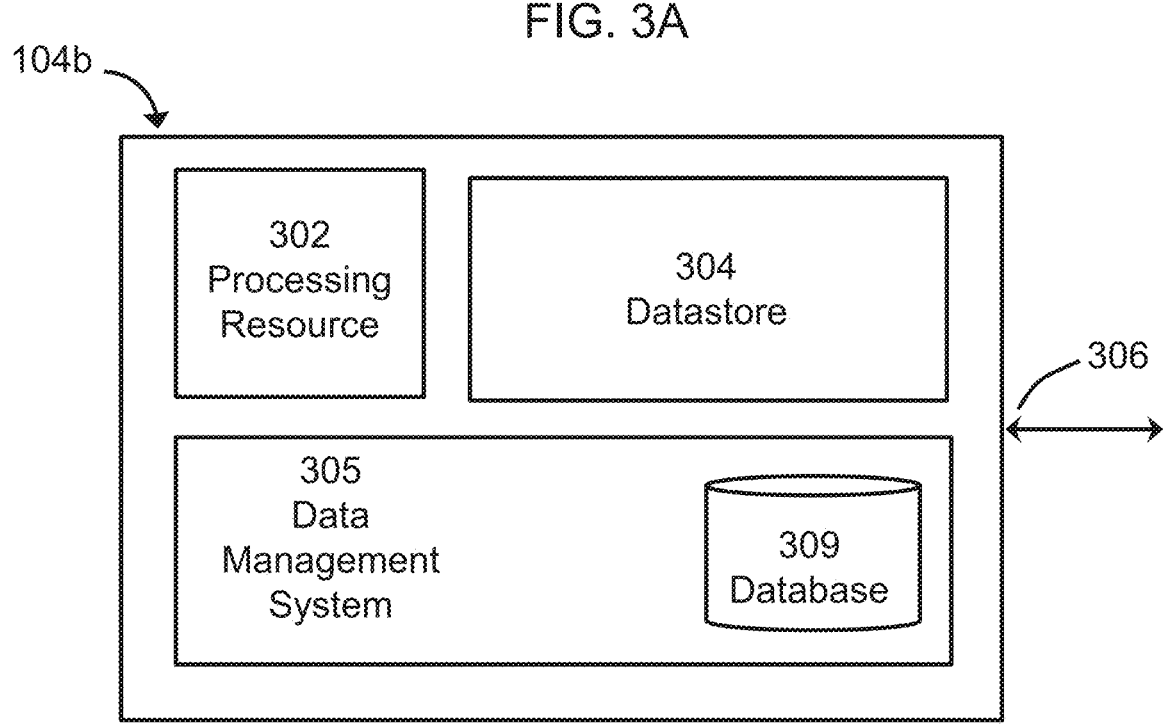
FIG. 3B is a simplified block diagram of another exemplary traffic analytics system comprising a data management system according to an embodiment.

Illustrated in FIG. 3A and FIG. 3B there are two exemplary traffic analytics systems 104 including traffic analytics system 104a and traffic analytics system 104b, as shown respectively.

FIG. 3A is a simplified block diagram of exemplary traffic analytics system 104a comprising a processing resource 302, datastore 304, and network interface 306. For example, processing resource 302 and datastore 304 may be communicatively coupled by a system communication bus, a wired network, a wireless network, or other connection mechanism and arranged to carry out various operations described herein. Optionally, two or more of these components may be integrated together in whole or in part.

Network interface 306 may be interoperable with communication network 110 and may be configured to receive data from various network components of the network configuration 100, 101 such as telematics system 102, remote system 106, data management system 108, and possibly other network components. Traffic analytics system 104a, 104b may communicate with one or more of these network components for obtaining historical vehicle data, or portions thereof. For instance, once received, datastore 304 may store subsets of raw vehicle data in a database, such as database 309.

In an exemplary implementation, traffic analytics system 104a is configured to interoperate with data management system 108 for obtaining historical vehicle data and/or a portion thereof. For example, data management system 108 may manage and store large volumes (e.g., big data) and multiple types of data. Data management system 108 may comprise a relational database, for storing historical vehicle data, or a portion thereof, collected by one or more telematics or vehicle monitoring systems. Data management system 108 may include a web service that enables interactive analysis of large datasets stored in a remote datastore. Traffic analytics system 104a may be configured to interoperate with such a data management system for obtaining raw vehicle data from historical vehicle data stored therein and managed thereby. An example of such a data management system is a managed cloud data warehouse for performing analytics on data stored therein, such as BigQuery™, available from Google® of Mountain View, Calif., USA.

FIG. 3B is a simplified block diagram of second exemplary traffic analytics system 104b comprising processing resource 302, datastore 304, data management system 305 and network interface 306. For example, processing resource 302, datastore 304, and data management system 305 may be communicatively coupled by a system communication bus, a wired network, a wireless network, or other connection mechanism and arranged to carry out various operations described herein. Optionally, two or more of these components may be integrated together in whole or in part. Data management system 305 may comprise a datastore including database for storing historical vehicle data or a portion thereof. Optionally data management system 305 stores and manages large volumes (e.g., big data) and multiple types of data. For example, data management system 305 may comprise a relational database, for storing historical vehicle data collected by one or more telematics or vehicle monitoring systems, or a portion thereof. In another example, database 309 of data management system 305 stores subsets of raw vehicle data from historical vehicle data for processing by analytics system 104b. Alternatively, data management system 305 may include and/or access a web service that enables interactive analysis of large datasets stored in a remote datastore. An example of such a data management system is a managed cloud data warehouse for performing analytics on data stored therein, such as BigQuery.

According to an embodiment, exemplary traffic analytics system 104b receives and stores historical vehicle data in data management system 305 and operates on subsets of historical vehicle data in accordance with operations described herein.

Processing resource 302 may include one or more processors and/or controllers, which may take the form of a general or a special purpose processor or controller. In exemplary implementations, processing resource 302 may be, or include, microprocessors, microcontrollers, application specific integrated circuits, digital signal processors, and/or other data processing devices. Processing resource 302 may be a single device or distributed over a network.

Datastore 304 may be or include one or more non-transitory computer-readable storage media, such as optical, magnetic, organic, or flash memory, among other data storage devices and may take any form of computer readable storage media. Datastore 304 may be a single device or may be distributed over a network.

Processing resource 302 may be configured to store, access, and execute computer-readable program instructions stored in datastore 304, to perform the operations of traffic analytics system 104a, 104b described herein. For instance, processing resource 302 may be configured to receive historical vehicle data and may execute a classification model for defining a vehicle way. Other functions are described below.

Traffic analytics system 104a, 104b may be configured to access, receive, store, analyze and process raw vehicle data for defining a classification model and/or executing a classification model. For example, traffic analytics system 104a, 104b may select and process raw vehicle data of a plurality of vehicles corresponding to a known area, for determining whether the known area is likely to be a portion of a vehicle way. Other examples and corresponding operations are also possible.

In some example implementations, traffic analytics system 104a, 104b may include and/or communicate with a user interface. The user interface may be located remote from traffic analytics system 104a, 104b. For instance, traffic analytics system 104a, 104b may communicate with a user interface via network interface 306. Other examples are also possible.

For the ease of description, traffic analytics system 104a, 104b is shown as a single system, however, it may include multiple computing systems, such as servers, storage devices, and other distributed resources, configured to perform operations/processes described herein. Operations and processes performed by traffic analytics system 104a, 104b described herein may be performed by another similarly configured and arranged system.

Figure 4A:
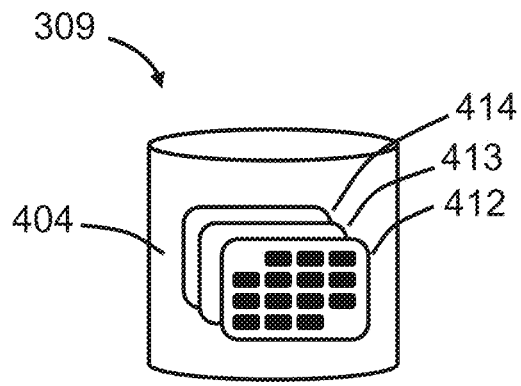
FIG. 4A is a conceptual diagram of a database of a traffic analytics system according to an embodiment.

In an exemplary implementation, traffic analytics system 104a, 104b is configured to obtain, store and process historical vehicle data. For example, traffic analytics system 104a, 104b obtains first historical vehicle data 404 from telematics system 102 and stores it in database 309. FIG. 4A is a conceptual diagram of database 309. In this example, traffic analytics system 104a, 104b organizes first historical vehicle data 404 by vehicle, via associated device ID. For instance, datasets 412-414 of database 309 comprise raw vehicle data indicative of vehicle operation information of vehicles 212-214, respectively.

Figures 4B, 4C:
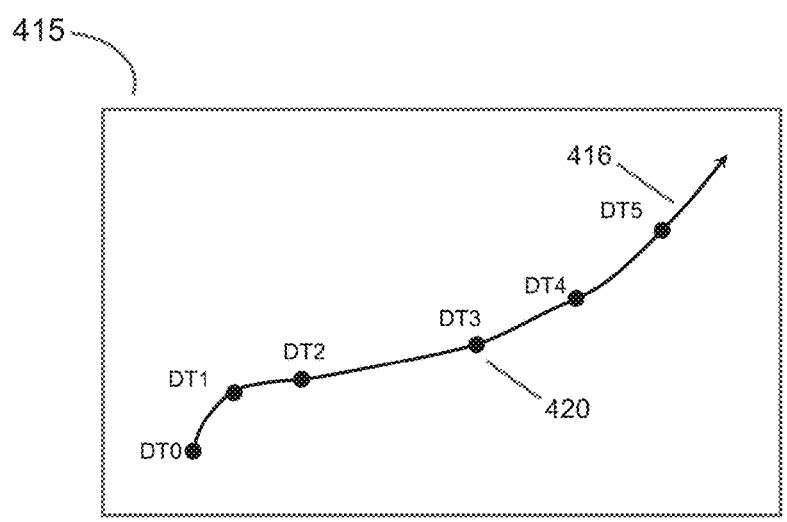
FIG. 4B is a conceptual diagram of a dataset of the database of FIG. 4A.
FIG. 4C is a conceptual diagram of a vehicle's path within a geographic area.

Shown in FIG. 4B is a conceptual diagram of dataset 412. In this example, each row thereof represents a first raw vehicle data instance 406 indicative of vehicle operation information collected by monitoring device 202 at different points in time. First raw vehicle data instances 406 of dataset 412 are organized sequentially in time, from DT0 to DT5. In this example, a first raw vehicle data instance 406 includes device ID data, speed data, position data, (e.g., LAT/LONG), ignition state data, and date and time data, (e.g., timestamp), as shown.

Now referring to FIG. 4C, shown is a conceptual diagram of vehicle 212's path 416 within geographic area 415 corresponding to vehicle position data 418 of dataset 412. Vehicle-position data points 420 represents a position of vehicle 212 at different points in time, DT0-DT5. As shown, the position of vehicle 212 changes position at each temporally subsequent point in time.

For ease of description, database 309 comprising first historical vehicle data 404 is described as organized into vehicle-specific datasets 412-414. One of ordinary skill appreciates that historical vehicle data may be organized in numerous manners.

Intelligent Telematics System

An intelligent telematics system includes aspects of a telematics system and a traffic analytics system, such as, telematics system 102 and traffic analytics system 104a, 104b.

Figure 5A:
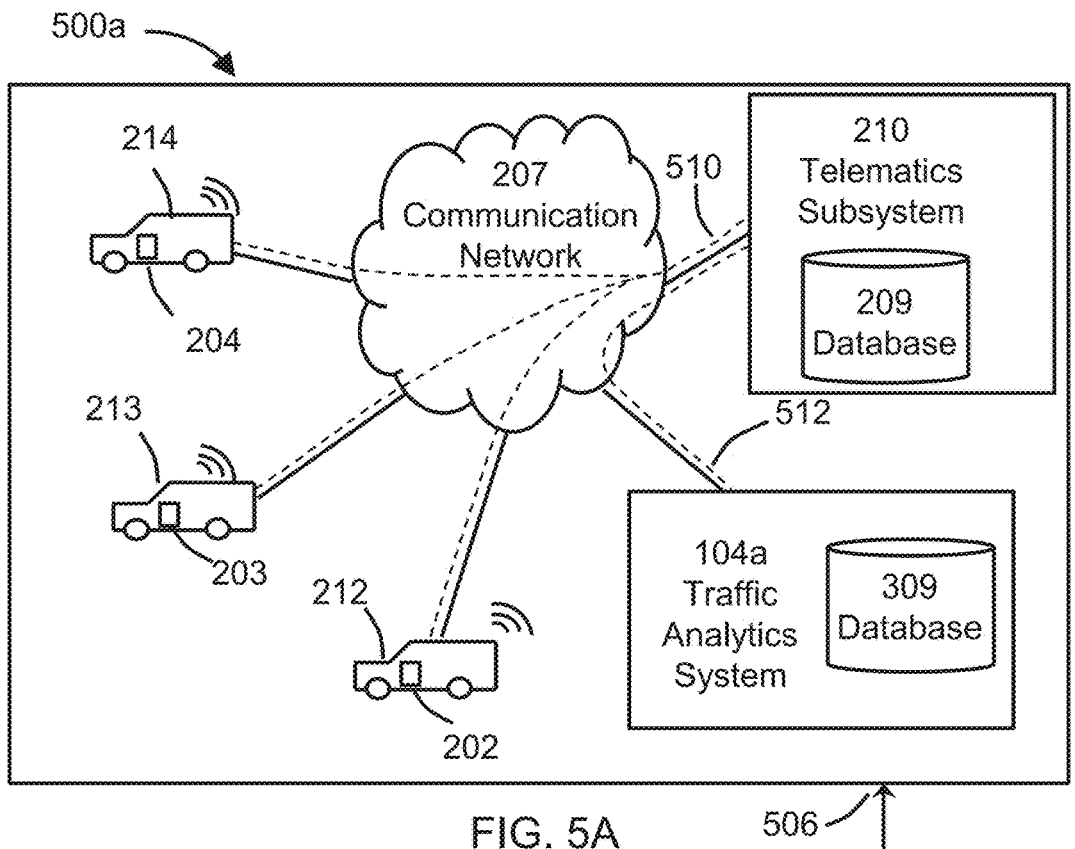
FIG. 5A is a simplified diagram illustrating an exemplary intelligent telematics system according to embodiments.

FIG. 5A is a simplified diagram of an alternative embodiment with which some embodiments may operate. Shown in FIG. 5A is intelligent telematics system 500a comprising onboard monitoring devices 202, 203, and 204, telematics subsystem 210 (e.g., server), traffic analytics system 104a, communicatively coupled via communication network 207. Intelligent telematics system 500a may also include network interface 506 compatible for interfacing with a communication network for communicating with other network components. For example, network interface 506 may be interoperable with communication network 110 and may be configured to receive data from various network components of the network configuration 100, 101 such as remote system 106.

In this example monitoring devices 202-204 may be configured to wirelessly communicate with telematics subsystem 210 via a wireless communication module. In some embodiments, monitoring devices 202-204 may directly communicate with one or more networks outside respective vehicles to transmit data to telematics subsystem 210. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to telematics subsystem 210, as represented by communication path 510. In an exemplary implementation, raw vehicle data received and stored by telematics subsystem 210 over a period of time forms historical vehicle data. For instance, historical vehicle data may be stored by telematics subsystem 210 in database 209. A period of time may include, for example, 3 months, 6 months, 12 months, or another duration of time. In an exemplary embodiment, subsets of raw vehicle data selected from historical vehicle data stored in database 209 may be stored in another database, for instance, database 309 for processing by traffic analytics system 104a. In this example raw vehicle data is transmitted by telematics subsystem 210 and received by traffic analytics system 104a via communication path 512, as shown.

Figure 5B:
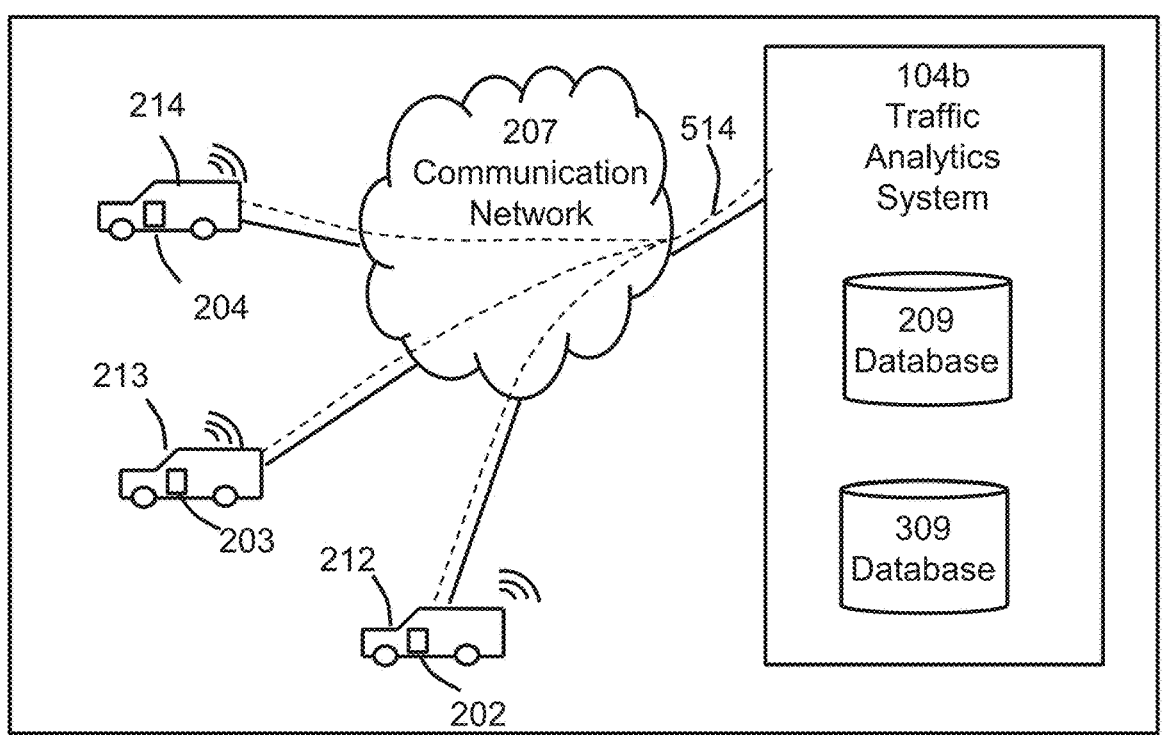
FIG. 5B is a simplified diagram illustrating another exemplary intelligent telematics system according to embodiments.

FIG. 5B is a simplified diagram of another alternative embodiment with which some embodiments may operate. Shown in FIG. 5B is intelligent telematics system 500b comprising onboard monitoring devices 202, 203, and 204 and traffic analytics system 104b, communicatively coupled therewith via communication network 207.

Intelligent telematics system 500b may also include network interface 506 compatible for interfacing with a communication network for communicating with other network components. For example, network interface 506 may be interoperable with communication network 110 and may be configured to receive data from various network components of the network configuration 100, 101, such as remote system 106.

In this example monitoring devices 202-204 may be configured to wirelessly communicate with traffic analytics system 104b via a wireless communication module. In some embodiments, monitoring devices 202-204 may directly communicate with one or more networks outside respective vehicles to transmit data to traffic analytics system 104b. A person of ordinary skill will recognize that functionality of some modules may be implemented in one or more devices and/or that functionality of some modules may be integrated into the same device.

Monitoring devices 202-204 may transmit raw vehicle data, indicative of vehicle operation information collected thereby, to traffic analytics system 104b via communication path 514, as shown. In an exemplary implementation, raw vehicle data received and stored by traffic analytics system 104b over a period of time forms historical vehicle data. For instance, historical vehicle data may be stored by traffic analytics system 104b in database 209 in data management system 305. A period of time may include, for example, 3 months, 6 months, 12 months, or another duration of time. In an exemplary embodiment, subsets of raw vehicle data selected from historical vehicle data stored in database 209 may be stored in another database, for instance, database 309 for processing by traffic analytics system 104b. In this example raw vehicle data is transmitted by telematics subsystem 210 and received by traffic analytics system 104a. Traffic analytics system 104b may be configured to perform operations of telematics system 201 as described herein.

In some example implementations, intelligent telematics system 500a, 500b may be configured to include and/or communicate with a user interface. The user interface may be located remote therefrom. For instance, intelligent telematics system 500a, 500b may communicate with a user interface via network interface 506. Other examples are also possible.

Classification Model

According to an embodiment, a classifier defining a relationship between operation of a plurality of vehicles having operated in a known area and a probability the known area is a portion of a vehicle way may be defined by processing corresponding historical vehicle data. For example, such processing may provide features (e.g., data indicative of variables/attributes, or measurements of properties) of the known area. A machine learning algorithm may be trained with training data comprising features to recognize patterns therein and generalize a relationship between the features and an outcome that the known area is occupied by the vehicle way.

Figure 7:
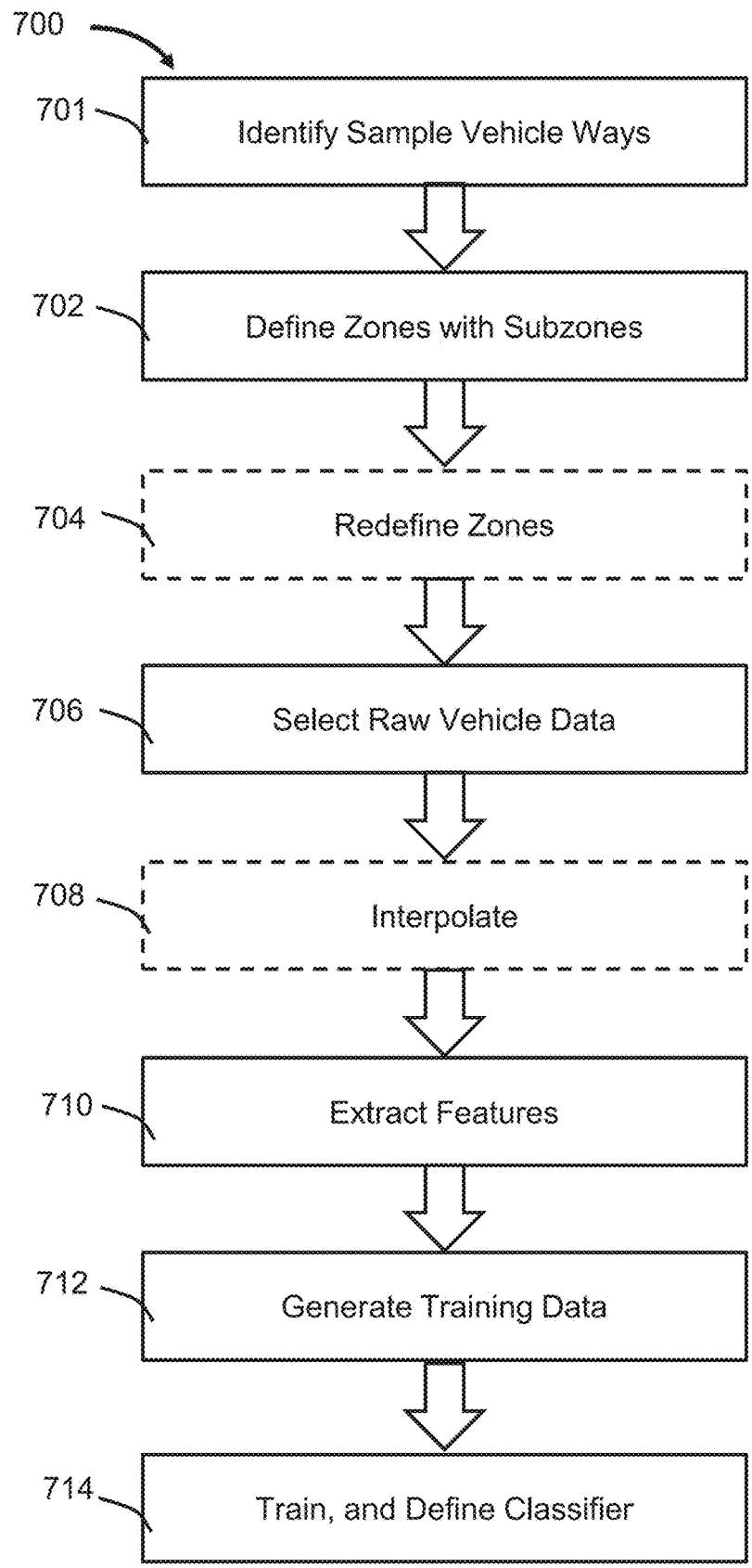
FIG. 7 is a flow diagram of a process for defining a classifier for use in defining a vehicle way according to some embodiments.

Shown in FIG. 7 is a flow diagram of a process 700 for defining a classifier for use in defining a vehicle way according to some embodiments. In particular, a classifier is for providing an indication that a known area is, or is not, a portion of a vehicle way. A classifier may provide as output a likelihood (e.g., probability) a known area is a portion of a vehicle way. Alternatively, a classifier may output an indication (e.g., binary value) that a known area is, or is not, a portion of a vehicle way.

Process 700 is described below as being carried out by traffic analytics system 104a. Alternatively, process 700 may be carried out by telematics-analytic system 104b, intelligent telematics system 500a, 500b, another system, a combination of other systems, subsystems, devices or other suitable means provided the operations described herein are performed. Process 700 may be automated, semi-automated and some blocks thereof may be manually performed.

Block 701

Process 700 begins at block 701, wherein a plurality of sample vehicle ways is identified. According to an embodiment, a classifier may be defined according to a type and/or subtype of vehicle way that is to be defined using the classifier. Specific and non-limiting examples of types of vehicle ways include, traffic junctions, road segments, parking lots, and ad hoc vehicle ways. Specific and non-limiting examples of subtypes of vehicle ways include: subtypes of traffic junctions, including roundabouts, intersections, on-ramps, and off-ramps; subtypes of parking lots including single entry and single exit parking lots, single entry and multiple exit parking lots, and multiple entry and single exit parking lots; and subtypes of road segments including one way, two way, multi-lane, and divided highways. A subtype may be considered another type of vehicle way. A subtype may be considered another type of vehicle way. Block 701 will be further described below in reference to FIG. 8.

In an exemplary implementation, a plurality of sample vehicle ways of only parking lot type is identified for defining a classifier for use in defining parking lots. In another exemplary implementation, a plurality of sample vehicle ways for defining a classifier for use in defining a vehicle way in the form of a traffic junction comprises traffic junctions only. For example, the plurality of sample vehicle ways may include one or more of the following traffic junctions, 3-way intersections, 4-way intersections, n-way intersections, roundabouts, and any other portion of a road system where multiple roads intersect allowing vehicular traffic to change from one road to another.

Alternatively, a plurality of sample vehicle ways for defining a classifier for use in defining a subtype of a traffic junction in the form of an intersection only comprises intersections (e.g., 3-way intersections, 4-way intersections). Defining a classifier for use for defining a particular type or subtype of vehicle way may provide a more accurate classifier.

Furthermore, a classifier defined with sample vehicle ways of only one type and/or one subtype of vehicle way may be suitable for use in defining vehicle ways of a different type and/or subtype of vehicle way.

Alternatively, a classifier may be defined for defining all types of vehicle ways.

Figure 8:
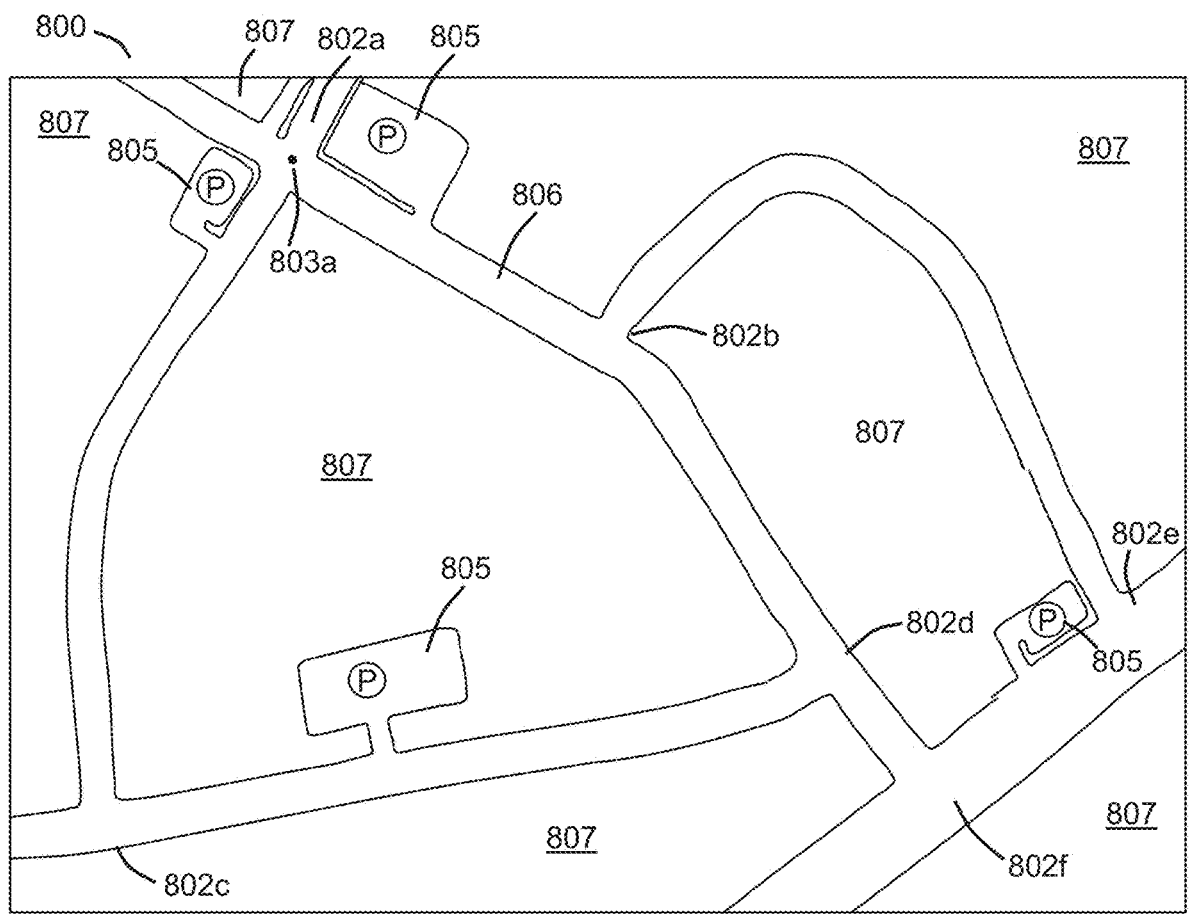
FIG. 8 is a simplified diagram of an area comprising a plurality of sample intersections.

In an exemplary implementation, a classifier for use in defining a vehicle way in the form of an intersection is defined according to process 700. In FIG. 8, shown is a simplified diagram of area 800 comprising a roadway system including a plurality of sample vehicle ways in the form of sample intersections 802a-802f. Area 800 also comprises parking lots 805, roadway sections 806, and non-traffic designated areas 807 (e.g., greenspace, sidewalks). For ease of description, only six sample intersections are described in this example. In practise, however, the number of sample vehicle ways may include other than six sample vehicle ways.

In this example, sample intersections 802a-802f are also shown to be part of the same roadway network. However, sample vehicle ways may be selected from different roadway systems located in different cities, countries and/or continents. One of ordinary skill in the art appreciates that selection of an appropriate number and type(s) of sample vehicle ways will become apparent during definition (e.g., training and verification) of the classifier.

Block 702

Once a plurality of sample vehicle ways has been identified, a plurality of associated zones for each of the plurality of sample vehicle ways, is defined in block 702. Block 702 will be further described below in reference to FIGS. 6Ai-6Avi, 6Bi-6Bvi, 6C, FIG. 8, FIG. 9, FIGS. 10A-10B, FIGS. 11A-11F, FIGS. 12A-12D, and FIGS. 13A-13B.

Figure 6C:
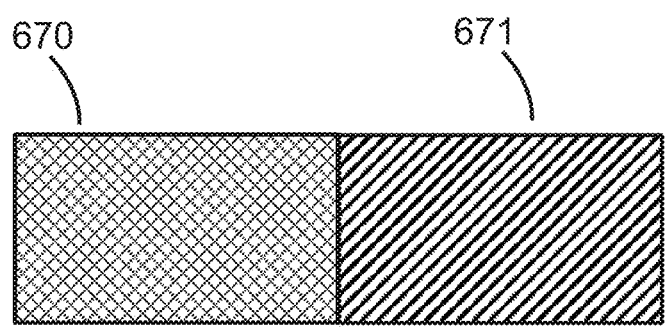
FIG. 6C is a conceptual diagram of elements of a vehicle way.

A zone includes an area encompassing an associated vehicle way. For example, shown in FIG. 6C is a conceptual diagram of elements of a vehicle way, including a bridge element 670 coupled to an employed element 671. For instance, bridge element 670 comprises an area for traversal of a vehicle for transitioning therefrom to employed element 671. Employed element 671 comprises an area in which the vehicle manoeuvres, such as for moving and/or parking. A vehicle way may have one or more of each of bridge elements and employed elements.

Shown in FIG. 6Bi-6Bvi are conceptual diagrams of some specific and non-limiting examples of zones encompassing the vehicle ways of FIG. 6Ai-6Avi.

For example, zone 611 encompasses circular traffic junction 602. Elements of circular traffic junction 602 include bridge elements 628 of road segments 606-609 and employed element 630 of circular road segment 604. A vehicle traverses one of bridge elements 628 to enter (i.e., transition into) employed element 630. Once inside employed element 630, the vehicle moves therethrough (i.e., maneuvers) and exits (i.e., transitions) employed element 630 via a bridge element 628. In this example circular traffic junction 602 comprises four bridge elements 628 and one employed element 630.

Zone 613 encompasses intersection 612. Elements of intersection 612 includes three bridge elements 632 for instance, road segments 614, 616, and 617 and one employed element 634 where road segments 614, 616 and 617 intersect.

Zone 615 encompasses traffic junction 618. Elements of traffic junction 618 includes two bridge elements 638 including off-ramp portion 622 and main road 620 portion and one employed element such as off-ramp portion 648.

Zone 640 encompasses parking lot 624. Elements of parking lot 624 includes a bridge element 642 of entry/exit 629 and an employed element 668 including parking area 626.

Zone 652 encompasses road portion 650. Elements of road portion 650 includes two bridge elements 654 of road portions 650 and an employed element 656 of road portion 650.

Zone 660 encompasses a bridge element 662 of on-street parking space 644 and an employed element 664 of on-street parking space 644.

In some instances, elements may include physical boundaries of a road surface such as a sidewalk, road shoulder, and lane divider, among others. In other instances, a vehicle way may not have any physical boundaries, such as a beaten path created by frequent flow of vehicles for accessing a natural attraction as described above.

One of ordinary skill in the art appreciates that the dimensions of a zone is selected to encompass and include elements of a vehicle way. A dimension that is too small and does not include the elements, or includes partial elements, of a vehicle way should be avoided. For example, referring to FIG. 6Bii, shown is zone 666 encompassing partial elements of intersection 612—only portions of bridge elements 632 and employed element 634. In this instance, as zone 666 encompasses an insufficient portion of intersection 612, only a portion of historical vehicle data associated therewith will be processed for defining a classifier. As such, the performance of the defined classifier may be poor.

Alternatively, a dimension that is too large should also be avoided. For instance, a zone should be large enough to encompass a vehicle way, however, not too large such that it includes extraneous areas. For example, a zone that is too large may result in unnecessary processing of extraneous historical vehicle data. Furthermore, dimensions of a zone may affect computing resources and processing time for defining and/or using a classification model. One of ordinary skill will appreciate that optimal zone dimensions will become apparent during definition of the classifier.

Continuing at block 702, each zone encompassing a vehicle way comprises a plurality of contiguous known areas, also referred to herein as subzones. Each subzone may have boundaries defined in accordance with a geographic coordinate system representing a unique two-dimensional space on the Earth's surface. For example, a zone may be partitioned by subdividing the zone into a grid of contiguous subzones bound by pairs of latitude and longitude lines. As such, the unique location of each subzone known. Each subzone in the plurality of contiguous subzones within a zone shares a boundary with at least one other subzone. The plurality of contiguous subzones serves to facilitate organization of all points therein as each subzone comprises an aggregate of a portion of points within a zone. A point located within boundaries of a subzone may be uniquely associated therewith.

Optionally, a subzone may include a portion of a vehicle way overlapping another portion of a vehicle way. For instance, the subzone may represent a portion of an overpass that overlaps a portion of a roadway thereunder. Optionally, a subzone may include a portion of a vehicle way overlapped by another portion of a vehicle way. For instance, the subzone may represent a portion of a roadway that is overlapped by a portion of an overpass.

Figure 9:
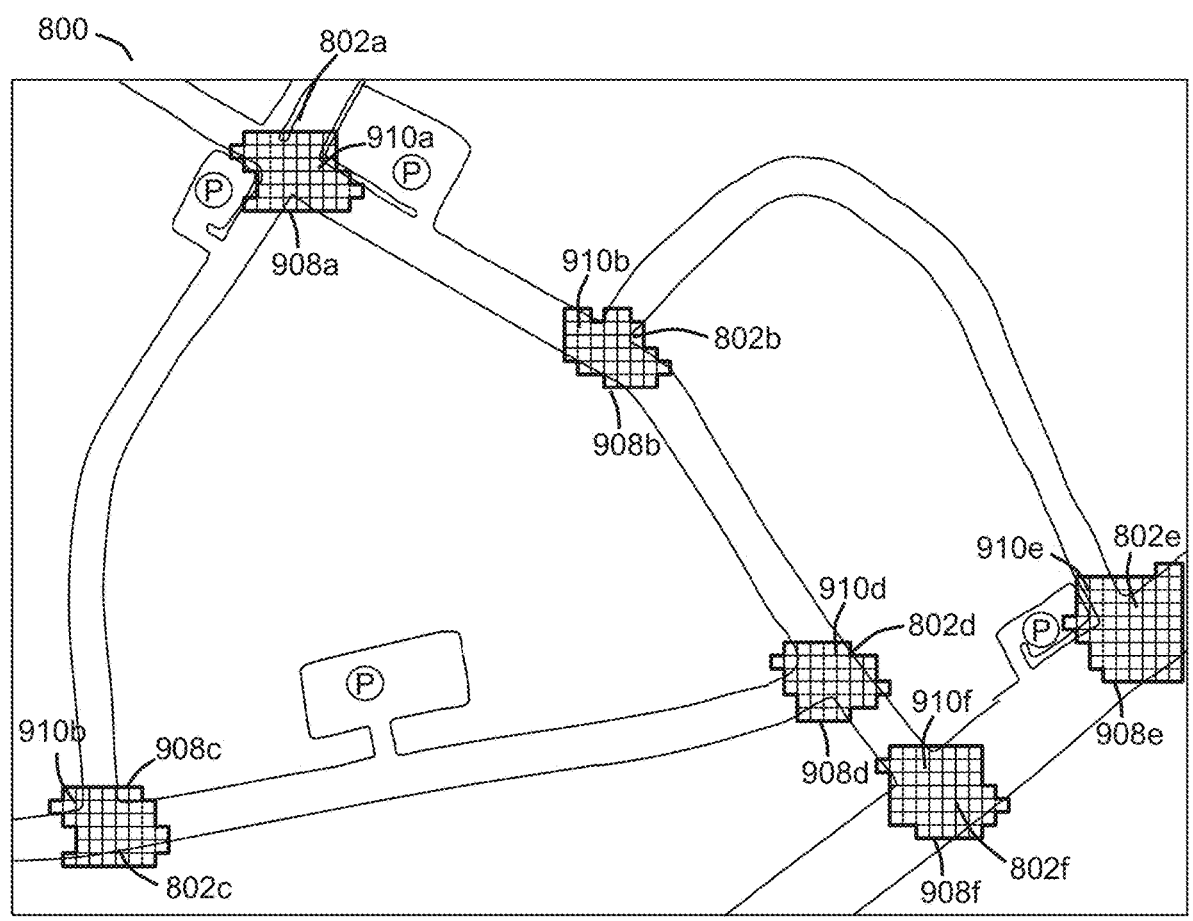
FIG. 9 is a simplified diagram of a plurality of exemplary zones imposed on the plurality of the sample intersections of FIG. 8.

In some exemplary implementations, zone dimensions may be determined according to the shape and size of an associated vehicle way. FIG. 9 is a simplified diagram of a plurality exemplary zones 908a-908f defined for sample intersections 802a-802f, respectively. In this example, the dimensions of each zone are such that the elements of each associated vehicle way are encompassed thereby. As sample vehicle ways, e.g., sample intersections 802a-802f vary relatively in shape and size, so may respective zones 908a-908f.

Each of the plurality of zones 908a-908f is partitioned into a plurality of contiguous subzones 910a-910f. For instance, each of zones 908a-908f may be subdivided into a grid of contiguous subzones bound by pairs of latitude and longitude lines. As each of zones 908a-908f may be different in dimension, each thereof may comprise a different number of subzones 910a-910f, as shown. For example, zone 908b is smaller than zone 908f and accordingly, has fewer subzones 910b than the number of subzones 910f in zone 908f.

In some embodiments geographic coordinate data of a location (e.g., LAT/LONG) of a reference point proximate each of the sample vehicle ways is obtained by traffic analytics system 104a. A reference point indicates a general area in which a vehicle way may be located.

In an exemplary implementation, a user may view a georeferenced map of area 800 on a display and manually identify a reference point proximate sample intersection 802a. For instance, the georeferenced map may be accessed via a web page of an online map service, such as a Google Maps. The user may choose reference point 803a on or near sample intersection 802a, as shown in FIG. 8. The location of reference point 803a may be obtained, by the user selecting point 803a on the georeferenced map with a pointer, causing text indicating geographic coordinates, (e.g., LAT/LONG), thereof to appear on the display. Alternatively, a location of a reference point proximate a vehicle way may be obtained through use of a GPS enabled device or another geographic coordinate sensing device. One of ordinary skill in the art appreciates that there are various ways to obtain a location of a point. Point data indicative of the location of reference point 803a may be provided to traffic analytics system 104a, for example, via a user interface or data file accessed by traffic analytics system 104a. The reference point may be at or near the centre point of a zone.

In an exemplary implementation, a zone may be defined by subdividing a reference area into a grid of contiguous subzones according to a hierarchical geospatial indexing system, such as Geohash. Geohash is a known public domain hierarchical geospatial indexing system which uses a Z-order curve to hierarchically subdivide the latitude/longitude grid into progressively smaller cells of grid shape. Each cell is rectangular and represents an area bound by a unique pair of latitude and longitude lines corresponding to an alphanumeric string, known as a Geohash string and/or Geohash code.

Figures 11A, 11B:
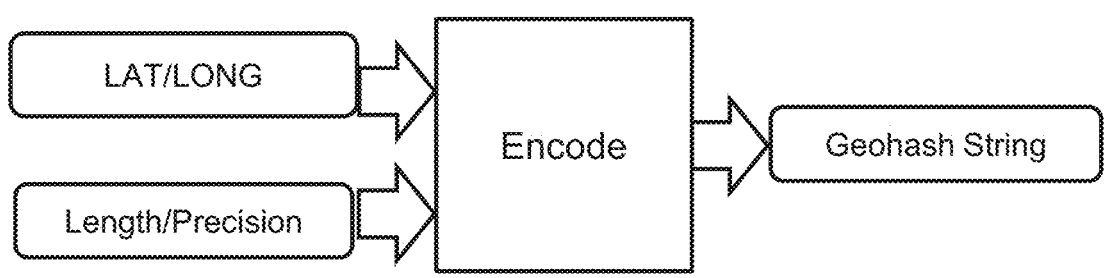
FIG. 11A is a table defining the relationship between Geohash string length and approximate Geohash cell dimensions.
FIG. 11B is a simplified functional block diagram of an exemplary Geohash encode function.

In a Geohash system the size of a cell depends on a user defined length of a string. The hierarchical structure of Geohash grids progressively refines spatial granularity as the length of string increases. For example, shown in FIG. 11A is table 1102 defining the relationship between string length and approximate cell dimensions. As string length increases, cell dimensions decrease, as shown. Cell size is also influenced by a cell's longitudinal location. Cell width reduces moving away from the equator (to 0 at the poles) due to the nature of longitudinal lines converging as they extend away therefrom. Table 1102 provides an approximation of Geohash cell dimensions located along the equator.

Some exemplary Geohash system functions will now be described below in reference to FIGS. 11B-11G. FIG. 11F is a simplified conceptual diagram of cell 1132, defined by latitude and longitude lines 1134 and 1136, respectively. Shown in FIG. 11B is a simplified functional block diagram of an exemplary Geohash encode function 1108, for mapping a point to a cell. For example, LAT/LONG coordinates, '42.620578, −5.620343,' of point 1130 of FIG. 11F and a user defined length=5 are input to encode function 1108 which maps point 1130 to cell 1132. Encode function 1108 outputs string 'ezs42' corresponding to cell 1132 having dimensions 4.89 km×4.89 km. One of ordinary skill appreciates that encode function 1108 will map any point within cell 1132 to the same string, 'ezs42.'

Figure 11C:
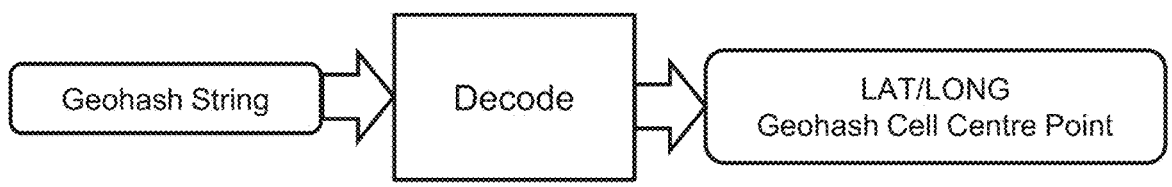
FIG. 11C is a simplified functional block diagram of an exemplary Geohash decode function.

FIG. 11C is a simplified functional block diagram of an exemplary Geohash decode function 1110 for resolving a string to the centre point of the corresponding cell. For example, string 'ezs42' is input to decode function 1110 and decoded to cell 1132 centre point 1135 at LAT/LONG coordinates '42.60498047, −5.60302734.' In contrast to encode function 1108, decode function 1110 resolves an input string to LAT/LONG coordinates of one point only, specifically, the centre point of the corresponding cell.

Figure 11D:
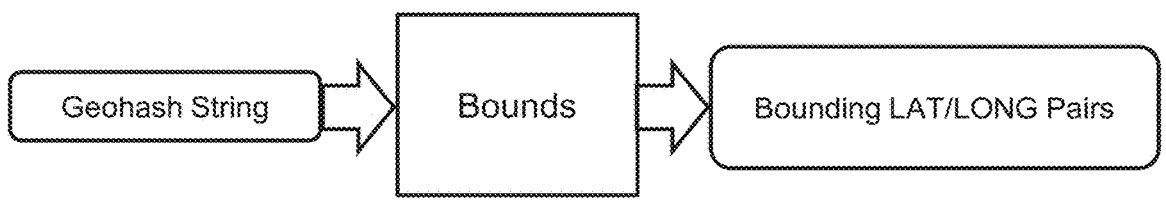
FIG. 11D is a simplified functional block diagram of an exemplary Geohash bounds function.

FIG. 11D is a simplified functional block diagram of an exemplary Geohash bounds function 1112 for resolving a string into ° N/° S, ° W/° E line pairs that bound the corresponding cell. For example, string 'ezs42' is input to bounds function 1112 which outputs (42.626953125N, 42.58300781250N), (−5.5810546875E, −5.625E) line pairs bounding cell 1132, as shown in FIG. 11F.

Figure 11E:
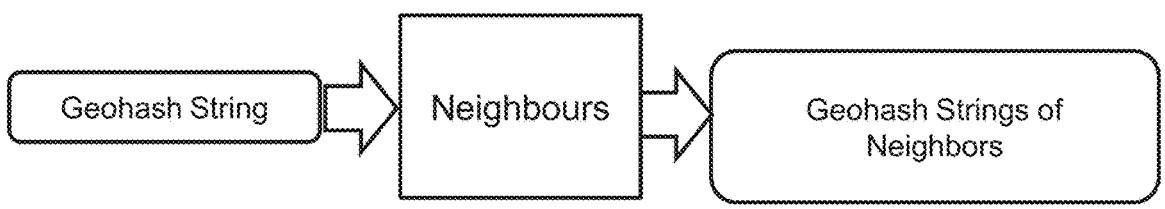
FIG. 11E is a simplified functional block diagram of an exemplary Geohash neighbours function
Figure 11F:
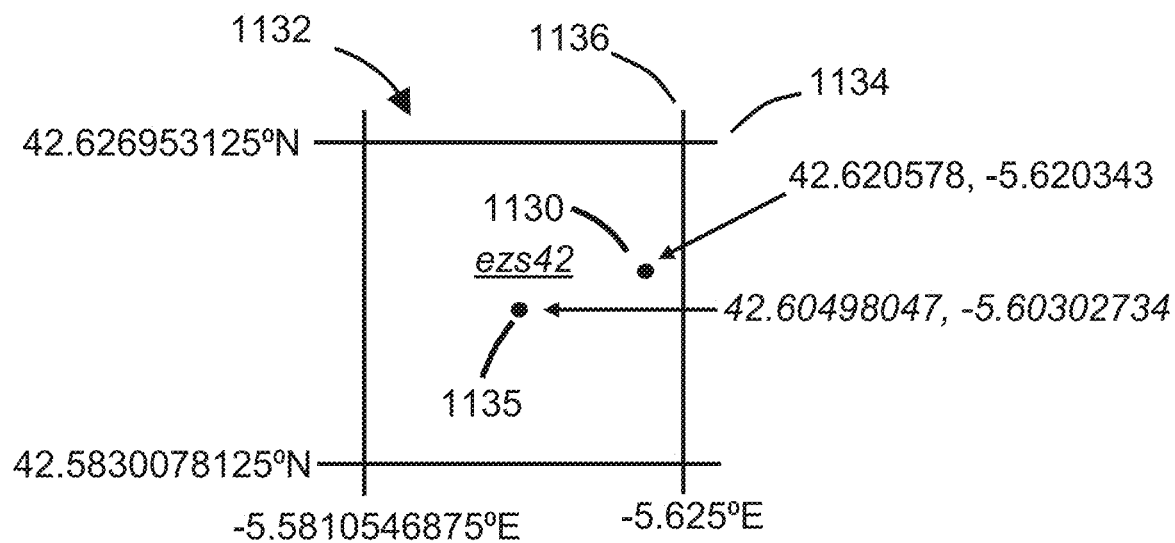
FIG. 11F is a simplified conceptual diagram of a Geohash cell.
Figure 11G:
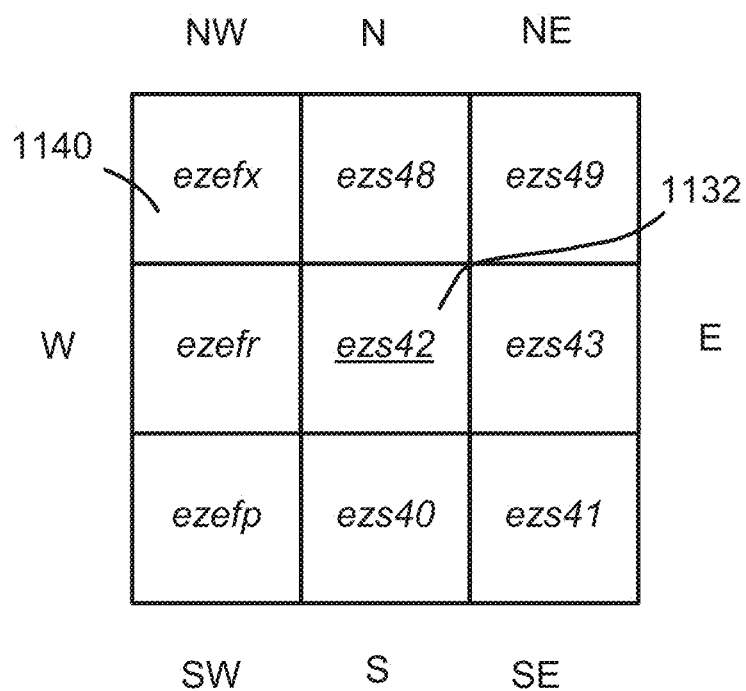
FIG. 11G is a conceptual diagram of a Geohash cell and 8 nearest neighbours of the Geohash cell.

FIG. 11E is a simplified functional block diagram of an exemplary Geohash neighbours function 1114 for determining the closest 8 neighbouring (e.g., adjacent) cells to a given cell. For example, string 'ezs42' is input into neighbours function 1114 which outputs strings of the closest 8 neighbouring cells at relative positions NW, W, NE, W, E, SW, S, and SE to cell 1132. FIG. 11G is a simplified conceptual of cell 1132 and its 8 closest neighbouring cells 1140.

In an exemplary implementation, each of the plurality of zones 908a-908f of FIG. 9 is partitioned into a plurality of contiguous subzones 910a-910f, respectively, in the form of Geohash cells. As mentioned above, sample vehicle ways may be selected from various locations and thus may be located at different longitudes. As such, dimensions of Geohash cells across a plurality of zones may differ at different longitudes.

Figure 10A:
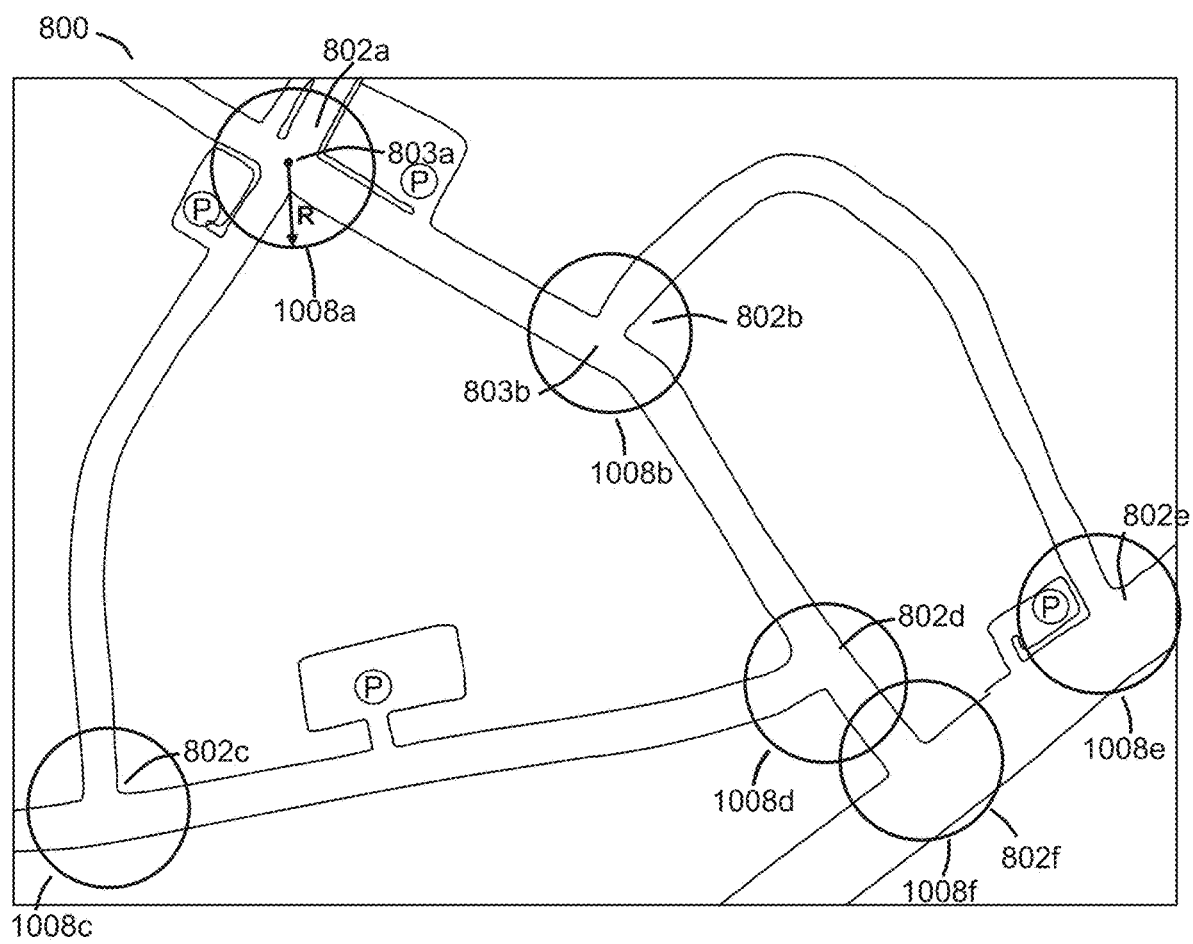
FIG. 10A is a simplified diagram of a plurality of exemplary reference areas of a same dimension defined for the sample intersections FIG. 8.

In some exemplary implementations, zone dimensions may be dependent on dimensions that are likely to encompass most vehicle ways to be defined using a classifier. For example, shown in FIG. 10A, is a simplified diagram of a plurality of reference areas 1008a-1008f of a same dimension defined for sample intersections 802a-802f, respectively. Dimensions of reference areas 1008a-1008f are approximated to encompass most intersections within an intersection population that may be defined by a classifier. In this example, reference areas 1008a-1008f are circular in shape having a radius R. In some instances, a reference area may be defined relative to the location of the reference point of the vehicle way. For instance, reference areas 1008a-1008f are centred about reference points 803a-803f of sample intersections 802a-802f. Accordingly, reference areas 1008a-1008f are defined by radius R extending from the reference points 803a-803f respectively.

In an exemplary implementation, the inventor determined a reference area defined radially 25m from the reference point encompasses most intersections within an intersection population of interest whilst avoiding extraneous areas.

As noted above, for a plurality of different types and/or subtypes of vehicle ways a plurality of classifiers may be defined. As such, optimal zone dimensions may vary according to the classifier. One of ordinary skill will appreciate that an optimal zone dimensions will become apparent during definition of the classifier.

Figure 10B:
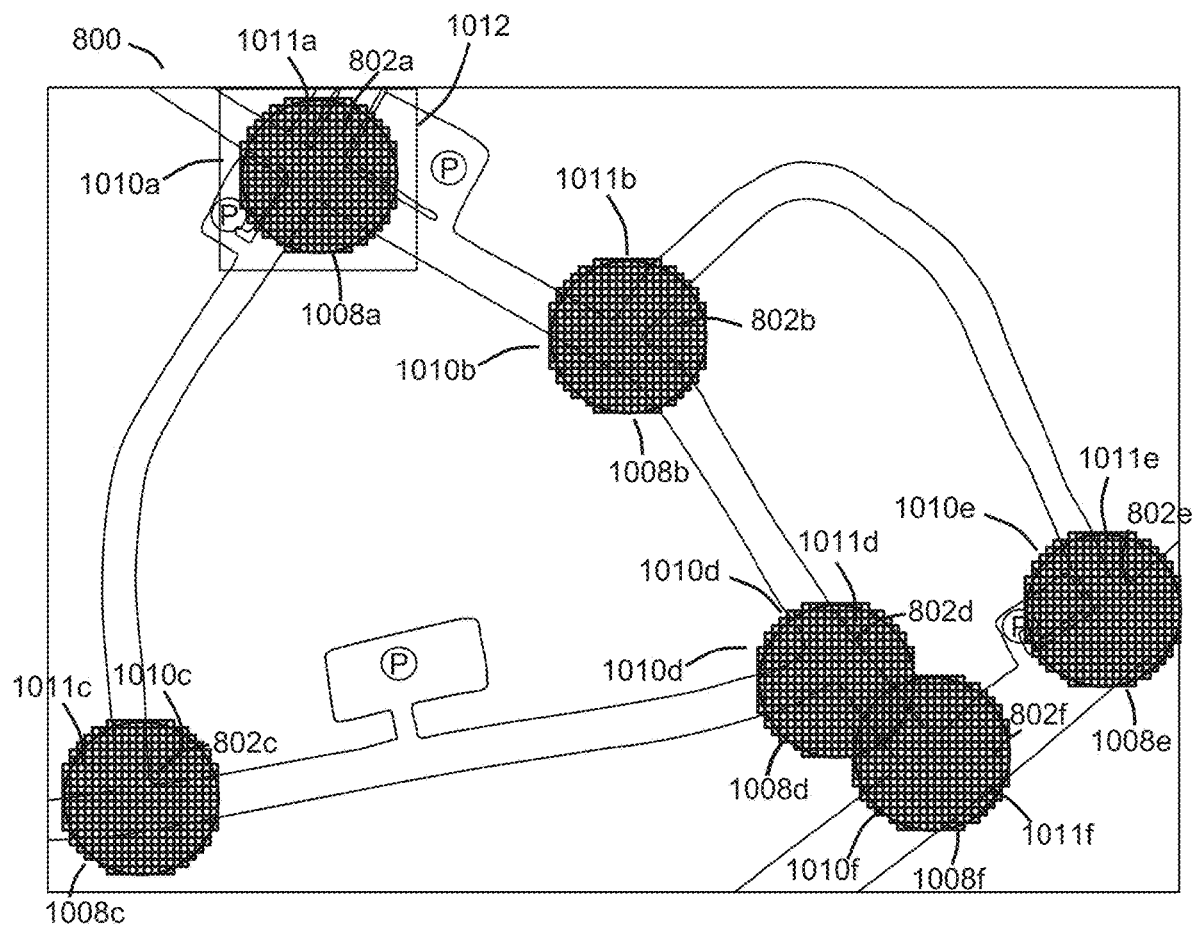
FIG. 10B is a simplified conceptual diagram of a plurality of exemplary zones imposed on sample vehicle ways.
Figure 12A:
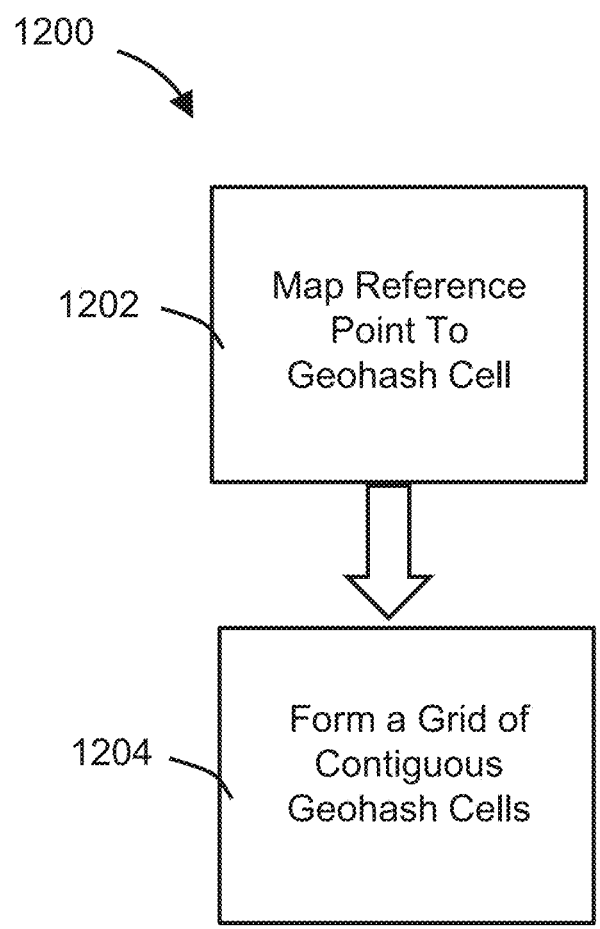
FIG. 12A is a flow diagram of an exemplary process for subdividing a reference area into a grid of Geohash cells.

FIG. 10B is a simplified conceptual diagram of a plurality of exemplary zones 1010a-1010f imposed on sample intersections 802a-802f, each comprising a plurality of contiguous subzones 1011a-1011f. In this example, reference areas 1008a-1008f of FIG. 10A are partitioned into a plurality of contiguous subzones in the form of Geohash cells. FIG. 12A is a flow diagram of one exemplary process 1200 for subdividing a reference area into a grid of Geohash cells.

Subdividing a reference area into a grid of Geohash cells process 1200 begins at block 1202 wherein a reference point of a sample vehicle way is mapped to a Geohash cell. For example, LAT/LONG coordinates of reference point 803a is input into encode function 1108 and the corresponding Geohash string is output thereby. Shown in FIG. 12B is a simplified diagram of reference area 1008a, including reference point 803a and cell 1240, the Geohash cell to which reference point 803a was mapped. Geohash cell 1240 serves as a centre cell from which a grid of contiguous Geohash cells for subdividing reference area 1008a is formed.

Next at block 1204, a plurality of Geohash neighbours of the centre cell is determined. For instance, the Geohash string of the centre cell 1240 is input to neighbours function 1114, and corresponding strings of neighbour cells 1242 of Geohash cell 1240 are output. FIG. 12C is a simplified conceptual diagram of centre cell 1240 and its 8 closest neighbouring cells 1242. Block 1204 repeats a similar step of determine neighbouring cells of neighbouring cells until reference area 1008a is completely subdivided into a grid of contiguous Geohash cells, as shown in FIG. 12D. Block 1204 may utilize Geohash bounds function 1112 to determine when to stop process 1200. For example, coordinates for the boundary of reference area 1008 may be input into bounds function 1112 to determine which Geohash cells in the grid include the boundary. Once the entire boundary is within a Geohash process 1200 may stop. One of ordinary skill appreciates that there are other methods to manipulate or divide space using a Geohash system.

Once reference areas are partitioned into a plurality of contiguous subzones, the associated zone may be defined by peripheral edges of the plurality of contiguous subzones. For instance, once reference areas 1008a-1008f are defined, they are partitioned into a plurality of contiguous subzones 1010a-1010b and the peripheral edges 1248 of each thereof define zones 1011a-1011f.

In general, subzones are not limited to a particular dimension, size or shape. However, these attributes may affect processing time and resources for defining and/or using a classification model. For instance, higher precision subzones, will increase the number of subzones for processing in comparison to lower precision subzones for a given zone.

Embodiments described herein are not limited to partitioning a zone with Geohashes. For example, a zone may be partitioned according to another hierarchical geospatial indexing system, e.g., H3—Uber's Hexagonal Hierarchical Spatial Index, or other system. Alternatively, a zone may be partitioned according to another method for subdividing geographical space.

One of skill in the art will appreciate that a zone may be defined in multiple ways. For instance, a plurality of contiguous subzones may be defined by creating a zone of a shape unique to a corresponding sample vehicle way, as shown in FIG. 9. In another instance, a reference area may be partitioned into a plurality of contiguous subzones to create a zone, as shown in FIG. 10B. The methods for defining a zone described herein are examples only and are not intended to limit embodiments.

According to some embodiments, for each of the plurality of zones, subzone data may be formed. For each subzone, subzone data may comprise information indicating a unique identifier and location (e.g., geographic coordinates of boundaries) of the subzone. Subzone data may also comprise information indicating the closest neighbours of the subzone and/or other subzone related information.

FIG. 13A is a simplified conceptual diagram of exemplary subzone data 1302 formed for zone 1010a. In this example subzone data 1302 comprises Geohash string data which serves as a unique identifier of each subzone. As described above, the location of a Geohash cell (i.e. subzone) may be determined from a Geohash string, such as by inputting a Geohash string into Geohash system bounds function 1112.

Alternatively, subzone data may comprise unique ID data which serves as a unique identifier of each subzone and boundary coordinates of boundaries thereof, such as LAT/LONG pairs. For example, FIG. 13B is a simplified conceptual diagram of subzone data 1304 formed for zone 1010a comprising Geohash string data which serves as a unique identifier of each subzone and LAT/LONG pairs defining boundaries of each Geohash.

Optionally, subzone data may include information indicative of a Geohash cell's 8 closest neighbours.

In some instances, two or more of a plurality of zones may overlap, for example, zones 1010d and 1010f of FIG. 10B. However, in such instances, a subzone within more than one zone may skew training and/or output of a classification model. For example, vehicle data associated with subzones within multiple zones may be overrepresented in training and result in a biased classifier.

Block 704

Next, at block 704, a subzone common to multiple zones may be associated with a unique zone and then each of the multiple zones is redefined to include a new unique plurality of subzones. For example, subzone data of the multiple zones are modified in accordance with the redefinition thereof. Block 704 will be described in further detail below with reference to FIGS. 14A-14C, FIGS. 15A-15B, and FIGS. 16A-16B.

In an exemplary implementation, the distance between the common subzone and each of the centre subzones of the multiple zones is calculated. The common subzone is uniquely associated with the zone having a centre subzone that is the shortest distance thereto.

Figure 14A:
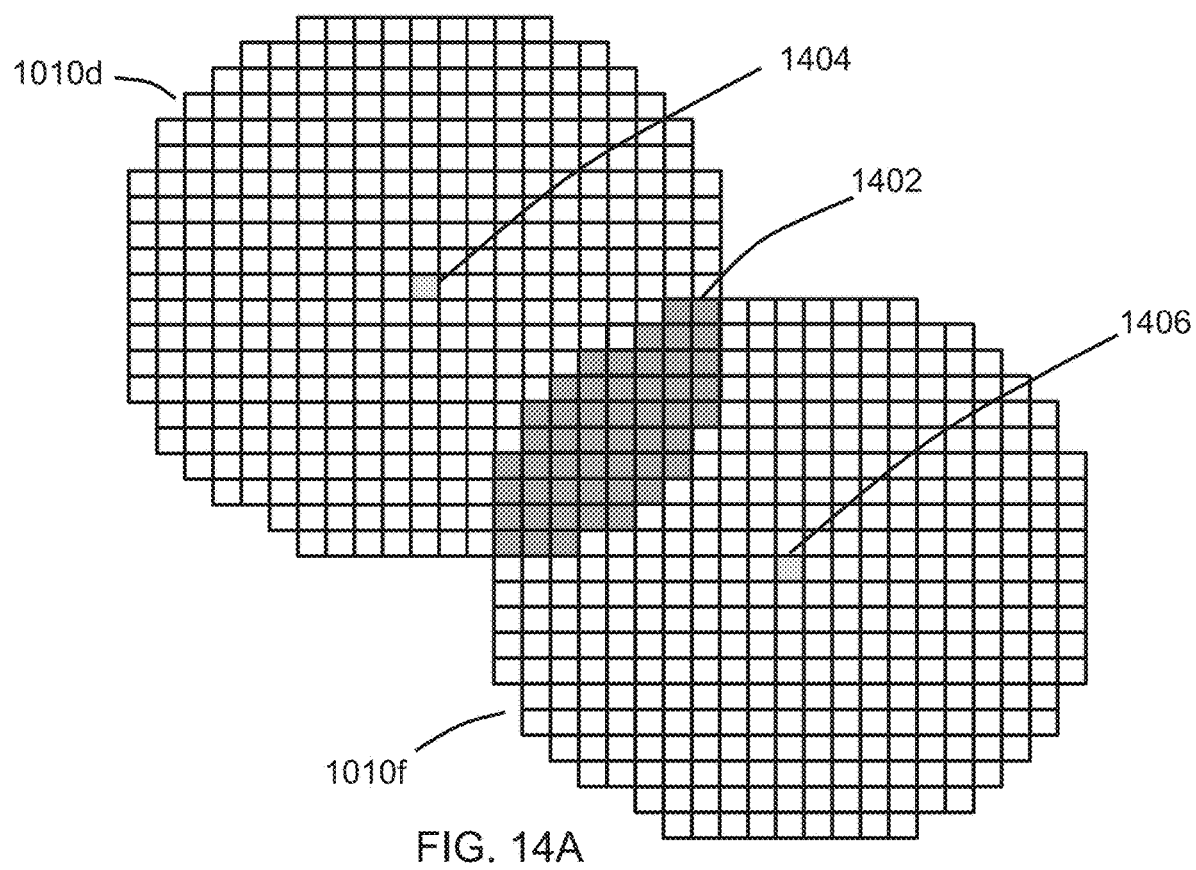
FIG. 14A is a simplified conceptual diagram of two zones comprising centre subzones and a plurality of common subzones located within an overlapping portion thereof.
Figure 14B:
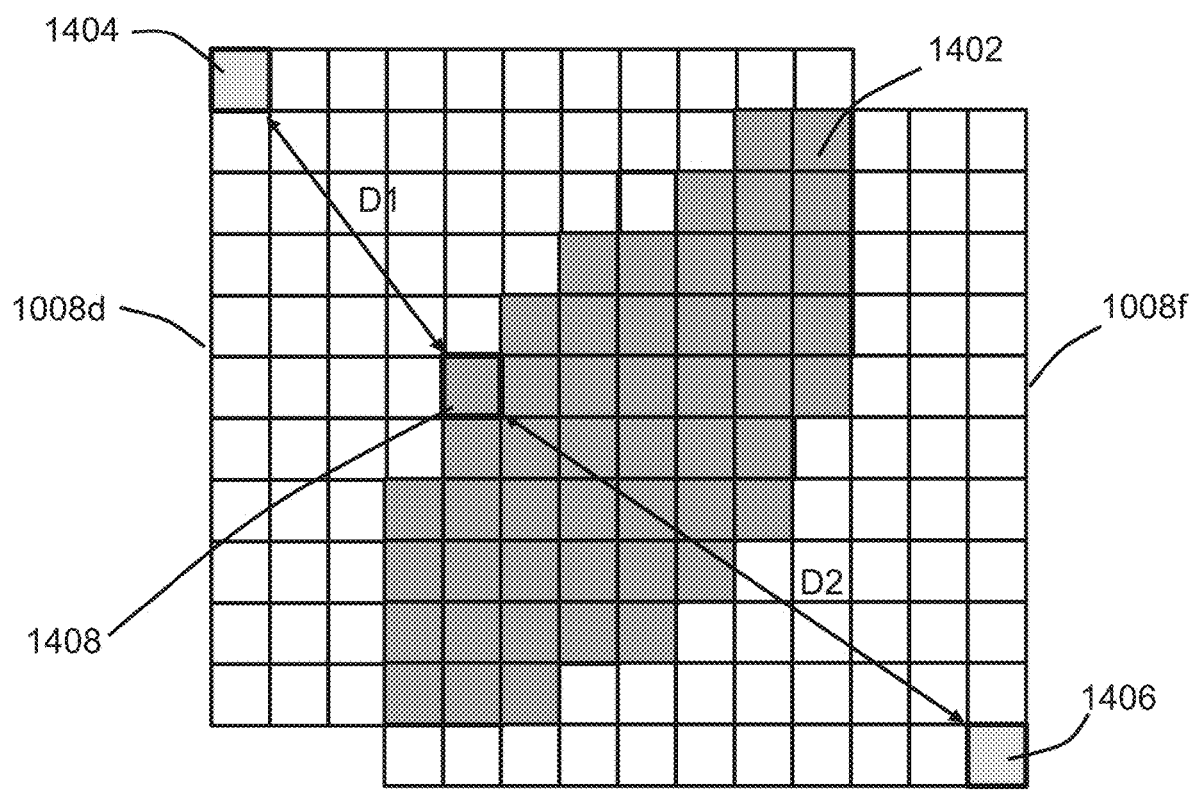
FIG. 14B is an enlarged view of a portion of zones comprising an overlapping portion.
Figure 14C:
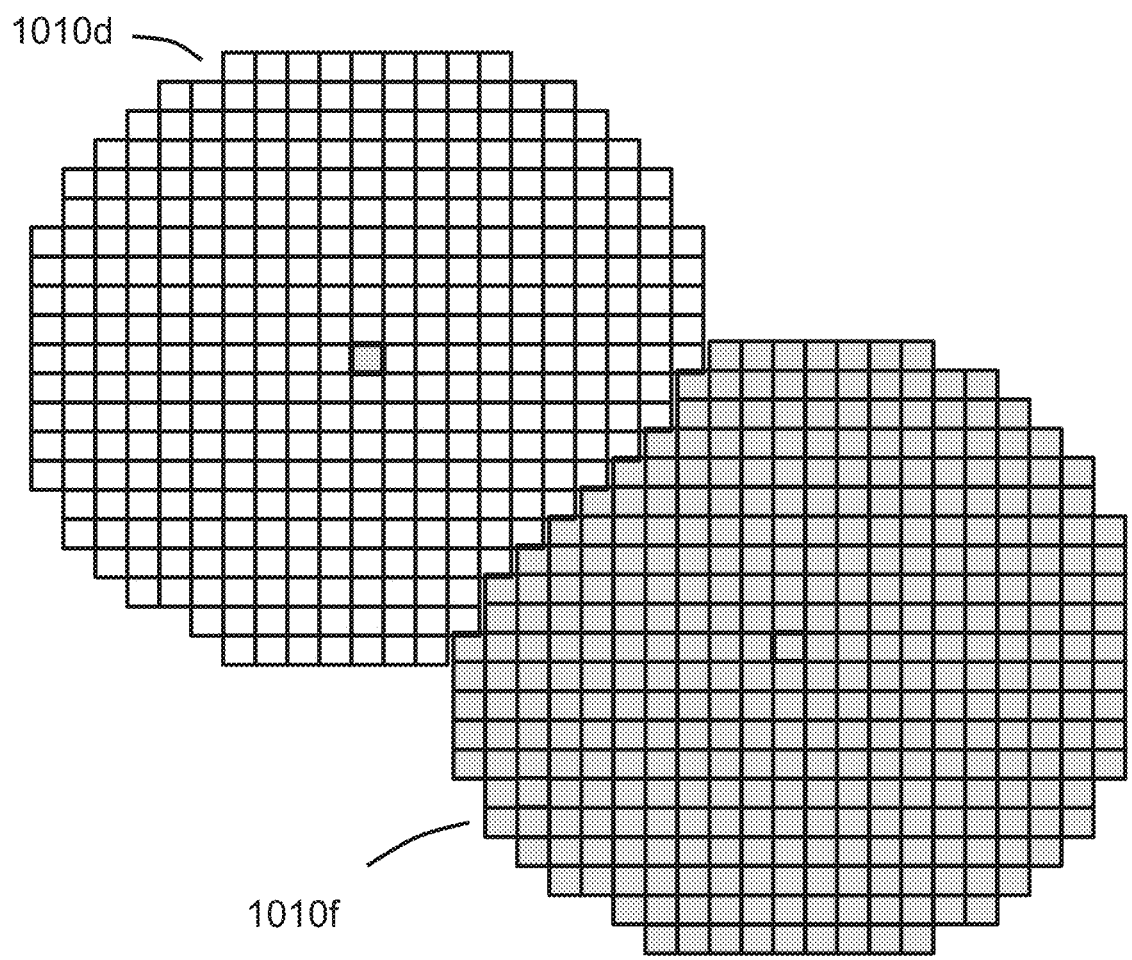
FIG. 14C is a simplified conceptual diagram of redefined zones.

For example, shown in FIG. 14A, is a simplified conceptual diagram of zones 1010d and 1010f comprising centre subzones 1404 and 1406 respectively, and a plurality of common subzones located within overlapping portion 1402 thereof. FIG. 14B is an enlarged view of a portion of zones 1010d and 1010f comprising overlapping portion 1402 that includes subzone 1408. Distance D1 between common subzone 1408 and centre subzone 1404 of zone 1010d is shorter than distance D2 between common subzone 1408 and centre subzone 1406 of zone 1010f, as shown. As such, common subzone 1408 is uniquely associated with zone 1010d and zone 1010f is redefined to not include common subzone 1408. Each subzone within portion 1402 is analyzed and then uniquely associated with one of zones 1010d and 1010f followed by the redefinition thereof. FIG. 14C is a simplified conceptual diagram of redefined zones 1010d and 1010f.

Figure 15A:
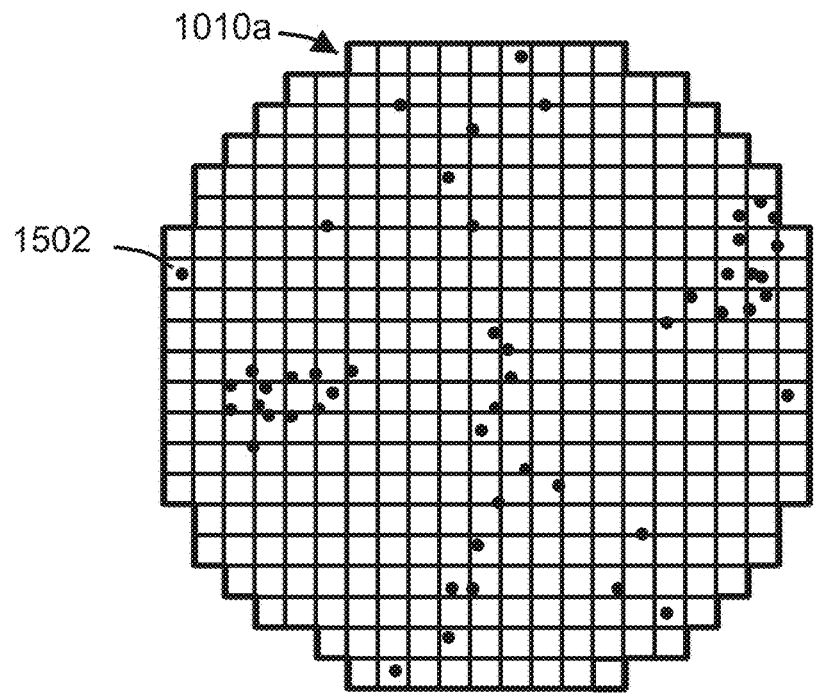
FIG. 15A is a simplified conceptual diagram of a zone comprising vehicle-position data points representing positions of vehicles therein.

FIG. 15A is a simplified conceptual diagram of zone 1010a comprising vehicle-position data points 1502 representing positions of vehicles indicated by raw vehicle data.

Figure 15B:
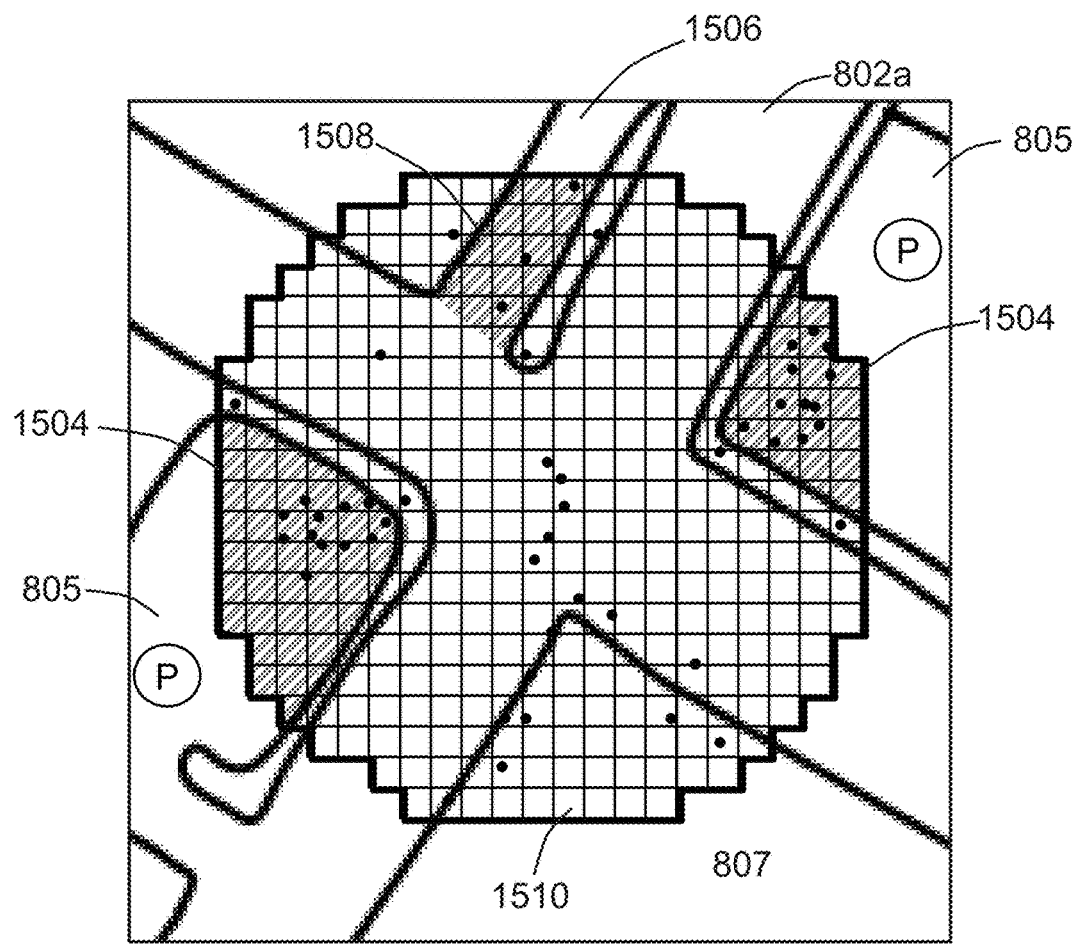
FIG. 15B is an enlarged view of a portion of an area and the simplified conceptual diagram of FIG. 15A imposed thereon.

Now referring to FIG. 15B, shown is an enlarged view of portion 1012 of area 800 imposed on the diagram of FIG. 15A. Vehicle-position data points 1502 are present within sample vehicle way 802a, areas 1504 in parking lots 805, portion 1508 of side street 1506, as well as in portions 1510 of green space areas 807, as shown. Vehicle-position data points found in portions 1510 may be due to GPS error or other position sensing technology error. As described above, a classifier for identifying subzones as portions of a vehicle way will be defined based on raw vehicle data associated with the subzones and corresponding zone. FIG. 15B illustrates how vehicle traffic may be dispersed in a zone in practise. However, a classifier may be used to identify only those subzones that are occupied by the vehicle way based on raw vehicle data associated with the entire zone.

Figure 16A:
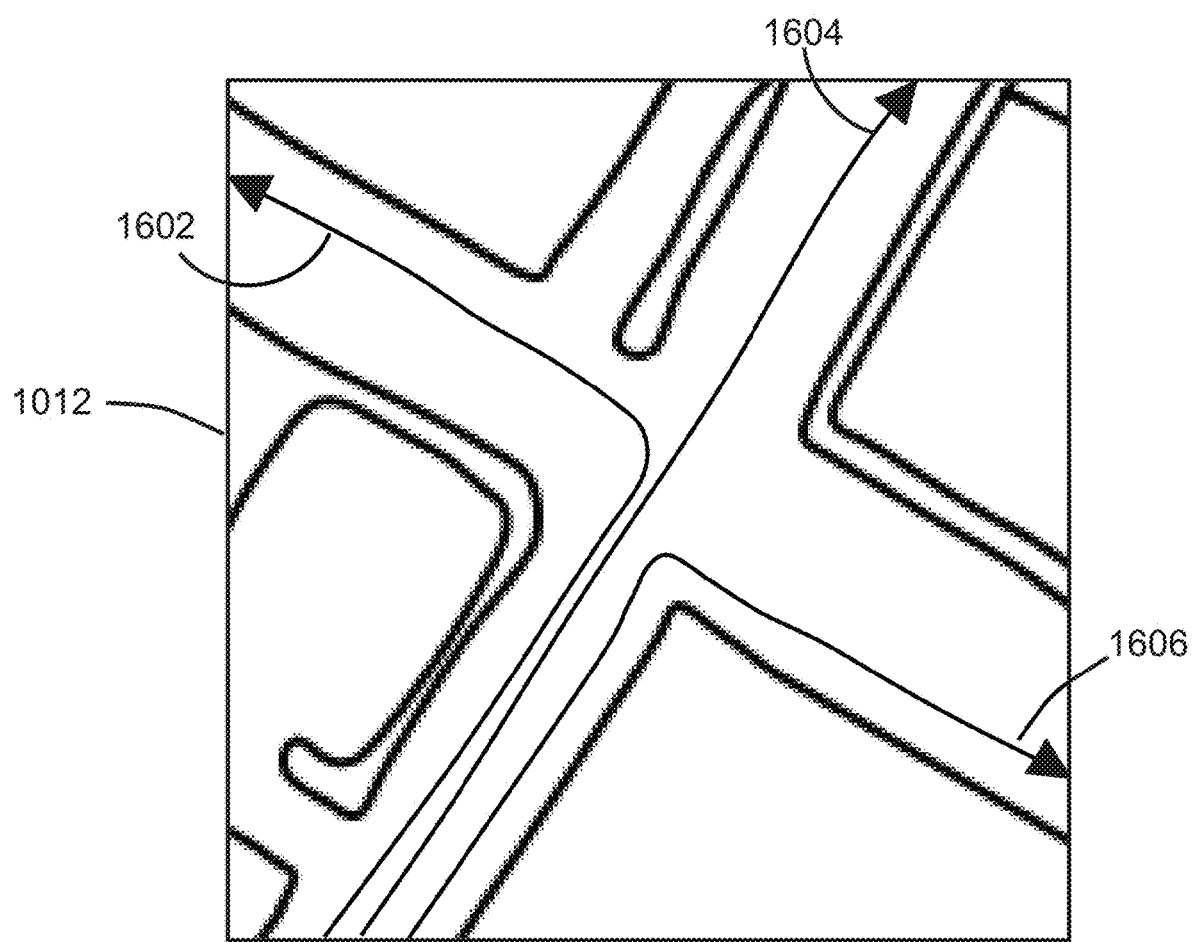
FIG. 16A an enlarged view of a portion of an area comprising a sample intersection and paths of vehicles that have traversed therethrough.

FIG. 16A shows an enlarged view of portion 1012 of area 800 comprising sample intersection 802a and paths 1602, 1604 and 1606 of one or more vehicles that have traversed therethrough. A same vehicle may have traversed sample intersection 802a at three different time intervals. Alternatively, three unique vehicles may have traversed sample intersection 802a. Paths 1602, 1604 and 1606 may be have been traversed by any combination of one or more vehicles.

Figure 16B:
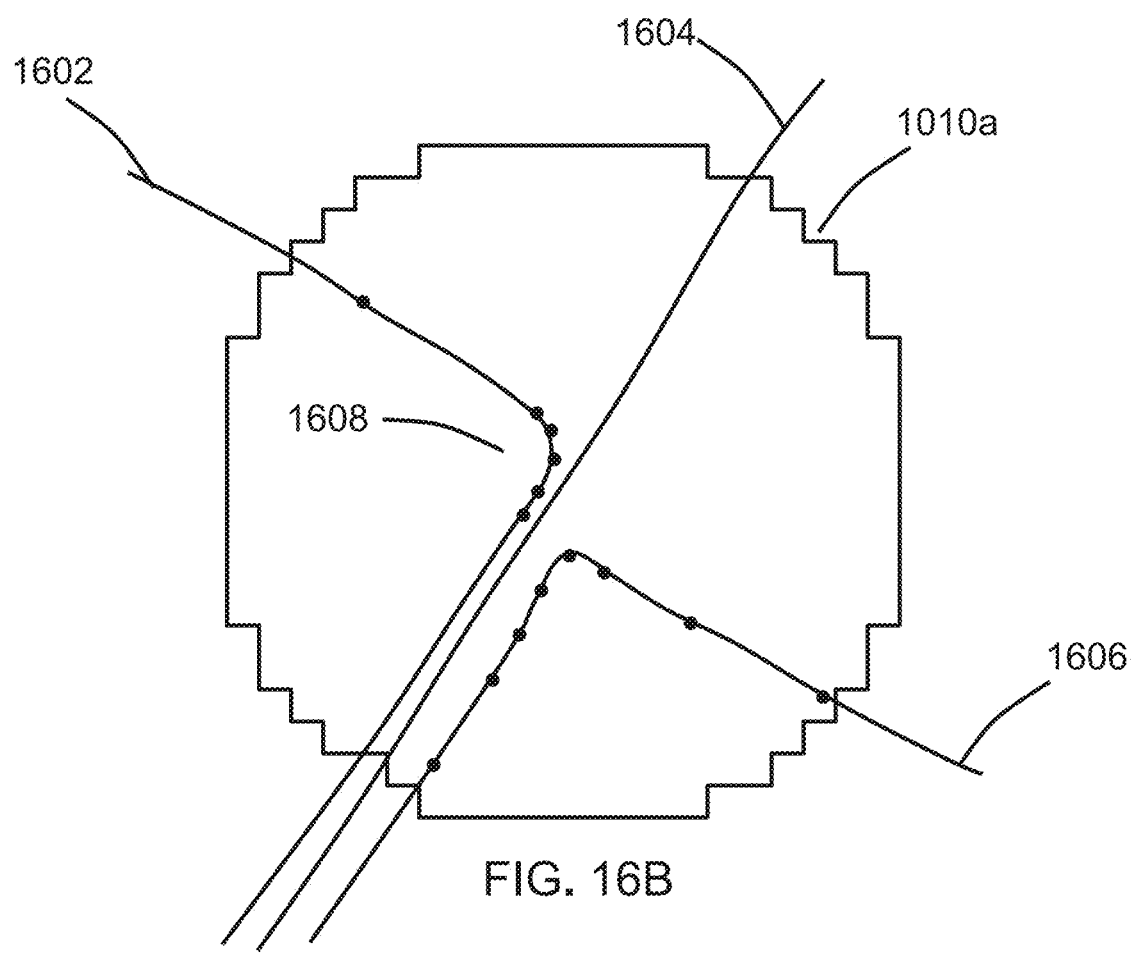
FIG. 16B is conceptual diagram of a zone and vehicle position-data points representing position data of raw vehicle data instances that correspond to a position along vehicle paths.

Now referring to FIG. 16B, shown is conceptual diagram of zone 1010a and vehicle position-data points 1608 representing position data of raw vehicle data instances that correspond to a position along paths 1602, 1604 and 1606. As shown in FIG. 16B, no vehicle-position data points correspond to path 1606. Data collected by a monitoring device when inside a zone may depend on various factors, such as, the frequency a monitoring device collects operation information, the size of the zone, or other predefined criteria for collecting data, among others. As a result, there may be instances when a monitoring device collects little-to-no data when traversing a zone. Accordingly, there may be occasions when selecting raw vehicle data based on vehicle position data indicating a position within a zone may not provide enough meaningful information that relates to all vehicles that have entered the zone. It would be advantageous to maximize information available in historical vehicle data related to vehicles that have entered a zone.

Block 706

Next, at block 706, a subset of raw vehicle data associated with each of the plurality of zones is selected from historical vehicle data. In an exemplary implementation, traffic analytics system 104a may access historical vehicle data, such as historical vehicle data in database 209, for selecting the subset stored by traffic analytics system 104a via communication network 110.

Figure 16C:
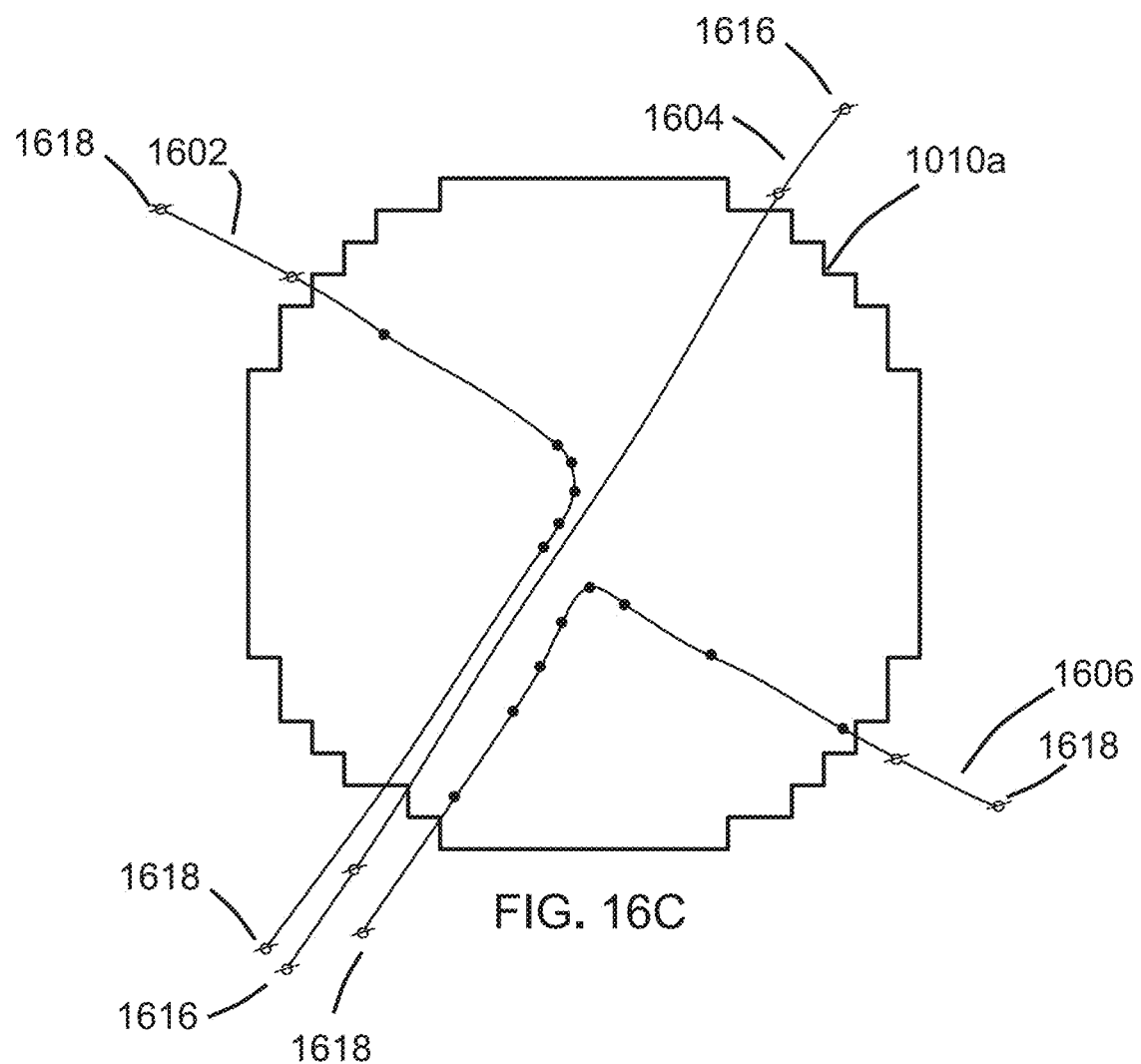
FIG. 16C illustrates vehicle position-data points corresponding to positions of vehicles in an area.

According to an embodiment, the subset of raw vehicle data may be selected based on positions inside a zone. Optionally, the subset of raw vehicle data may be selected based on positions inside and outside the zone. FIG. 16C illustrates vehicle position-data points corresponding to positions within portion 1012 of area 800. Including raw vehicle data corresponding to positions both inside and outside zone 1010a in the subset enables inclusion of raw vehicle data corresponding to the positions on path 1604, represented by vehicle-position data points 1616. This also enables inclusion of more raw vehicle instances corresponding to paths 1602 and 1606, represented by vehicle-position data points 1618.

Block 708

Figure 16D:
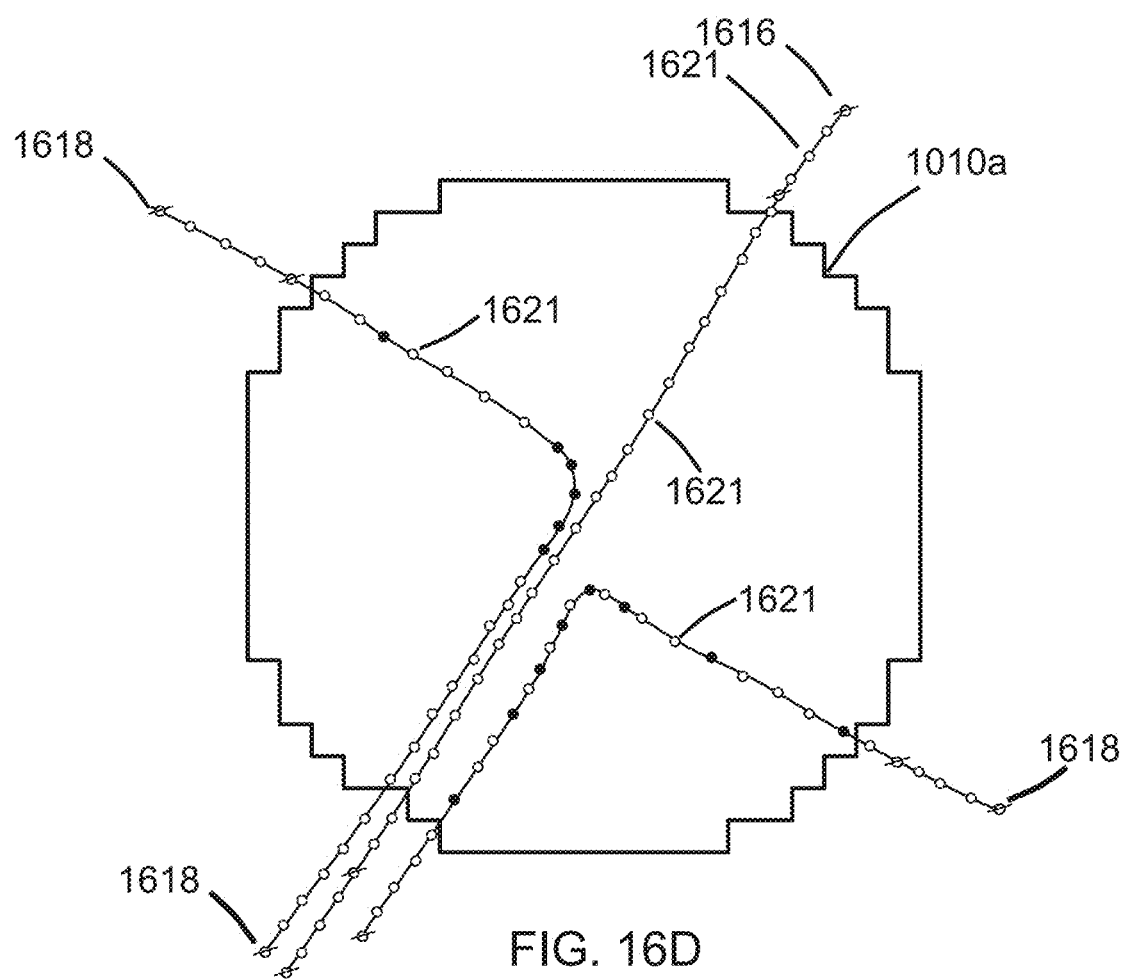
FIG. 16D illustrates vehicle-position data points corresponding to interpolated data instances.

Next, in block 708 interpolating data instances from the subset of raw vehicle data may be performed. For example, FIG. 16D illustrates vehicle-position data points 1621 corresponding to interpolated data instances. Selecting raw vehicle data corresponding to locations inside and outside a zone, at block 706, and then interpolating data therefrom at block 708, may provide more meaningful data for the purpose of training a machine learning algorithm in comparison to training based on raw vehicle data instances corresponding to locations inside a zone only. Block 708 is described further below with reference to FIGS. 16E-16F, FIG. 17, and FIGS. 18A-18B.

Figure 16E:
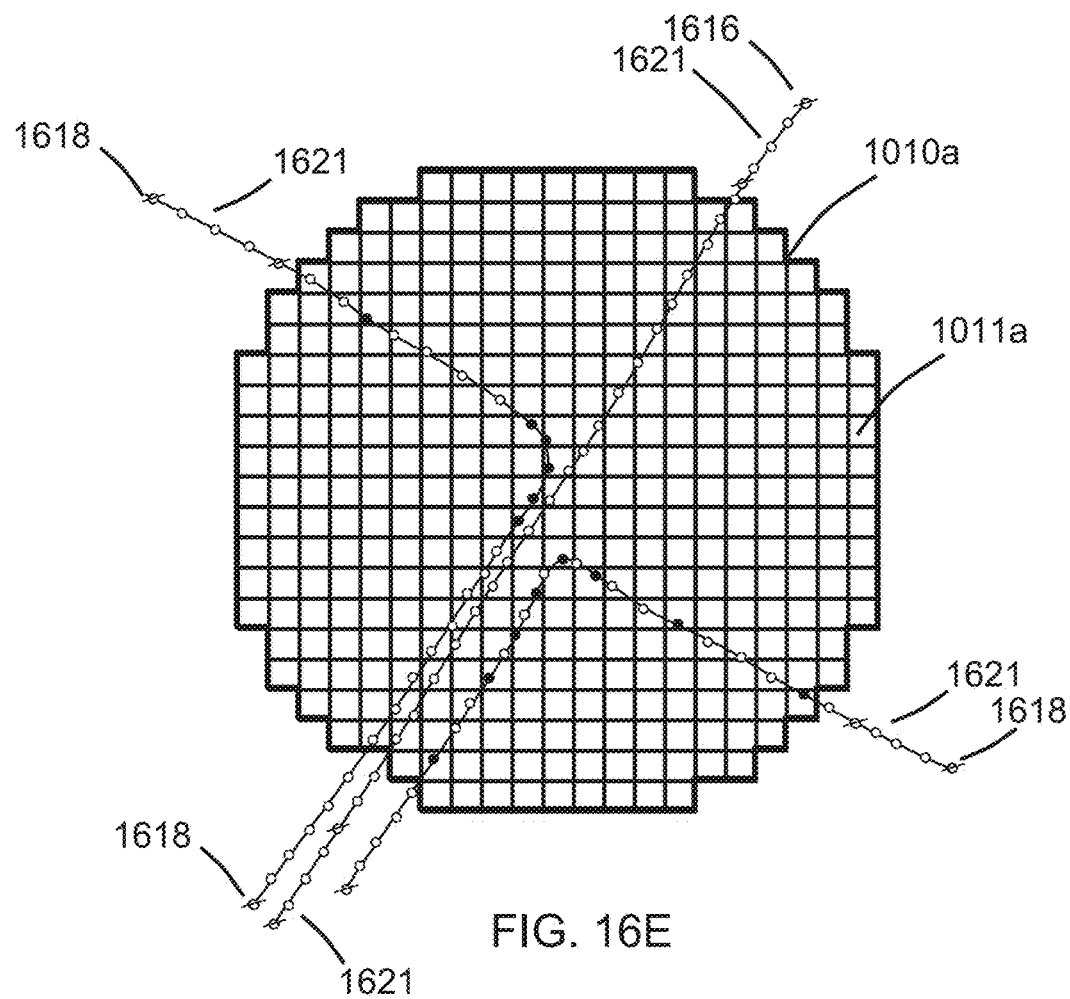
FIG. 16E is a conceptual diagram of a zone comprising a plurality of subzones illustrating vehicle-position data points corresponding to raw vehicle data and interpolated vehicle data.

Optionally, data instances are interpolated in dependence on the dimensions of subzones of a zone. For example, interpolating data such that there is one of an interpolated instance or raw vehicle data instance corresponding to a position in each subzone along a given path of a vehicle. Referring to FIG. 16E, shown is a conceptual diagram of zone 1010*a* comprising plurality of subzones 1011*a* of approximate dimension 4.77 m×4.77 m. In this example, data instances are interpolated such that there is at least one of an interpolated instance or raw vehicle data instance corresponding to a location in each subzone.

Figure 16F:
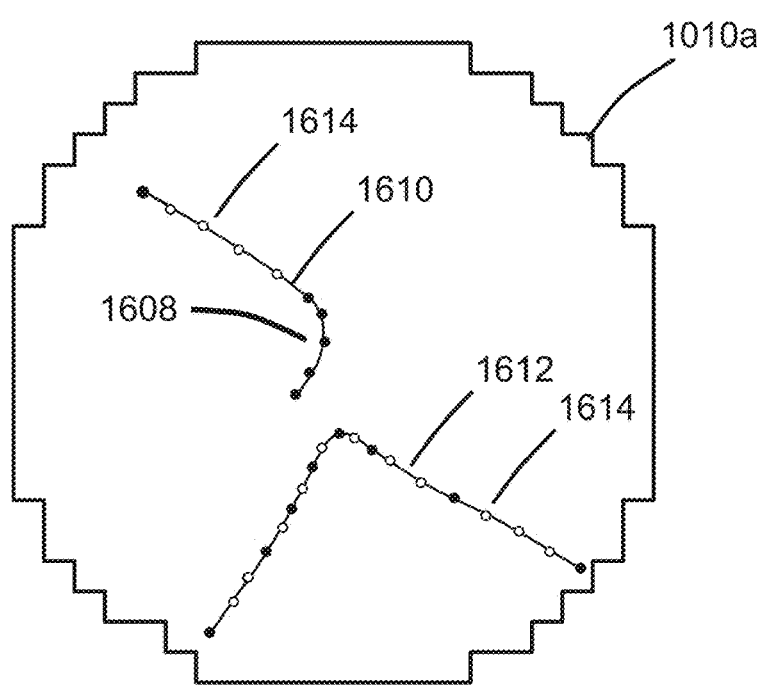
FIG. 16F illustrates vehicle-position data points inside a zone corresponding to interpolated data.

Alternatively, data may be interpolated from raw vehicle data corresponding to positions only inside a zone. Such as interpolated data instances corresponding to vehicle-position data points 1614, along portions 1610 and 1612 of paths 1602 and 1606, as shown in FIG. 16F.

Alternatively, there may be a sufficient amount of meaningful raw vehicle data corresponding to locations inside a zone that selecting raw vehicle data corresponding to locations outside a zone is unnecessary. Alternatively, there may be a sufficient amount of meaningful raw vehicle data in historical vehicle data that interpolation is unnecessary.

Figure 17:
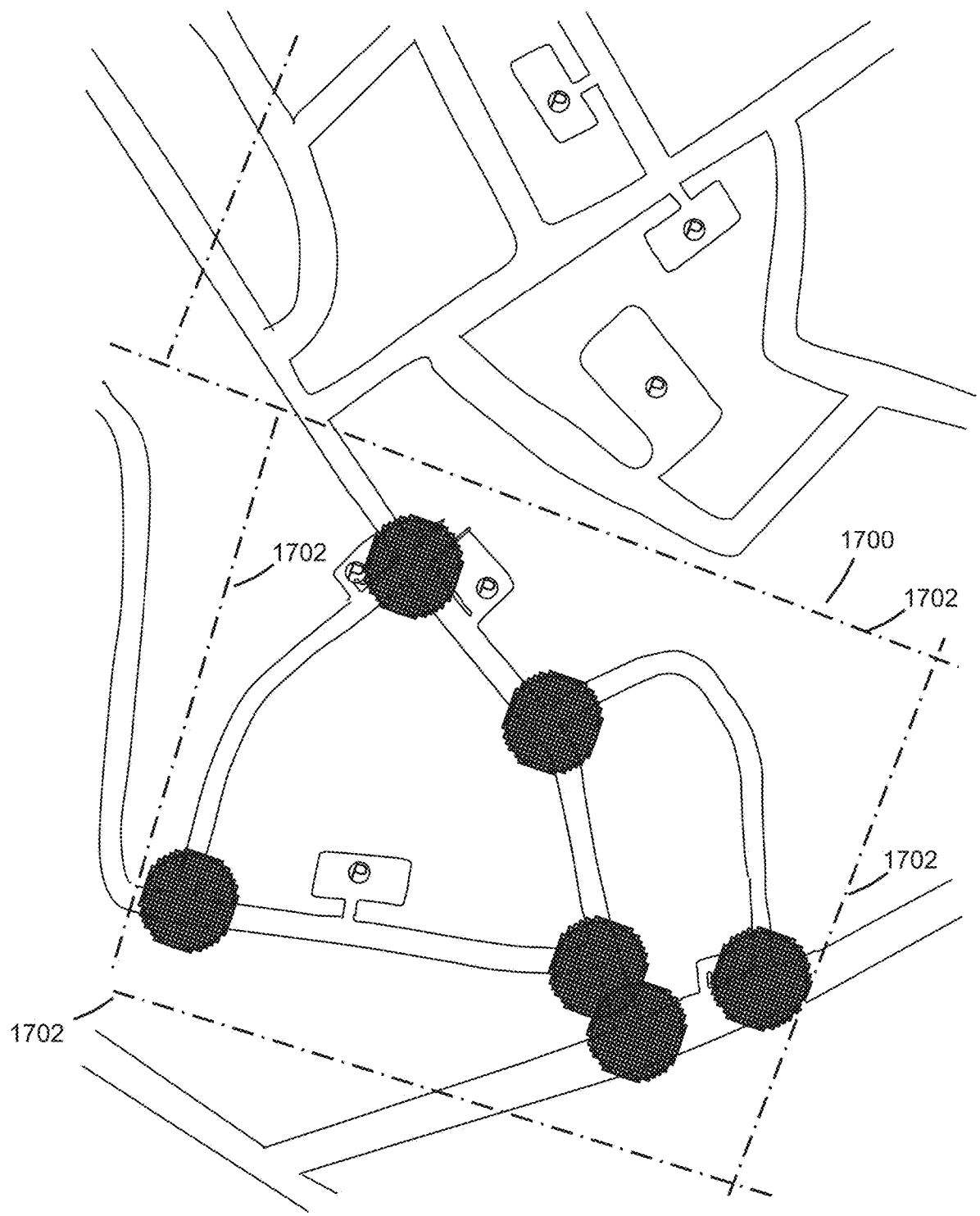
FIG. 17 is a simplified diagram of an exemplary implementation of a traffic zone encompassing zones.

According to some embodiments, the subset of raw vehicle data associated with a zone comprises raw vehicle data corresponding to positions within a traffic zone. In some instances, a traffic zone may encompass a unique zone. In other instances, a traffic zone may encompass more than one zone. FIG. 17 is a simplified diagram of an exemplary implementation of traffic zone 1700 encompassing zones 1010*a*-1010*f*. For instance, geographic coordinates of boundaries 1702 of traffic zone 1700 are provided to traffic analytics system 104*a* for defining traffic zone 1700.

Figure 18A:
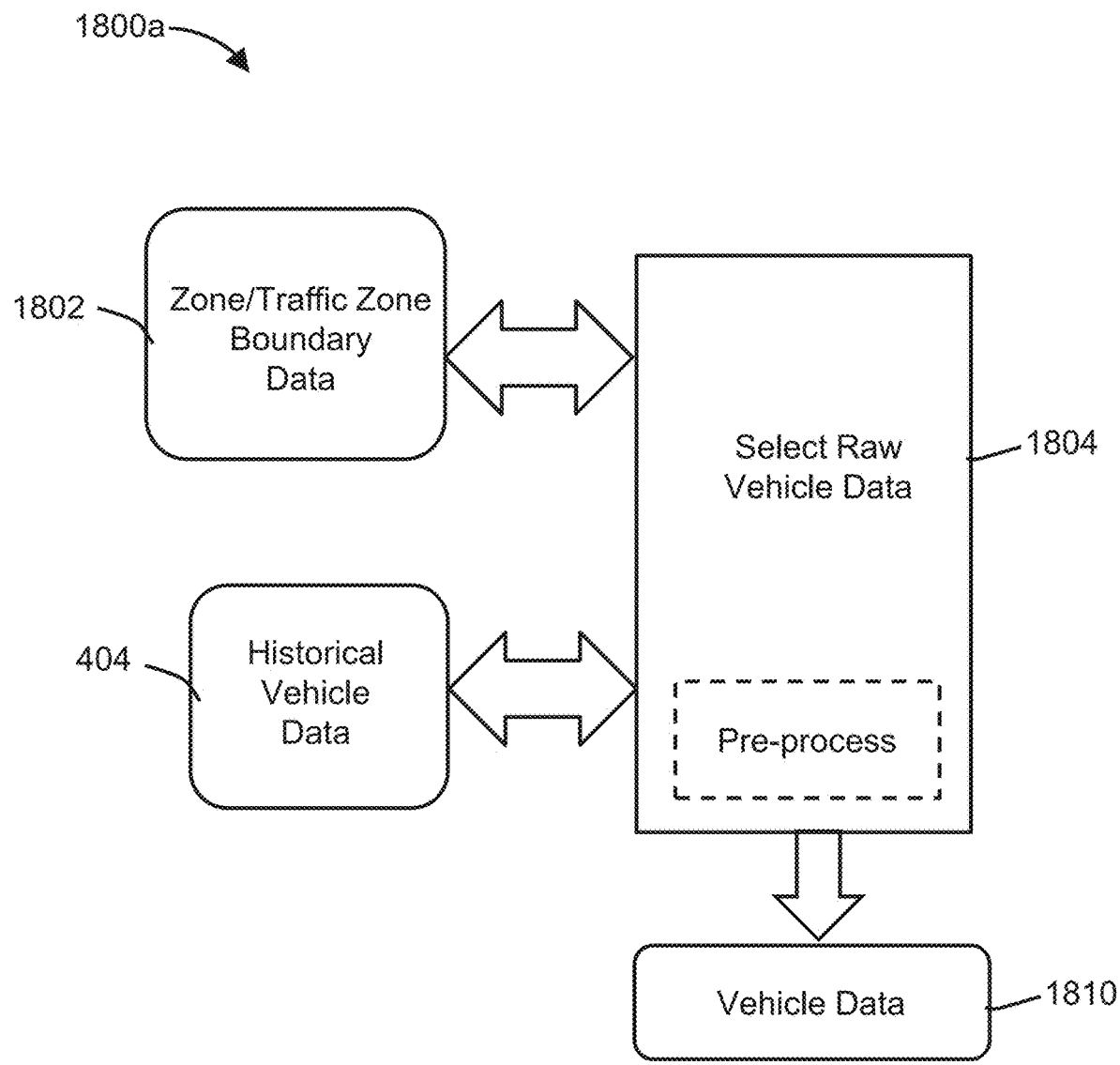
FIG. 18A is a simplified block diagram of a process for obtaining vehicle data for generating features.

FIG. 18A is a simplified block diagram of process 1800*a* for obtaining data, hereinafter referred to as vehicle data, for generating features. Vehicle data may be indicative of vehicle operating conditions for a plurality of corresponding vehicles. As mentioned above, such data may be a subset of raw vehicle data selected from first historical vehicle data 404 that corresponds to a location within a zone and/or traffic zone. For example, boundary data 1802 comprises zone boundary data and/or traffic zone data indicative of locations of boundaries of a zone and/or a traffic zone, respectively. In block 1804, raw vehicle data is selected from first historical vehicle data 404 based on boundary data 1802 to form first vehicle data 1810.

Figure 18B:
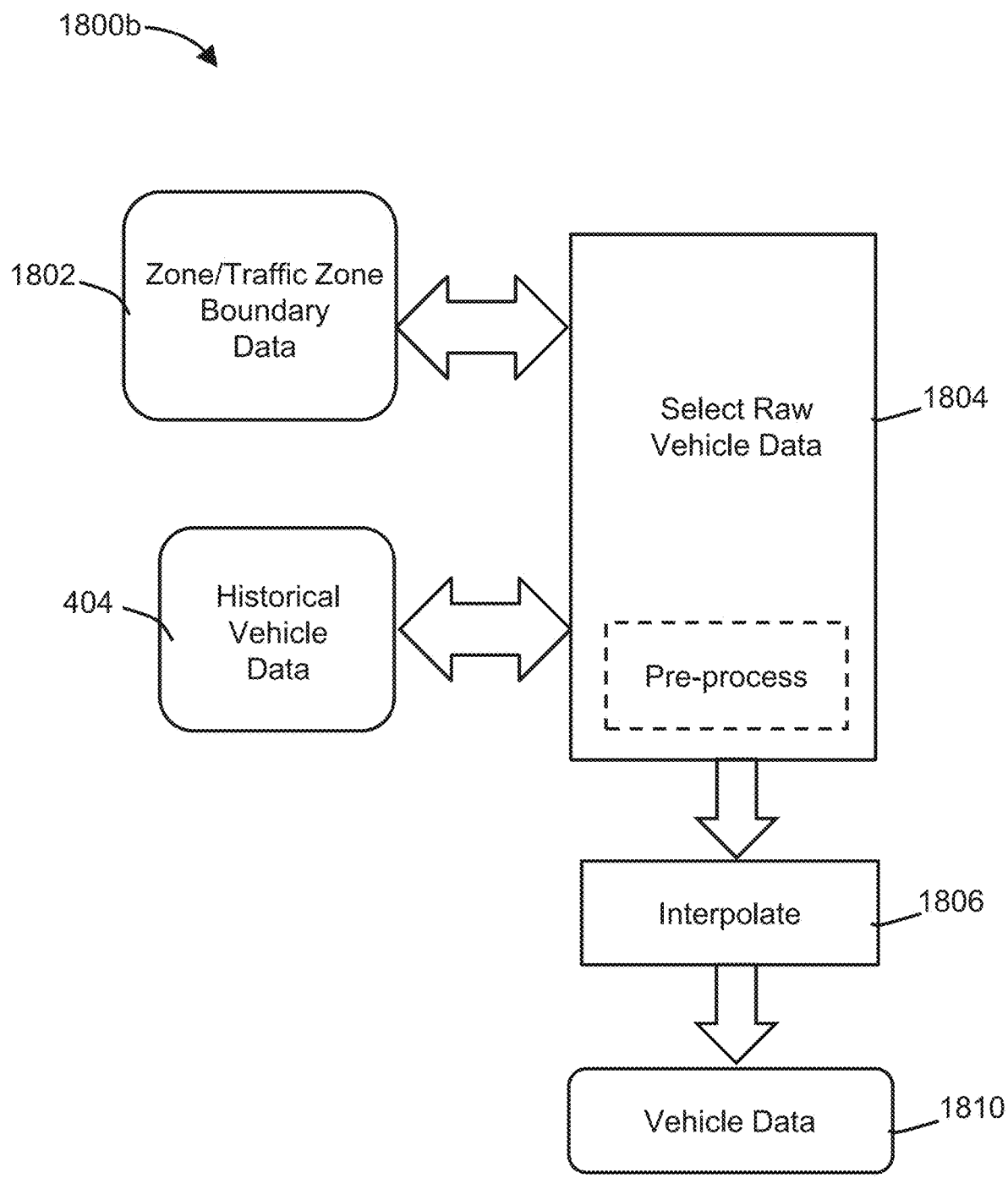
FIG. 18B is a simplified block diagram of another process for obtaining vehicle data for generating features.

FIG. 18B is a simplified block diagram of an alternative process 1800*b* for obtaining vehicle data for generating features. Such data may be a subset of raw vehicle data selected from first historical vehicle data 404 that corresponds to a location within a zone and/or traffic zone. For example, boundary data 1802 comprises zone boundary data and/or traffic zone data indicative of locations of boundaries of a zone and traffic zone, respectively. In block 1804, raw vehicle data is selected from first historical vehicle data 404 based on boundary data 1802. Next, in block 1806, data is interpolated from the raw vehicle data selected in block 1802 and first vehicle data 1810 comprising the raw vehicle data and the data interpolated therefrom is formed.

Optionally, raw vehicle data selected from first historical vehicle data 404 may be selected based on date and time operating conditions are logged. For instance, raw vehicle data corresponding to a particular date and/or time range is selected. For example, only raw vehicle data collected over the last 3 months may be selected.

Optionally, at block 1804, the selected data is pre-processed, the selected data is pre-processed, such as, by removing outliers (e.g., unlikely speed values), duplicate values, and the like.

Block 710

Next, in block 710, features for each of the plurality of subzones of each of the plurality of zones are extracted from vehicle data. Features of the types described herein may include features that are present in a vehicle data instance or a subset of vehicle data instances and/or features derived therefrom. Features present in an instance or a subset of instances may include numeric values that are explicitly set out therein. Specific and non-limiting examples of such features include, a minimum or maximum numeric value in the subset (where a minimum/maximum may be absolute and/or relative). The minimum or maximum data value may require some analysis, such as a comparison of values, but the minimum/maximum value itself will be a value found within the subset. For instance, a plurality of vehicle data instances in a vehicle data subset may be analyzed to determine a maximum speed of the subset. Block 710 is further described below with reference to FIGS. 19A-19B, FIGS. 20A-20E, FIG. 21, FIGS. 22A-22B, FIG. 23, and FIGS. 24A-24B.

Derived features may describe an instance or subset of vehicle data instances, but include a value not found therein. Instead, a value of a derived feature may be derived from the instance or subset, such as obtained through performing one or more computations on the instance or subset. Specific and non-limiting examples of derived features include average speed, total number of vehicle visits and ignition ratio. Optionally, a derived feature may describe a first derived feature forming a second derivative of the first derived feature. Additional derivatives of features may also be possible.

The features may additionally or alternatively be derived from the performance of one or more statistical computations on a vehicle data subset. For instance, a derived feature that may be employed may include standard deviation, mean, and median of values found in a vehicle data subset. For example, standard deviation, mean, and/or median of speed values of vehicles that have traversed a subzone. Features will be described in greater detail below.

The features may be prepared for use in training the model, for instance, by traffic analytics system 104*a*. Preparing the data may include various functions such as removing outliers (e.g., unlikely speed values), duplicate values, and the like.

Figures 19A, 19B:
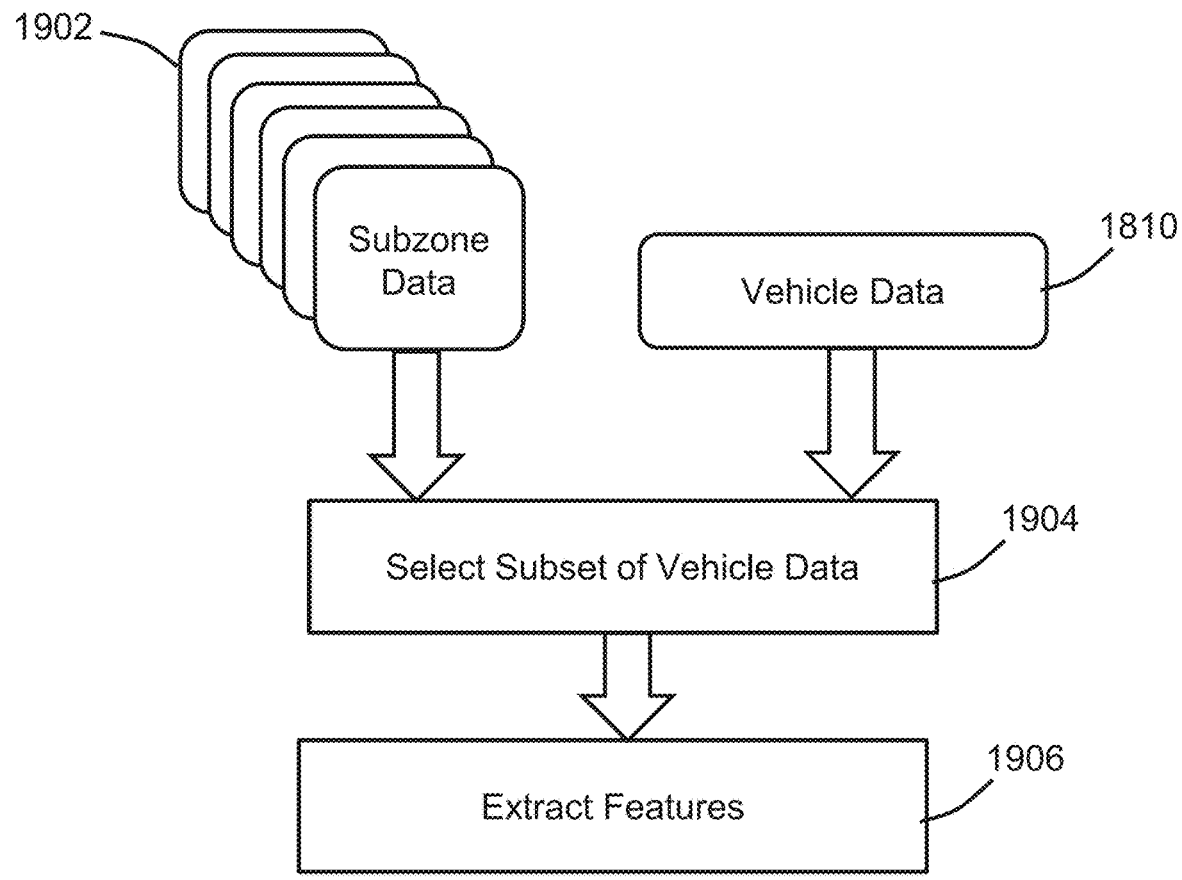
FIG. 19A is a conceptual block diagram of a feature extraction function for generating features from vehicle data.
FIG. 19B is an exemplary table representing data comprising each subzone ID and a plurality of features for each Geohash.

FIG. 19A is a conceptual block diagram of a feature extraction function for generating features from vehicle data. In block 1904, a subset of vehicle data for each of the plurality of subzones of the plurality of zones may be selected from vehicle data based on subzone data. Once selected, the subset of vehicle data is analyzed and/or computations are performed thereon to extract/generate subzone features 1906. For each subzone in each zone, a plurality of features is generated. These features may be used to identify patterns in the features by a machine learning algorithm during training for defining a classifier.

For example, a subset of vehicle data is be selected from first vehicle data 1810 based on subzone data 1902 for each of the plurality of subzones of zones 1010*a*-1010*f*. Once selected, the subset of vehicle data instances is analyzed and/or computations are performed thereon to extract/generate features 1906. For instance, for each Geohash in zones 1010*a*-1010*f*, a plurality of features, (e.g., F1-Fn) are generated. FIG. 19B is an exemplary table 1908 representing data comprising a plurality of features for each Geohash.

Subzone-Related Features

According to an embodiment, a plurality of subzone-related features is based on and/or derived from a subset of vehicle data associated with each subzone.

In a first exemplary implementation, the subset is a first subset of vehicle data corresponding to a position within a subzone. Subzone-related features indicate measurements/attributes of vehicle operating conditions of at least one vehicle that has operated in the subzone.

For example, FIG. 20A is a conceptual diagram of portion 2002 of zone 1010*a* as demarcated by line 1250A-1250A of FIG. 12D. Portion 2002 comprises subzone 2004, as shown. An enlarged view of subzone 2004 is depicted in FIG. 20B comprising vehicle-position data points 2006 each thereof indicative of a position of one or more vehicles that have entered subzone 2004 at one point in time.

Illustrated in FIG. 20C is a simplified functional block diagram of a function that may be implemented at block 1904. First vehicle data 1810 and subzone 2004 subzone data 2007 is provided in block 2008 and a first subset of vehicle data corresponding to a position within subzone 2004 may be selected. The first subset of vehicle data is represented by the vehicle-position data points 2006 shown in FIG. 20B. Once selected, the first subset of vehicle data is processed at block 2010. For instance, the first subset of vehicle data instances may be analyzed and/or have computations performed thereon at block 2010 to form at least one feature 2012.

FIG. 20D is a table 2014 representing an example of a first subset of vehicle data corresponding to a position within subzone 2004. Position data 2018 of each instance 2016 is represented by vehicle-position data points 2006 as shown in FIG. 20B. Subzone-related features formed from processing the first subset of vehicle data are indicative of attributes/measurements of vehicle operating data of vehicles with corresponding device IDs ID1, ID2, ID3, ID4, when operating in subzone 2004. These subzone-related features may be used by the ML algorithm to identify patterns. For descriptive purposes, only 4 vehicles are shown to have entered subzone 2004, in this example. In practice however, the number of vehicles that may enter a subzone may be more or less than four.

Some specific and non-limiting examples of the subzone-related features are provided in Table 1 below.

TABLE 1

Subzone-related Features

Minimum vehicle speed
Maximum vehicle speed
Average vehicle speed
Median vehicle speed
Standard deviation of vehicle speed
Minimum ignition
Maximum ignition
Total number of ignitions on
Total number of ignitions off
Average number of ignitions
Ignition ratio
Total number of vehicle visits
Average number of visits/vehicle TABLE 1-continued Subzone-related Features Minimum number of vehicle visits/day
Maximum number of vehicle visits/day
Average number of vehicle visits/day
Median number of vehicle visits/day
Standard deviation of number of vehicle visits/day
Minimum unique number of vehicle visits/day
Maximum unique number of vehicle visits/day
Median unique number of vehicle visits/day
Standard deviation of unique number of vehicle visits/day
Average unique number of visits/day
Total number of unique vehicle visits Other subzone-related features may be based on and/or are derived from the first subset of vehicle data instances. Embodiments are not intended to be limited to the example features described herein. FIG. 20E is a table of exemplary subzone-related features and feature values based on the subset of vehicle data instances. Other features may be based on and/or be derived from the first subset of vehicle data.

Ignition state indicates whether a vehicle is in a driveable state or not. For example, an internal combustion engine (ICE) vehicle has an ignition state of on when the engine is on. An ICE vehicle has an ignition state of off when the engine is off, even if electrical power is provided to vehicle circuitry by the battery. In another example, an electric vehicle (EV) has an ignition state of on when electricity is provided to the EV's electric motor, whereas the ignition state is off when no electricity is provided to the EV's electric motor.

The minimum ignition feature of a subzone has a value of 1 only when all vehicles that have entered a subzone have an ignition state of 1. This may indicate that the vehicle way is not employed as a parking area.

The maximum ignition feature has a value of 0 only when all vehicles in a subzone have an ignition state of off. This may indicate that the subzone is a portion of vehicle way employed as a parking area.

The ignition ratio feature is defined as, $$\text{Ignition ratio} = \frac{\text{Total number of ignitions off}}{(\text{Total number of ignitions off}) + (\text{Total number of ignitions on})}$$

In a second exemplary implementation, subzone-related features may be based on and/or derived from the first subset of vehicle data and a second subset of vehicle data including vehicle data temporally preceding and/or subsequent thereto for a same vehicle.

Figure 21:
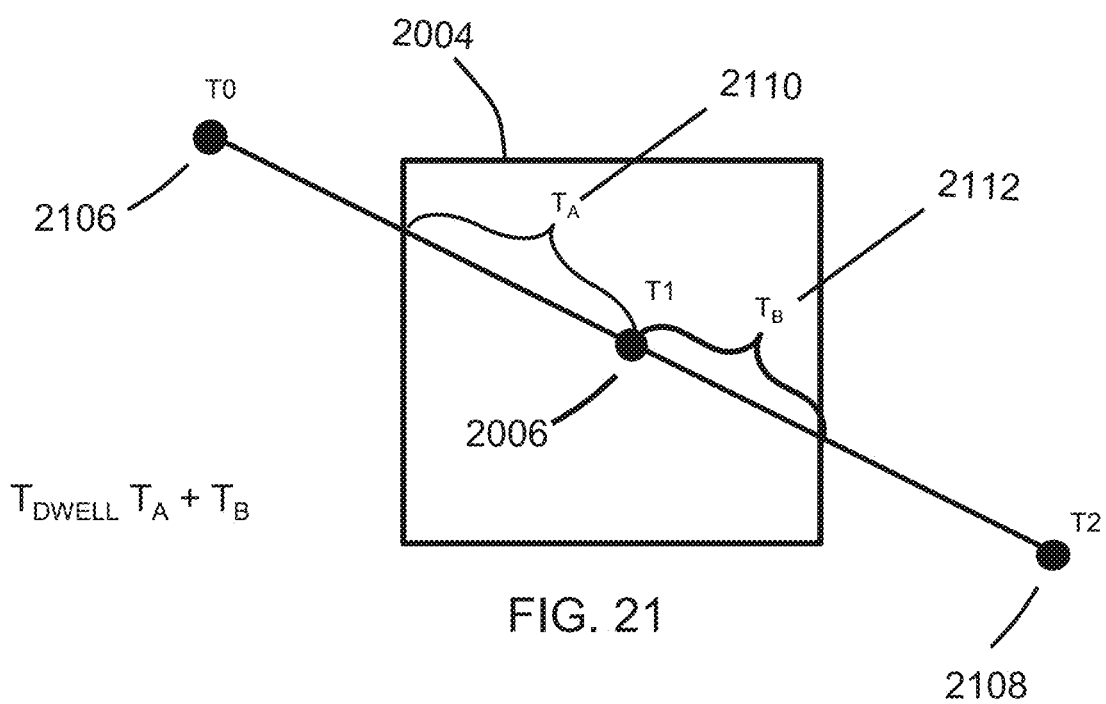
FIG. 21 is a simplified diagram of a subzone and a vehicle-position data points.

For instance, the first and second subsets of vehicle data may be processed for providing subzone-related features indicative of dwell time of a vehicle within a given subzone. Shown in FIG. 21 is a simplified diagram of subzone 2004 and vehicle-position data point 2006 representing a vehicle position at T1 according to vehicle data. A dwell time of a vehicle within subzone 2004 may be determined by obtaining vehicle data corresponding to the same vehicle at a preceding point in time, T0, and a subsequent point in time, T2, represented by vehicle-position data points 2106 and 2108 respectively. As geographic coordinates of boundaries of subzone 2004 are known, the time TA (2110) between the time a vehicle enters subzone 2004 and arrives at position 2006, and the time TB (2112) between the time the vehicle leaves position 2006 and exits subzone 2004 may be determined. The dwell time, (e.g., how long the vehicle is in a subzone) may be calculated by, $T_{DWELL}=TA+TB$. For each vehicle that enters subzone 2004 a dwell time is calculated and features, average dwell time, minimum dwell time, maximum dwell time, median dwell time and standard deviation of dwell time are based thereon or derived therefrom.

In a third exemplary implementation, subzone-related features may be based on and/or derived from the first subset of vehicle data and a third subset of vehicle data including vehicle data corresponding to vehicle data temporally subsequent thereto for a same vehicle. In this example subzone-related features relates to the travel time of a vehicle between a location within a subzone and the first location the vehicle ignition state is off. In other words, the travel time between a position within a subzone and position the vehicle parks, i.e., time to park.

Figures 22A, 22B:
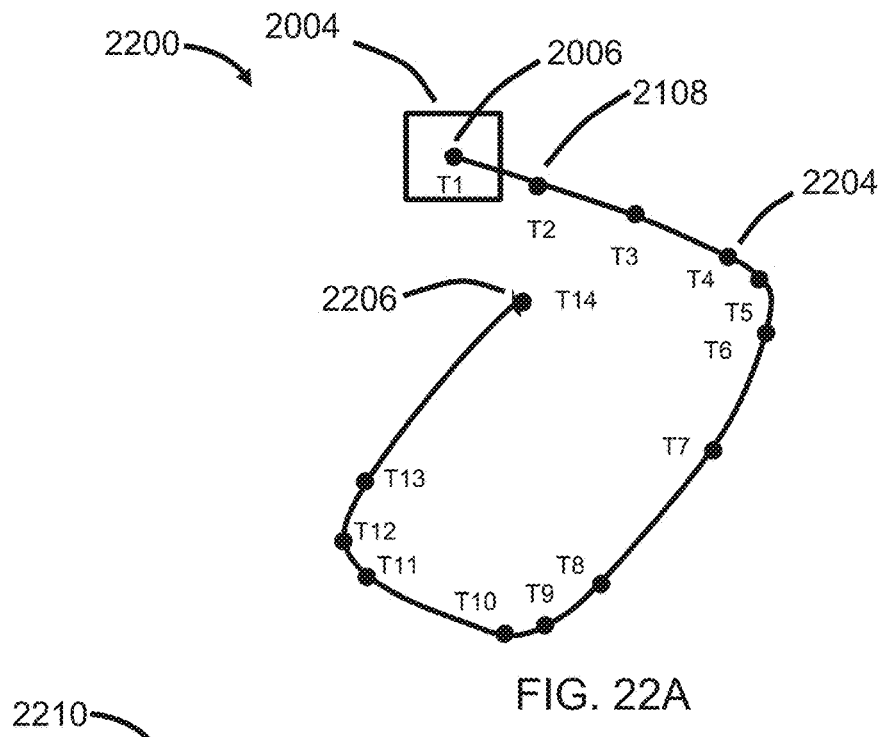
FIG. 22A is a simplified diagram of a path of a vehicle that has traversed a subzone.
FIG. 22B is a table representing a subset of vehicle data.

FIG. 22A is a simplified diagram of a path of a vehicle that has traversed subzone 2004 having a related vehicle data instance corresponding to vehicle-position data point 2006 at time T1, as shown. Each temporally subsequent vehicle data instance is represented by a vehicle-position data points 2204 at times T1-T14 each representing a new location of a same vehicle at consecutive points in time as the vehicle travels along path 2200. Vehicle-position data point 2206 at T14 represents the first location the vehicle ignition is turned off, indicating that the car has parked. The time to park from position 2006 to 2206 maybe calculated as $T_{TIMETOPARK}=T14-T1$. For each vehicle that enters subzone 2004 the time to park is calculated to provide subzone-related features such as, average time to park, minimum time to park, maximum time to park, median time to park, and standard deviation of time to park.

Table 2210 of FIG. 22B represents a third subset of vehicle data corresponding to vehicle-position data points 2204 at times T1-T14.

In some cases, a vehicle ignition is ON and the speed is 0 km/hr, such as at T9. For example, when a vehicle is not moving yet the ignition is on. For instance, at red lights, stop signs, heavy traffic (stop-and-go), picking up passengers, going through a drive through, among others.

Zone-Related Features

According to an embodiment, zone-related features may be based on and/or derived from a fourth subset of vehicle data instances associated with the zone and/or subzone-related features. Table 2 lists specific and non-limiting examples of such zone-related features. These zone-related features may be determined for each subzone of the plurality of subzones for each zone of the plurality of zones.

TABLE 2

| Zone-Related Features |
| --- |
| Zone Minimum Ignition OFF |
| Zone Maximum Ignition OFF |
| Zone Average Vehicle Speed |
| Zone Maximum Vehicle Speed |
| Zone Minimum Vehicle Speed |
| Zone Average Number of Unique Visits/Day |
| Zone Minimum Number of Unique Visits/Day |
| Zone Maximum Number of Unique Visits/Day |
| Zone Average Median Number of Unique Visits/Day |
| Zone Total Average Number of Unique Visits/Day |

In a first exemplary implementation, zone average speed may be determined by selecting a subset of vehicle data instances corresponding to a position within a zone and calculating the average speed therefrom.

In a second exemplary implementation, zone average speed may be determined by calculating an average of the average speed subzone-related features of all subzones in a zone.

According to an embodiment, other zone-related features may be based on and/or derived from a fifth subset of vehicle data instances associated with the zone. Table 3 lists specific and non-limiting examples of such zone-related features. These zone-related features may be determined for each subzone of the plurality of subzones for each zone of the plurality of zones.

TABLE 3

| Zone-Related Features |
| --- |
| Zone Total Number of Visits |
| Zone Total Number of Unique Visits |

In an exemplary implementation, zone total number of visits may be determined by selecting a subset of vehicle data instances corresponding to a position within a zone and calculating the total number of vehicles that correspond to the zone.

According to an embodiment, other zone-related features may be based on and/or derived from another portion of subzone-related features. Table 4 lists specific and non-limiting examples of such zone-related features. These zone-related features may be determined for each subzone of the plurality of subzones for each zone of the plurality of zones.

TABLE 4

| Zone-Related Features |
| --- |
| Zone Average Time to Park |
| Zone Maximum Time to Park |
| Zone Minimum Time to Park |
| Zone Maximum Dwell Time |
| Zone Minimum Dwell Time |
| Zone Median Dwell Time |
| Zone Average Dwell Time |
| Zone Minimum Number Of Unique Visits |
| Zone Average Number Of Unique Visits |
| Zone Maximum Number Of Unique Visits |
| Zone Average Total Number of Visits |
| Zone Maximum Total Number of Visits |
| Zone Minimum Total Number of Visits |

For example, zone average dwell time may be determined by calculating an average of the average dwell time subzone-related features of all subzones in a zone.

Subzone-Zone-Related Features

According to an embodiment, subzone-zone-related features may be based on and/or derived from a portion of subzone-related features in relationship to a portion of zone-related features. Subzone-zone-related features are determined for each subzone of the plurality of subzones for each zone of the plurality of zones.

Specific and non-limiting examples of relationship-based features are listed in Table 5 below.

TABLE 5

| Subzone-Zone-Related Features |
| --- |
| Minimum Vehicle Speed Ratio |
| Average Vehicle Speed Ratio |
| Maximum Vehicle Speed Ratio |
| Minimum Ignition Off Ratio |
| Maximum Ignition Off Ratio |

TABLE 5-continued

Subzone-Zone-Related Features

Maximum Dwell Time Ratio
Minimum Dwell Time Ratio
Average Median Dwell Time Ratio
Average Dwell Time Ratio
Minimum Time to Park Ratio
Average Time to Park Ratio
Maximum Time to Park Ratio
Minimum Number of Unique Vehicle Visits Ratio
Maximum Number of Unique Vehicle Visits Ratio
Average Number of Unique Vehicle Visits Ratio
Minimum Unique Number of Vehicle Visits/Day Ratio
Maximum Unique Number of Vehicle Visits/Day Ratio
Average Unique Number of Vehicle Visits/Day Ratio
Total Unique Number of Vehicle Visits/Day Ratio
Average Median Unique Number of Vehicle Visits/Day Ratio
Minimum Total Number of Vehicle Visits Ratio
Maximum Total Number of Vehicle Visits Ratio
Average Total Number of Vehicle Visits Ratio
Total Number of Vehicle Unique Visits Ratio
Total Number of Vehicle Visits Ratio In an exemplary implementation, subzone-zone-related feature average speed ratio may be determined by calculating the ratio of subzone-related feature average speed to zone-related feature, zone average speed.

As described above, raw vehicle data may be selected from historical vehicle data based on a particular date and/or time period. As such, values of features described herein may vary accordingly.

Spatial-Related Features

According to an embodiment, spatial-related features may be based on and/or derived from spatial relationship data of a subzone to the zone. According to an embodiment, spatial-related features may be based on and/or derived from a spatial relationship data of a subzone to the plurality of subzones, or a portion thereof, of a zone.

Figure 23:
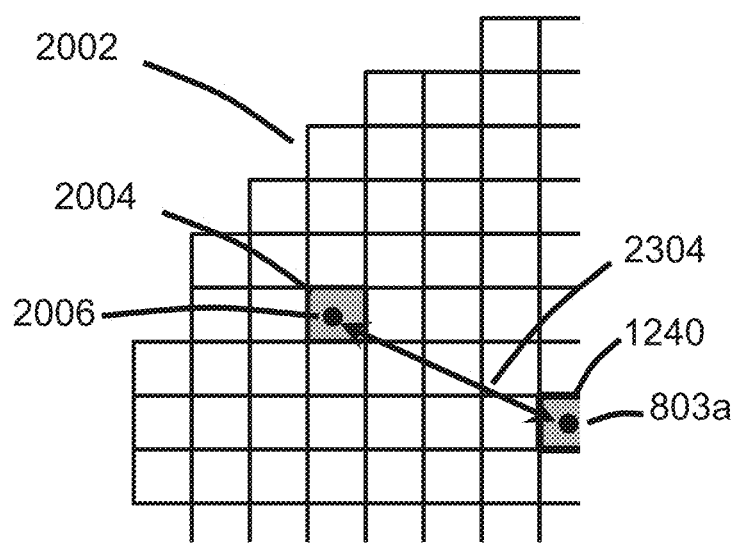
FIG. 23 is a simplified diagram of a portion of a zone.

In a first exemplary implementation, for each subzone, a spatial-related feature may be based on and/or derived from the distance of the subzone to the centre point of a zone. For instance, one method for determining the distance between a subzone and the centre point of a zone comprises, determining a location of a centre point of the subzone and the location of the centre point of the centre subzone of a zone. Next, the distance therebetween is calculated. For example, shown in FIG. 23 is a simplified diagram of portion 2002 including centre point 2006 of subzone 2004, and reference point 803a, which may be a centre point, of zone 1010a. The distance 2304 between centre point 2006 and reference point 803a is determined, for instance, by using the Haversine formula.

Figure 24A:
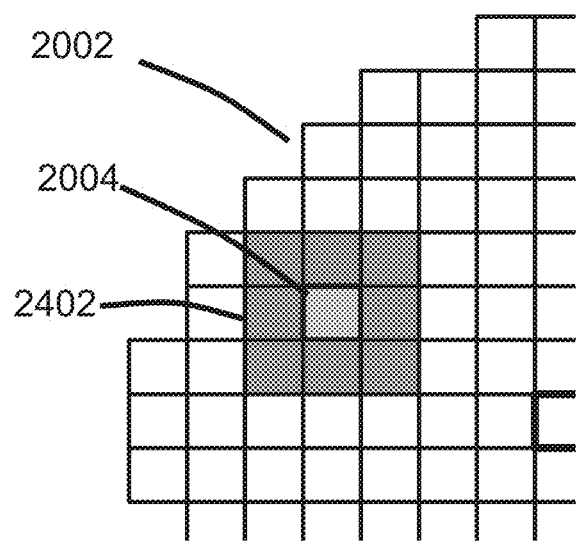
FIG. 24A is a simplified conceptual diagram of a portion of a zone including a subzone having 8 adjacent subzones.
Figure 24B:
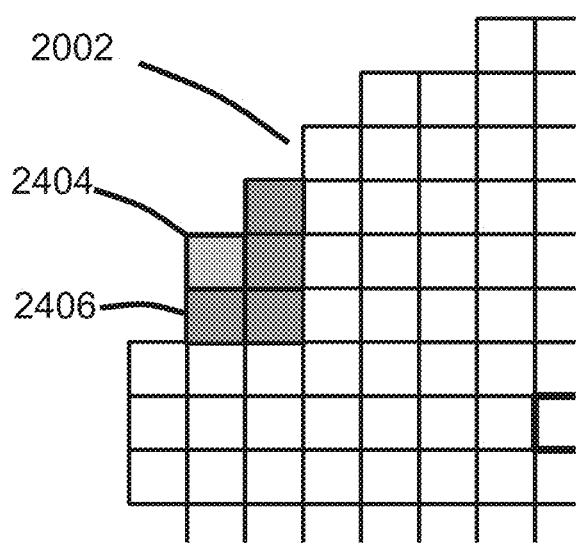
FIG. 24B is a simplified conceptual diagram of a portion of a zone including a subzone having 4 adjacent subzones.

In a second exemplary implementation, for each subzone, a feature may be based on and/or derived from the number of subzones adjacent the subzone (e.g., number of Geohash neighbours). FIG. 24A is a simplified conceptual diagram of portion 2002 including subzone 2004 having 8 adjacent subzones 2402. FIG. 24B is also a simplified conceptual diagram of portion 2002 including subzone 2404 having 4 adjacent subzones 2406. In these examples, the features for subzones 2004 and 2404 may have values 8 and 4 respectively. Alternatively, features for subzones 2004 and 2404 may have values be derived therefrom.

In a third exemplary implementation, for each subzone, a feature may be based on and/or derived from the number of subzones adjacent the subzone (e.g., number of Geohash neighbours) having vehicle data corresponding to a location therein. FIG. 24A shows subzone 2004 having 8 adjacent subzones 2402. If no vehicle data corresponds to 3 of those adjacent subzones the value of the feature is 5. In other words, if vehicles did not enter 3 of the 8 subzones, the number of adjacent subzones having vehicle data corresponding to a location therein is 5.

Spatial-related features are determined for each subzone of the plurality of subzones for each zone of the plurality of zones.

Example features are not intended to limit embodiments to the features described herein.

Block 712

In block 712 training data is formed. For instance, for each subzone, above described features are determined to create training data. Training data further includes an indication of the class of each subzone.

Figure 25A:
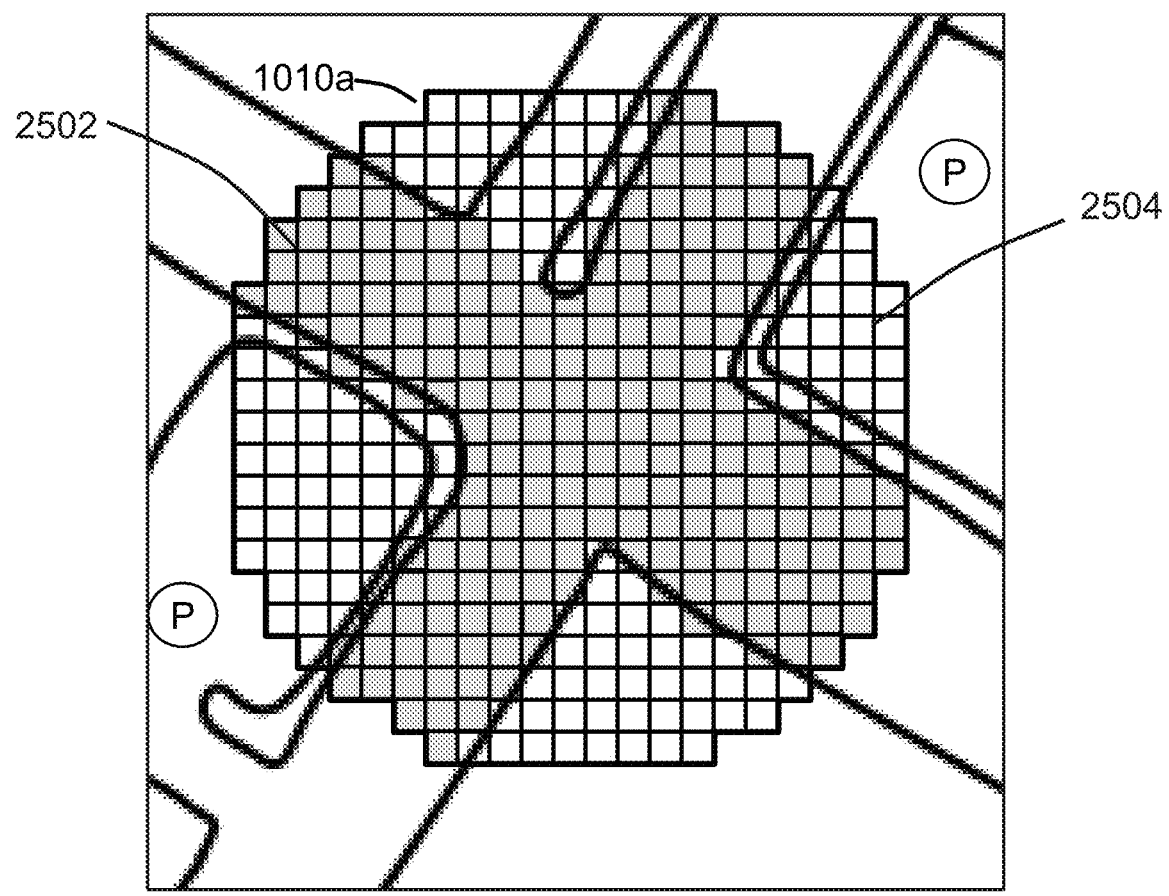
FIG. 25A is a conceptual diagram of a portion of a sample vehicle way and a zone imposed thereon.

Shown in FIG. 25A is a conceptual diagram of a portion of sample vehicle way in the form of sample intersection 802a and zone 1010a imposed thereon. Shaded subzones 2502 of zone 1010a indicate that they are portions of sample intersection 802, whereas the unshaded subzones 2504 are not portions of sample intersection. Table 2510 of FIG. 25B represents training data including subzone ID, a plurality of features generated for each associated subzone, and a class label, indicating a subzone is one of a 'vehicle way' class, (e.g., a portion of sample vehicle way, such as sample intersection 802a) or a 'not-vehicle way' class (e.g., not a portion of a sample vehicle way).

Block 714

Finally, in block 714, a machine learning technique, such as random forest technique, is implemented using training data to define a classifier for classifying a subzone as one of a vehicle way class or not-vehicle way class. The training data used may include all or a portion of the features described herein. Optionally, other features may be included in the training data.

Figure 26:
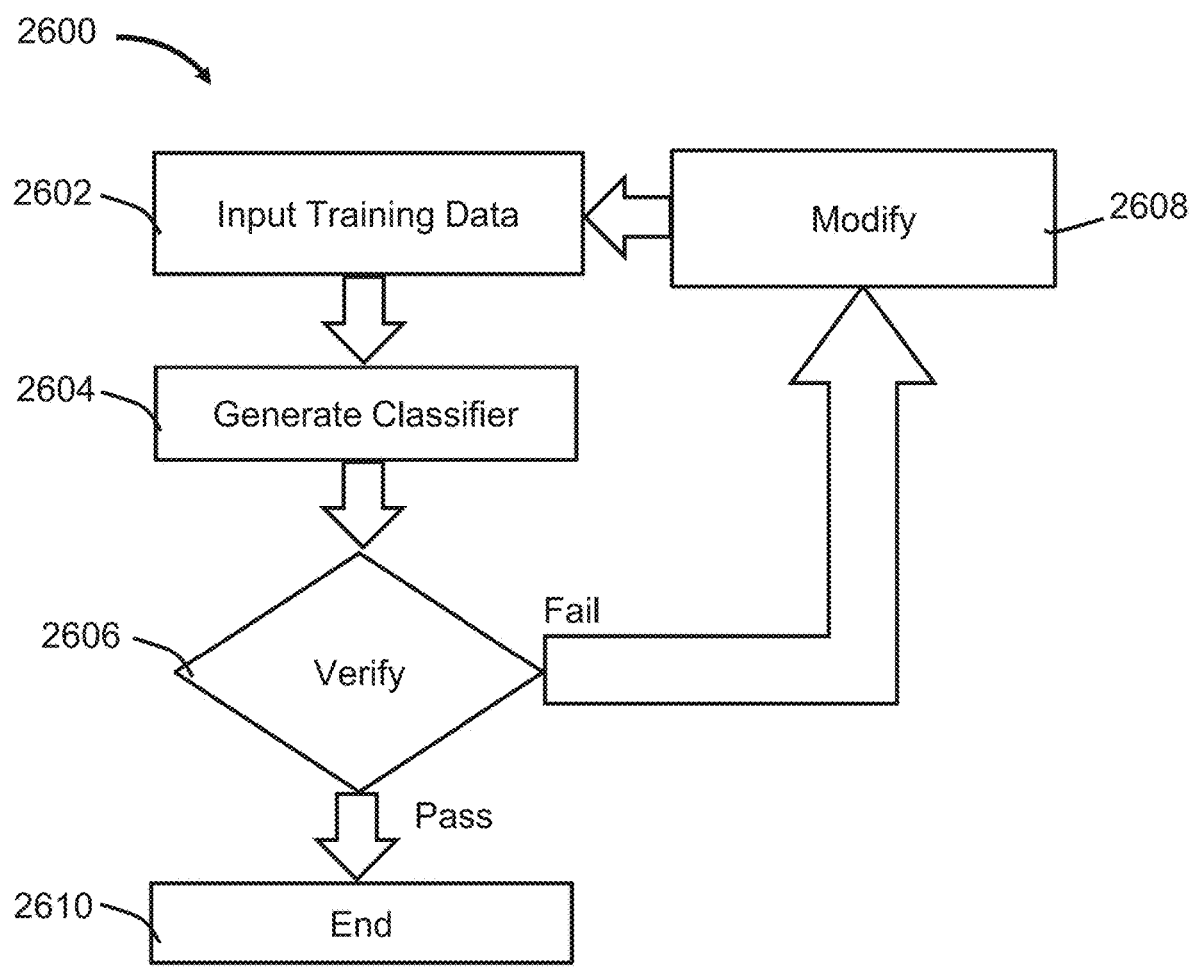
FIG. 26 is a simplified high-level flow diagram of an exemplary process for using a machine learning technique to define a classifier.

For example, FIG. 26 is a high-level flow diagram of an exemplary process 2600 for using a machine learning technique to define a classifier for classifying subzones. Process 2600 begins at block 2602 where training data, such as training data represented by table 2510, is input to a machine learning algorithm. Next, at block 2604, a classifier that is generated by training the ML algorithm is verified, and at block 2606 the performance of the classifier is evaluated. If the classifier meets performance criteria, (e.g., passes verification) process 2600 ends at block 2610. However, if the performance criteria are not met, (e.g., fails verification), the process 2600 continues to block 2608 where modifications to training data or machine learning algorithm parameters may be performed and process 2600 continues until the defined classifier meets the required performance criteria.

Optionally, modifications to other parameters may also be performed should performance criteria not be met. Such as, the relative position of the reference areas from the reference points and/or subzone dimensions (e.g., Geohash precision). When performance criteria are met, classifier data associated with the classifier may be generated. Such classifier data may be indicative of the relative position of the reference areas from the reference points that were used for defining the classifier. The classifier data may also be indicative of subzone dimensions (e.g., Geohash precision) of subzones used for defining the classifier. This classifier data may be useful when using the classifier for defining a vehicle way. Each classifier may have unique classifier data associated therewith.

Included in the discussion above are a series of flow charts showing the steps and acts of various processes. The processing and decision blocks of the flow charts above represent steps and acts that may be included in algorithms that carry out these various processes. Algorithms derived from these processes may be implemented as software integrated with and directing the operation of one or more processors, may be implemented as functionally-equivalent circuits such as a Digital Signal Processing (DSP) circuit, a Field Programmable Gate Array (FPGA), an Application-Specific Integrated Circuit (ASIC), or may be implemented in any other suitable manner. It should be appreciated that the flow charts included herein do not depict the syntax or operation of any circuit or of any programming language or type of programming language. Rather, the flow charts illustrate the functional information one skilled in the art may use to fabricate circuits or to implement computer software algorithms to perform the processing of an apparatus carrying out the types of techniques described herein. It should also be appreciated that, unless otherwise indicated herein, the sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of several suitable programming languages and/or programming or scripting tools and may be compiled as executable machine language code or intermediate code that is executed on a framework or virtual machine.

Computer-executable instructions implementing the techniques described herein may, in some embodiments, be encoded on one or more computer-readable media to provide functionality to the media. Computer-readable media include magnetic media such as a hard disk drive, optical media such as a Compact Disk (CD) or a Digital Versatile Disk (DVD), Blu-Ray disk, a persistent or non-persistent solid-state memory (e.g., Flash memory, Magnetic RAM, etc.), or any other suitable storage media. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

While not illustrated in FIGS. 3A, 3B, 5A, and 5B, traffic analytics system 104a, 104b and intelligent telematics system 500a, 500b may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, traffic analytics system 104a, 104b and intelligent telematics system 500a, 500b may receive input information through speech recognition or in other audible format.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Embodiments of the present invention provide one or more technical effects. In particular, the ability to repurpose raw vehicle data indicative of vehicle operating conditions originally intended for fleet management for use by a traffic analytics system and/or an intelligent telematics system for defining locations of vehicle ways. Using speed data and ignition state data of raw vehicle data for defining locations of vehicle ways. The ability to identify locations of vehicle ways that may be portions of a roadway system, parking areas, and non-traffic designated areas using raw vehicle data. Implementing machine learning techniques using raw vehicle data to define the location of vehicle ways. The ability to define locations of vehicle ways of a particular type. Provides alternative techniques compared to prior art for locating vehicle ways. Such as, image and video capture and processing, GIS measurement techniques, gathering position data from targeted GPS devices, and gathering data uploaded data by the public. Ability to define locations of vehicle ways without obtaining location data from $3^{rd}$ party, performing complex imagine processing or extracting vehicle way location data from a $3^{rd}$ party website. The ability to identify portions of vehicle ways. The ability to modify resolution of boundary location by selecting a sub-zone size. The ability to define a location of a vehicle way from raw vehicle data and a vehicle way point of reference. Once locations of vehicle ways are determined, the ability to obtain traffic data and/or traffic metrics related to the vehicle way.

NOMENCLATURE

Vehicle: a transportation asset, some examples include: a car, truck, recreational vehicle, heavy equipment, tractor, and snowmobile.

Vehicle way: an area frequently used by vehicles, i.e., an area on the Earth's surface repeatedly employed by vehicles. A vehicle way may include an area employed by vehicles for movement and/or parking.

Location: a unique geographic location of an object on the Earth's surface.

Point location/Location of a point: defines a unique two-dimensional location of a point on the Earth's surface, for example, geographic coordinate pair, latitude/longitude.

Area location/Location of an area: a unique two-dimensional space on the Earth's surface.

Known area: an area of which the location thereof is defined.

Monitoring device: a device onboard a vehicle for detecting environmental operating conditions associated with a vehicle and transmitting raw vehicle data indicative thereof.

Raw vehicle data: data including vehicle operation information indicative of vehicle operating conditions and the date and time vehicle operating conditions were logged. Raw vehicle data may include information for identifying an onboard monitoring device and/or a vehicle the monitoring device is aboard.

Historical vehicle data: raw vehicle data collected over a period of time.

Vehicle data: raw vehicle data and data interpolated therefrom or raw vehicle data.

Zone: an area encompassing an associated vehicle way.

Subzone: portion of a zone.

Classifier: a classification model defined by using a machine learning technique for classifying an object. In context of this application, a classifier classifies a subzone (e.g., a known area) as a vehicle way class or not-vehicle way class.

Feature: data indicative of variables/attributes, or measurements of properties of a phenomenon being observed and/or data derived therefrom. In context of this application, a feature is a numerical representation of a subzone.

What is claimed is:

1. An intelligent telematics system comprising a plurality of onboard-vehicle monitoring devices, a first datastore, a processing resource and a network interface configured to communicatively couple the plurality of onboard-vehicle monitoring devices to the first datastore, the intelligent telematics system configured to:
    transmit raw vehicle data indicative of vehicle operating conditions from the plurality of onboard-vehicle monitoring devices;
    over a period of time, receive the raw vehicle data by the first datastore to form historical vehicle data stored thereby;
    define a plurality of zones corresponding to a plurality of sample vehicle ways, each of the plurality of zones comprising a plurality of first contiguous subzones, the plurality of first contiguous subzones for each of the plurality of zones forming a plurality of second contiguous subzones;
    generate a plurality of features for each of the plurality of second contiguous subzones based on a subset of raw vehicle data selected from the historical vehicle data;
    generate training data for each of the plurality of second contiguous subzones comprising the plurality of features; and
    define a classifier using at least one machine learning technique with the training data, the classifier configured to classify a subzone as one of a portion of a vehicle way and other than a portion of a vehicle way.

2. The intelligent telematics system of claim 1 comprising a first data management system including the first data store and configured to transmit, over a period of time, the raw vehicle data from the plurality of onboard-vehicle monitoring devices to the first data management system to form the historical vehicle data.

3. The intelligent telematics system of claim 1 wherein at least one onboard-vehicle monitoring device of the plurality of onboard-vehicle monitoring devices comprises at least a sensing module configured to one of sense or measure a physical property of an operating condition of a vehicle.

4. The intelligent telematics system of claim 3 wherein the at least a sensing module is configured to one of sense or measure one of the following physical properties of an operating condition of a vehicle: position, speed, direction, rates of acceleration or deceleration, ignition state, external ambient temperature, transmission and engine performance.

5. The intelligent telematics system of claim 3 wherein the at least one onboard-vehicle monitoring device comprises a global navigation satellite system technology configured to determine the geographic position of a vehicle.

6. The intelligent telematics system of claim 5 wherein the global navigation satellite system technology includes Global Positioning System technology.

7. The intelligent telematics system of claim 1 wherein at least one onboard-vehicle monitoring device of the plurality of onboard-vehicle monitoring devices communicates with a vehicle communication port.

8. The intelligent telematics system of claim 7 wherein the vehicle communication port includes an OBDII port.

9. The intelligent telematics system of claim 1 wherein at least one onboard-vehicle monitoring device of the plurality of onboard-vehicle monitoring devices comprises a wireless communication interface configured to communicate with a wireless vehicle communication port.

10. The intelligent telematics system of claim 1 wherein at least one onboard-vehicle monitoring device of the plurality of onboard-vehicle monitoring devices communicates with one of an external device or system that detects operating conditions of a vehicle.

11. The intelligent telematics system of claim 1 wherein the intelligent telematics system configured to define a plurality of zones corresponding to a plurality of sample vehicle ways, for at least a zone, comprises the intelligent telematics system configured to:
    obtain geographic coordinate data indicative of a location of a reference point proximate the sample vehicle way;
    define a reference area relative to the location of the reference point that encompasses the sample vehicle way; and
    partition the reference area into the plurality of first contiguous subzones.

12. The intelligent telematics system of claim 11 wherein all portions of the reference area are partitioned into the plurality of first contiguous subzones.

13. The intelligent telematics system of claim 12 wherein the reference area is defined at a same relative location to the reference point proximate the sample vehicle way.

14. The intelligent telematics system of claim 13 wherein the reference area is defined at a distance 25 m radially from the reference point.

15. The intelligent telematics system of claim 1 wherein each second contiguous subzone of the plurality of second contiguous subzones is defined by latitude and longitude pairs.

16. The intelligent telematics system of claim 11 wherein the intelligent telematics system configured to partition the reference area into the plurality of first contiguous subzones comprises the intelligent telematics system configured to subdivide the reference area into a grid of latitude and longitude lines.

17. The intelligent telematics system of claim 11 wherein the intelligent telematics system configured to partition the reference area into the plurality of first contiguous subzones comprises the intelligent telematics system configured to subdivide the reference area into the plurality of first contiguous subzones according to a hierarchical geospatial indexing system.

18. The intelligent telematics system of claim 17 wherein the hierarchical geospatial indexing system is Geohash.

19. The intelligent telematics system of claim 18 wherein the Geohash precision is 9.

20. The intelligent telematics system of claim 17 wherein the hierarchical geospatial indexing system is H3.

21. The intelligent telematics system of claim 11 wherein the intelligent telematics system configured to partition the reference area into the plurality of first contiguous subzones comprises the intelligent telematics system configured to define a first contiguous subzone encompassing the reference point and build a grid of first contiguous subzones therefrom until all portions of the reference area are partitioned by the grid of first contiguous subzones.

22. The intelligent telematics system of claim 1 wherein the vehicle operating conditions comprise at least one of position, speed, and ignition state of a vehicle, wherein the ignition state indicates a state of one of ON or OFF.

23. The intelligent telematics system of claim 1 wherein the raw vehicle data comprises date and time data indicative of a date and time that the vehicle operating conditions are logged.

24. The intelligent telematics system of claim 1 wherein the subset of raw vehicle data comprises raw vehicle data corresponding to a location within the plurality of zones.

25. The intelligent telematics system of claim 1 wherein the subset of raw vehicle data comprises raw vehicle data corresponding to a position within at least one traffic zone that encompasses at least a zone of the plurality of zones.

26. The intelligent telematics system of claim 25 wherein the at least one traffic zone encompasses the plurality of zones.

27. The intelligent telematics system of claim 1 further configured to generate vehicle data wherein the vehicle data includes the subset of raw vehicle data or the subset of raw vehicle data and data interpolated therefrom.

28. The intelligent telematics system of claim 27 wherein data interpolated from the subset of raw vehicle data is dependent on the dimensions of each of the plurality of second contiguous subzones.

29. The intelligent telematics system of claim 27 further configured to filter data from the vehicle data indicative of at least one of an outlier or duplicate value.

30. The intelligent telematics system of claim 1 further configured to, for each second contiguous subzone of the plurality of second contiguous subzones, obtain spatial relationship data for each thereof to a corresponding zone and generate at least one feature from the spatial relationship data.

31. The intelligent telematics system of claim 30 wherein the spatial relationship data is indicative of the distance between the second contiguous subzone and a centre point of the corresponding zone.

32. The intelligent telematics system of claim 30 wherein the spatial relationship data is indicative of the distance between a centre point of the second contiguous subzone and a centre point of the corresponding zone.

33. The intelligent telematics system of claim 30 wherein the spatial relationship data is indicative of the number of adjacent second contiguous subzones to the second contiguous subzone.

34. The intelligent telematics system of claim 33 wherein the number of adjacent second contiguous subzones to the second contiguous subzone is the number of neighbours of a Geohash.

35. The intelligent telematics system of claim 1 wherein each training data comprises an indication that the second contiguous subzone is one of a vehicle way class or a not-vehicle way class.

36. The intelligent telematics system of claim 1 further configured to, for two or more zones of the plurality of zones having one or more common second contiguous subzones, associate the one or more common second contiguous subzones with a unique zone of the two or more zones.

37. The intelligent telematics system of claim 36 wherein the intelligent telematics system configured to associate each of the one or more common second contiguous subzones with a unique zone comprises the intelligent telematics system configured to calculate a distance between each second contiguous subzone of the one or more common second contiguous subzones and a location of a centre point of the two or more zones and assign the one or more common second contiguous subzones to the zone of which the distance is shortest.

38. The intelligent telematics system of claim 13 wherein the same relative location to the reference point is defined by classifier data associated with the classifier.

39. The intelligent telematics system of claim 38 wherein first contiguous subzone dimensions are defined by the classifier data.

40. The intelligent telematics system of claim 38 wherein Geohash precision is defined by the classifier data.

41. The intelligent telematics system of claim 30 wherein the spatial relationship data is indicative of the number of adjacent second contiguous subzones to a second contiguous subzone having vehicle data corresponding to a location therein.

42. The intelligent telematics system of claim 30 wherein the spatial relationship data is indicative of the number of neighbours of a Geohash having vehicle data corresponding to a location therein.

43. An intelligent telematics system comprising a plurality of onboard-vehicle monitoring devices, a first datastore, a processing resource and a network interface configured to communicatively couple the plurality of onboard-vehicle monitoring devices to the first datastore, the intelligent telematics system configured to:
transmit raw vehicle data indicative of vehicle operating conditions from the plurality of onboard-vehicle monitoring devices;
over a period of time, receive the raw vehicle data by the first datastore to form historical vehicle data stored thereby;
define a plurality of zones corresponding to a plurality of sample vehicle ways, each of the plurality of zones comprising a plurality of first contiguous subzones, the plurality of first contiguous subzones for each of the plurality of zones forming a plurality of second contiguous subzones;
generate a plurality of features for each of the plurality of second contiguous subzones based on a subset of raw vehicle data selected from the historical vehicle data;
generate training data for each of the plurality of second contiguous subzones comprising the plurality of features; and
define a classifier using at least one machine learning technique with the training data, the classifier configured to classify a subzone as one of a portion of a vehicle way and other than a portion of a vehicle way,
the intelligent telematics system further configured to generate vehicle data wherein the vehicle data includes the subset of raw vehicle data or the subset of raw vehicle data and data interpolated therefrom,
wherein data interpolated from the subset of raw vehicle data is dependent on the dimensions of each of the plurality of second contiguous subzones, wherein the intelligent telematics system configured to generate a plurality of features for each of the plurality of second contiguous subzones based on a subset of raw vehicle data, for at least a second contiguous subzone, includes the intelligent telematics system configured to generate subzone-related features from a first subset of vehicle data corresponding to a location within the second contiguous subzone.

44. The intelligent telematics system of claim 43 further configured to select the subzone-related features from the group of: minimum vehicle speed, maximum vehicle speed, average vehicle speed, median vehicle speed, standard deviation of vehicle speed, minimum ignition, maximum ignition, total number of ignitions on, total number of ignitions off, average number of ignitions, ignition ratio, minimum number of vehicle visits/day, maximum number of vehicle visits/day, average number of vehicle visits/day, median number of vehicle visits/day, standard deviation of number of vehicle visits/day, minimum unique number of vehicle visits/day, maximum unique number of vehicle visits/day, median unique number of vehicle visits/day, standard deviation of unique number of vehicle visits/day, average unique number of vehicle visits/day, total number of vehicle visits, total number of unique vehicle visits, and average number of visits/vehicle.

45. The intelligent telematics system of claim 44 wherein the intelligent telematics system configured to generate the plurality of features comprises the intelligent telematics system configured to generate subzone-related features from the first subset of vehicle data and a second subset of vehicle data including vehicle data for a same vehicle temporally subsequent thereto.

46. The intelligent telematics system of claim 45 further configured to select the subzone-related features from the group of: average time to park, minimum time to park, maximum time to park, median time to park, and standard deviation of time to park.

47. The intelligent telematics system of claim 45 wherein the intelligent telematics system configured to generate the plurality of features comprises the intelligent telematics system configured to generate subzone-related features from the first subset of vehicle data and a third subset of vehicle data including vehicle data for a same vehicle temporally preceding and subsequent thereto.

48. The intelligent telematics system of claim 47 further configured to select the subzone-related features from the group of: average dwell time, minimum dwell time, maximum dwell time, median dwell time, and standard deviation of dwell time.

49. The intelligent telematics system of claim 43 wherein the intelligent telematics system configured to generate a plurality of features for each of the plurality of second contiguous subzones based on a subset of raw vehicle data comprises the intelligent telematics system configured to generate zone-related features from a fourth subset of vehicle data corresponding to a position within a corresponding zone or from a portion of corresponding subzone-related features.

50. The intelligent telematics system of claim 49 further configured to select the zone-related features from the group of: zone minimum ignition off, zone maximum ignition off, zone average vehicle speed, zone maximum vehicle speed, zone minimum vehicle speed, zone average number of unique visits/day, zone minimum number of unique visits/day, zone maximum number of unique visits/day, zone average median number of unique visits/day, and zone total average number of unique visits/day.

51. The intelligent telematics system of claim 49 further configured to generate the zone-related features from the portion of corresponding subzone-related features and select the zone-related features from the group of: zone average time to park, zone maximum time to park, zone minimum time to park, zone maximum dwell time, zone minimum dwell time, zone median dwell time, zone average dwell time, zone minimum number of unique visits, zone average number of unique visits, zone maximum number of unique visits, zone average total number of visits, zone maximum total number of visits, and zone minimum total number of visits.

52. The intelligent telematics system of claim 49 further configured to generate the zone-related features from the fourth subset of vehicle data instances corresponding to a position within a corresponding zone and select the zone-related features from the group of: zone total number of visits and zone total number of unique visits.

53. The intelligent telematics system of claim 49 wherein the intelligent telematics system configured to generate a plurality of features for each of the plurality of second contiguous subzones based on a subset of raw vehicle data comprises the intelligent telematics system configured to generate subzone-zone-related features from a relationship of a portion of the plurality of corresponding subzone-related features to a portion of the corresponding zone-related features.

54. The intelligent telematics system of claim 53 further configured to select the subzone-zone-related features from the group of: minimum vehicle speed ratio, average vehicle speed ratio, maximum vehicle speed ratio, minimum ignition off ratio, maximum ignition off ratio, maximum dwell time ratio, minimum dwell time ratio, average median dwell time ratio, average dwell time ratio, minimum time to park ratio, average time to park ratio, maximum time to park ratio, minimum number of unique vehicle visits ratio, maximum number of unique vehicle visits ratio, average number of unique vehicle visits ratio, total number of vehicle unique visits ratio, minimum unique number of vehicle visits/day ratio, maximum unique number of vehicle visits/day ratio, average unique number of vehicle visits/day ratio, total unique number of vehicle visits/day ratio, average median unique number of vehicle visits/day ratio, minimum total number of vehicle visits ratio, maximum total number of vehicle visits ratio, average total number of vehicle visits ratio, and total number of vehicle visits ratio.

* * * * *